US007286717B2

United States Patent
Nomizu

(10) Patent No.: US 7,286,717 B2
(45) Date of Patent: Oct. 23, 2007

(54) IMAGE DATA PROCESSING DEVICE PROCESSING A PLURALITY OF SERIES OF DATA ITEMS SIMULTANEOUSLY IN PARALLEL

(75) Inventor: Yasuyuki Nomizu, Kanagawa (JP)

(73) Assignee: Ricoh Company, Ltd. (JP)

( * ) Notice: Subject to any disclaimer, the term of this patent is extended or adjusted under 35 U.S.C. 154(b) by 692 days.

(21) Appl. No.: 10/283,350

(22) Filed: Oct. 30, 2002

(65) Prior Publication Data

US 2003/0095272 A1 May 22, 2003

(30) Foreign Application Priority Data

Oct. 31, 2001 (JP) ............... 2001-334836
Oct. 31, 2001 (JP) ............... 2001-334837
Oct. 31, 2001 (JP) ............... 2001-334838

(51) Int. Cl.
G06K 9/36 (2006.01)
G06F 3/12 (2006.01)
G06F 15/00 (2006.01)

(52) U.S. Cl. .............. 382/280; 382/190; 382/304; 358/1.9

(58) Field of Classification Search .......... 382/190, 382/280, 304; 358/1.9, 1.16; 710/260
See application file for complete search history.

(56) References Cited

U.S. PATENT DOCUMENTS

| 5,297,220 A | 3/1994 | Nomizu et al. |
| 5,406,282 A | 4/1995 | Nomizu et al. |
| 5,673,340 A | 9/1997 | Kanda et al. |
| 6,265,997 B1 | 7/2001 | Nomizu et al. |
| 6,301,391 B1 | 10/2001 | Nomizu et al. |
| 2001/0012113 A1 | 8/2001 | Yoshizawa et al. |
| 2001/0012127 A1 | 8/2001 | Fukuda et al. |
| 2001/0015821 A1 | 8/2001 | Namizuka et al. |
| 2001/0019429 A1 | 9/2001 | Oteki et al. |
| 2001/0021278 A1 | 9/2001 | Fukuda et al. |
| 2001/0050778 A1 | 12/2001 | Fukuda et al. |
| 2001/0054126 A1 | 12/2001 | Fukuda et al. |
| 2002/0012131 A1 | 1/2002 | Oteki et al. |
| 2002/0018244 A1 | 2/2002 | Namizuka et al. |
| 2002/0054374 A1 | 5/2002 | Inoue et al. |

FOREIGN PATENT DOCUMENTS

| JP | 5-48892 | 2/1993 |
| JP | 06-004661 | 1/1994 |
| JP | 6-105154 | 4/1994 |
| JP | 7-162687 | 6/1995 |
| JP | 8-305329 | 11/1996 |
| JP | 9-321986 | 12/1997 |
| JP | 2001-57633 | 2/2001 |
| JP | 2001-169109 | 6/2001 |
| JP | 2001-188898 | 7/2001 |

Primary Examiner—Duy M. Dang
(74) Attorney, Agent, or Firm—Dickstein Shapiro LLP

(57) ABSTRACT

In a data conversion device, a plurality of series of data to be converted is input from a buffer memory device to a data processor. The data processor processes a plurality of the series of the data to be converted, simultaneously in parallel, and outputs a plurality of the series of the data to be converted, simultaneously in parallel. A memory controller of the buffer memory device relates a plurality of the series of the data to be converted to respective conversion tables formed therein by the data processor so as to read converted data corresponding to the series of the data to be converted from the respective conversion tables simultaneously in parallel.

15 Claims, 41 Drawing Sheets

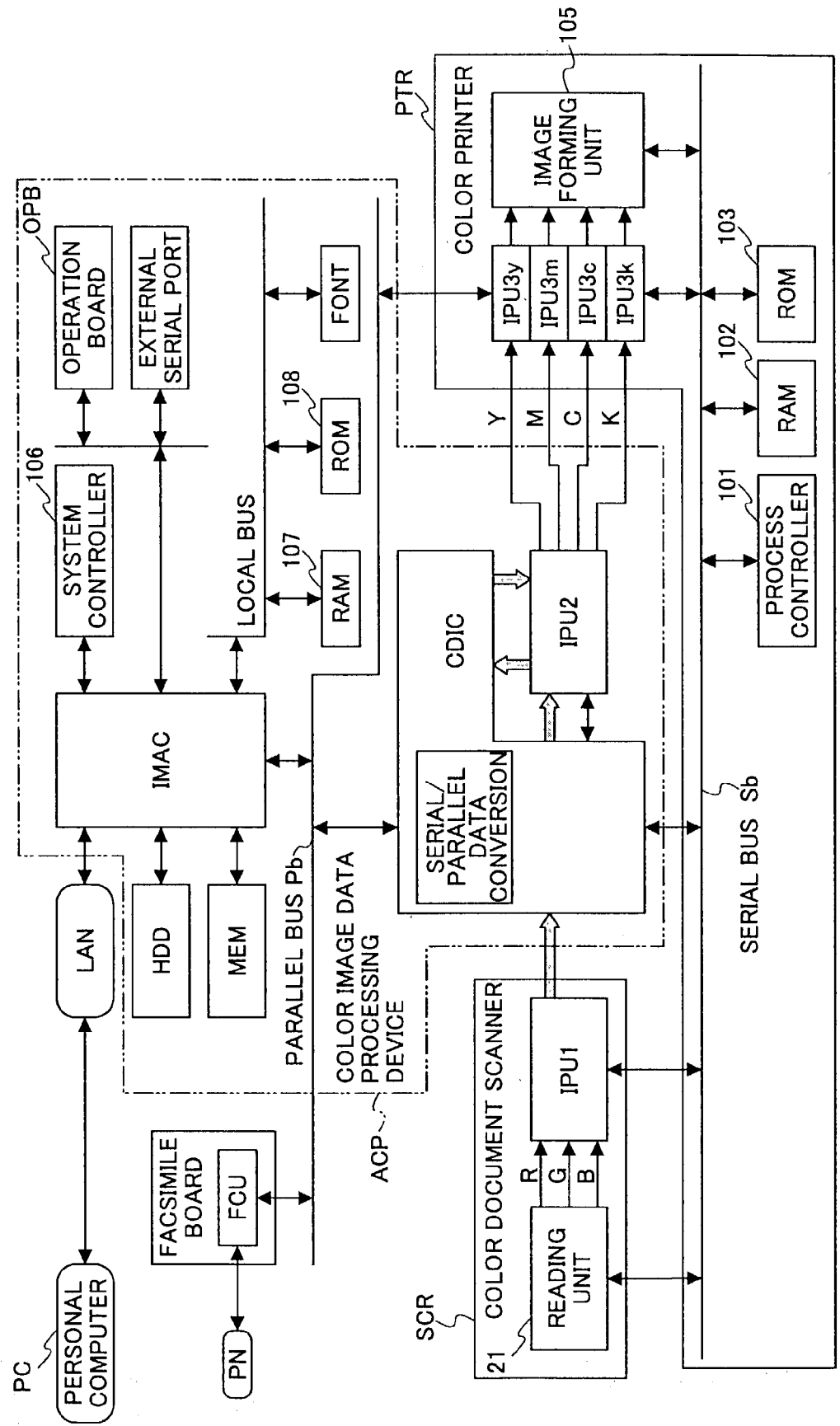

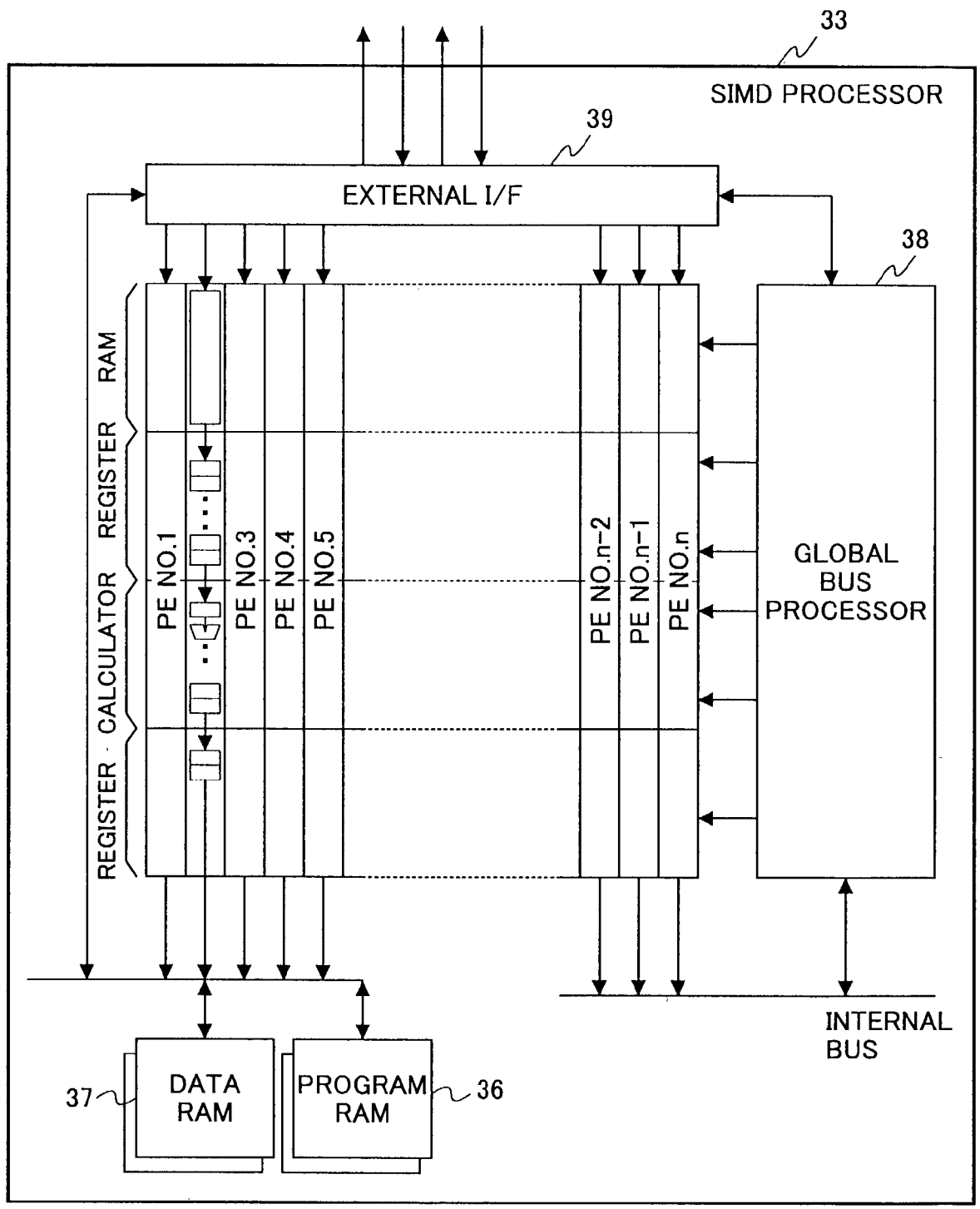

FIG.13A

MEMORY-CONTROLLER
SETTING REGISTER

| SETTING INFORMATION OF MEMORY CONTROLLER 1 |
|---|
| SETTING INFORMATION OF MEMORY CONTROLLER 2 |
| SETTING INFORMATION OF MEMORY CONTROLLER 3 |
| ⋮ |
| SETTING INFORMATION OF MEMORY CONTROLLER 14 |
| SETTING INFORMATION OF MEMORY CONTROLLER 15 |
| SETTING INFORMATION OF MEMORY CONTROLLER 16 |

FIG.13B

SETTING INFORMATION

| RAM 8K (RAM No.) TO BE USED, FUNCTION TYPE (LINE BUFFER / LUT), ACCESS MODE (WRITING / READING / (1/2) ODD-NUMBER SYNCHRONISM DETECTION / (1/2) EVEN-NUMBER SYNCHRONISM DETECTION), START ADDRESS, END ADDRESS |
|---|

FIG.13C

SETTING INFORMATION OF MEMORY CONTROLLER 1
(LINE BUFFER: WRITING)

```
RAM No.1,
LINE BUFFER,
WRITING,

START ADDRESS: XXXXXXXXXXXX,
END ADDRESS: YYYYYYYYYYYY
```

FIG.13D

SETTING INFORMATION OF MEMORY CONTROLLER 1
(LINE BUFFER: READING)

```
RAM No.1,
LINE BUFFER,
READING,

START ADDRESS: XXXXXXXXXXXX,
END ADDRESS: YYYYYYYYYYYY
```

FIG.13E

SETTING INFORMATION OF MEMORY CONTROLLER 15
(LINE BUFFER & LUT)

```
RAM No.15,
LINE BUFFER,
WRITING,
START ADDRESS: XXXXXXXXXXXX,
END ADDRESS: YYYYYYYYYYYY

LUT,
WRITING,
START ADDRESS: XXXXXXXXXXXX,
END ADDRESS: YYYYYYYYYYYY
```

FIG.14A  RAM No.i  LINE BUFFER MEMORY : A3

FIG.14B  RAM No.j  LINE BUFFER MEMORY : A4 | LINE BUFFER MEMORY : A3

FIG.14C  RAM No.k  LINE BUFFER MEMORY : A3 | LUT

FIG.14D  RAM No.l  LUT

FIG.14E  RAM No.m  LUT1 | LUT2 | LUT3 | LUT4 | LUT5 | LUT6 | LUT7

FIG.14F  RAM No.n  LUT00 | LUT01 | LUT02 | LUT03 | LUT10 | LUT11 | LUT12

FIG.15

| | PROGRAM CODE (No.) | CONTENTS |
|---|---|---|
| | ⋮ | ⋮ |
| SCANNER γ CONVERSION PROGRAMS | S1R | R CONVERSION PROGRAM OF SCANNER γ CONVERSION No.1 |
| | S1G | G CONVERSION PROGRAM OF SCANNER γ CONVERSION No.1 |
| | S1B | B CONVERSION PROGRAM OF SCANNER γ CONVERSION No.1 |
| | S2R | R CONVERSION PROGRAM OF SCANNER γ CONVERSION No.2 |
| | S2G | G CONVERSION PROGRAM OF SCANNER γ CONVERSION No.2 |
| | S2B | B CONVERSION PROGRAM OF SCANNER γ CONVERSION No.2 |
| | S3R | R CONVERSION PROGRAM OF SCANNER γ CONVERSION No.3 |
| | S3G | G CONVERSION PROGRAM OF SCANNER γ CONVERSION No.3 |
| | S3B | B CONVERSION PROGRAM OF SCANNER γ CONVERSION No.3 |
| | ⋮ | ⋮ |
| | S12R | R CONVERSION PROGRAM OF SCANNER γ CONVERSION No.12 |
| | S12G | G CONVERSION PROGRAM OF SCANNER γ CONVERSION No.12 |
| | S12B | B CONVERSION PROGRAM OF SCANNER γ CONVERSION No.12 |
| PRINTER γ CONVERSION PROGRAMS | P1M | M CONVERSION PROGRAM OF PRINTER γ CONVERSION No.1 |
| | P1C | C CONVERSION PROGRAM OF PRINTER γ CONVERSION No.1 |
| | P1Y | Y CONVERSION PROGRAM OF PRINTER γ CONVERSION No.1 |
| | P1K | K CONVERSION PROGRAM OF PRINTER γ CONVERSION No.1 |
| | P2M | M CONVERSION PROGRAM OF PRINTER γ CONVERSION No.2 |
| | P2C | C CONVERSION PROGRAM OF PRINTER γ CONVERSION No.2 |
| | P2Y | Y CONVERSION PROGRAM OF PRINTER γ CONVERSION No.2 |
| | P2K | K CONVERSION PROGRAM OF PRINTER γ CONVERSION No.2 |
| | P3M | M CONVERSION PROGRAM OF PRINTER γ CONVERSION No.3 |
| | P3C | C CONVERSION PROGRAM OF PRINTER γ CONVERSION No.3 |
| | P3Y | Y CONVERSION PROGRAM OF PRINTER γ CONVERSION No.3 |
| | P3K | K CONVERSION PROGRAM OF PRINTER γ CONVERSION No.3 |
| | ⋮ | ⋮ |
| | P30M | M CONVERSION PROGRAM OF PRINTER γ CONVERSION No.30 |
| | P30C | C CONVERSION PROGRAM OF PRINTER γ CONVERSION No.30 |
| | P30Y | Y CONVERSION PROGRAM OF PRINTER γ CONVERSION No.30 |
| | P30K | K CONVERSION PROGRAM OF PRINTER γ CONVERSION No.30 |
| | ⋮ | ⋮ |

FIG.20

| | | HDD |
|---|---|---|
| PROCESS CODE | ADDRESS | CONTENTS |
| ⋮ | ⋮ | ⋮ |
| ×××1 (SCANNER γ CONVERSION) | S00 | SCANNER γ CONVERSION PROGRAM |
| | S1R | R CONVERSION [BOUNDARY VALUES, PARAMETERS] OF No.1 |
| | S1G | G CONVERSION [BOUNDARY VALUES, PARAMETERS] OF No.1 |
| | S1B | B CONVERSION [BOUNDARY VALUES, PARAMETERS] OF No.1 |
| | S2R | R CONVERSION [BOUNDARY VALUES, PARAMETERS] OF No.2 |
| | S2G | G CONVERSION [BOUNDARY VALUES, PARAMETERS] OF No.2 |
| | S2B | B CONVERSION [BOUNDARY VALUES, PARAMETERS] OF No.2 |
| | S3R | R CONVERSION [BOUNDARY VALUES, PARAMETERS] OF No.3 |
| | S3G | G CONVERSION [BOUNDARY VALUES, PARAMETERS] OF No.3 |
| | S3B | B CONVERSION [BOUNDARY VALUES, PARAMETERS] OF No.3 |
| | ⋮ | ⋮ |
| | S12R | R CONVERSION [BOUNDARY VALUES, PARAMETERS] OF No.12 |
| | S12G | G CONVERSION [BOUNDARY VALUES, PARAMETERS] OF No.12 |
| | S12B | B CONVERSION [BOUNDARY VALUES, PARAMETERS] OF No.12 |
| ×××2 (PRINTER γ CONVERSION) | P00 | PRINTER γ CONVERSION PROGRAM |
| | P1M | M CONVERSION [BOUNDARY VALUES, PARAMETERS] OF No.1 |
| | P1C | C CONVERSION [BOUNDARY VALUES, PARAMETERS] OF No.1 |
| | P1Y | Y CONVERSION [BOUNDARY VALUES, PARAMETERS] OF No.1 |
| | P1K | K CONVERSION [BOUNDARY VALUES, PARAMETERS] OF No.1 |
| | P2M | M CONVERSION [BOUNDARY VALUES, PARAMETERS] OF No.2 |
| | P2C | C CONVERSION [BOUNDARY VALUES, PARAMETERS] OF No.2 |
| | P2Y | Y CONVERSION [BOUNDARY VALUES, PARAMETERS] OF No.2 |
| | P2K | K CONVERSION [BOUNDARY VALUES, PARAMETERS] OF No.2 |
| | P3M | M CONVERSION [BOUNDARY VALUES, PARAMETERS] OF No.3 |
| | P3C | C CONVERSION [BOUNDARY VALUES, PARAMETERS] OF No.3 |
| | P3Y | Y CONVERSION [BOUNDARY VALUES, PARAMETERS] OF No.3 |
| | P3K | K CONVERSION [BOUNDARY VALUES, PARAMETERS] OF No.3 |
| | ⋮ | ⋮ |
| | P30M | M CONVERSION [BOUNDARY VALUES, PARAMETERS] OF No.30 |
| | P30C | C CONVERSION [BOUNDARY VALUES, PARAMETERS] OF No.30 |
| | P30Y | Y CONVERSION [BOUNDARY VALUES, PARAMETERS] OF No.30 |
| | P30K | K CONVERSION [BOUNDARY VALUES, PARAMETERS] OF No.30 |
| ⋮ | ⋮ | ⋮ |

FIG.21

DATA RAM 37

| ADDRESS | DATA CONTENTS | DETAILS |
|---------|---------------|---------|
| 0000H | a1 | SECTION 1 (INCLINATION) |
| 0001H | b1 | SECTION 1 (OFFSET) |
| 0002H | a2 | SECTION 2 (INCLINATION) |
| 0003H | b2 | SECTION 2 (OFFSET) |
| 0004H | a3 | SECTION 3 (INCLINATION) |
| 0005H | b3 | SECTION 3 (OFFSET) |
| 0006H | a4 | SECTION 4 (INCLINATION) |
| 0007H | b4 | SECTION 4 (OFFSET) |
| 0008H | a5 | SECTION 5 (INCLINATION) |
| 0009H | b5 | SECTION 5 (OFFSET) |
| 000AH | a6 | SECTION 6 (INCLINATION) |
| 000BH | b6 | SECTION 6 (OFFSET) |
| 000CH | a7 | SECTION 7 (INCLINATION) |
| 000DH | b7 | SECTION 7 (OFFSET) |
| 000EH | a8 | SECTION 8 (INCLINATION) |
| 000FH | b8 | SECTION 8 (OFFSET) |

FIG.22

| | | HDD |
|---|---|---|
| PROCESS CODE | ADDRESS | CONTENTS |
| ⋮ | ⋮ | ⋮ |
| x x x 1 (SCANNER γ CONVERSION) | S00 | SCANNER γ CONVERSION PROGRAM |
| | S1R | R γ CONVERSION TABLE OF No.1 |
| | S1G | G γ CONVERSION TABLE OF No.1 |
| | S1B | B γ CONVERSION TABLE OF No.1 |
| | S2R | R γ CONVERSION TABLE OF No.2 |
| | S2G | G γ CONVERSION TABLE OF No.2 |
| | S2B | B γ CONVERSION TABLE OF No.2 |
| | S3R | R γ CONVERSION TABLE OF No.3 |
| | S3G | G γ CONVERSION TABLE OF No.3 |
| | S3B | B γ CONVERSION TABLE OF No.3 |
| | ⋮ | ⋮ |
| | S12R | R γ CONVERSION TABLE OF No.12 |
| | S12G | G γ CONVERSION TABLE OF No.12 |
| | S12B | B γ CONVERSION TABLE OF No.12 |
| x x x 2 (PRINTER γ CONVERSION) | P00 | PRINTER γ CONVERSION PROGRAM |
| | P1M | M γ CONVERSION TABLE OF No.1 |
| | P1C | C γ CONVERSION TABLE OF No.1 |
| | P1Y | Y γ CONVERSION TABLE OF No.1 |
| | P1K | K γ CONVERSION TABLE OF No.1 |
| | P2M | M γ CONVERSION TABLE OF No.2 |
| | P2C | C γ CONVERSION TABLE OF No.2 |
| | P2Y | Y γ CONVERSION TABLE OF No.2 |
| | P2K | K γ CONVERSION TABLE OF No.2 |
| | P3M | M γ CONVERSION TABLE OF No.3 |
| | P3C | C γ CONVERSION TABLE OF No.3 |
| | P3Y | Y γ CONVERSION TABLE OF No.3 |
| | P3K | K γ CONVERSION TABLE OF No.3 |
| | ⋮ | ⋮ |
| | P30M | M γ CONVERSION TABLE OF No.30 |
| | P30C | C γ CONVERSION TABLE OF No.30 |
| | P30Y | Y γ CONVERSION TABLE OF No.30 |
| | P30K | K γ CONVERSION TABLE OF No.30 |
| ⋮ | ⋮ | ⋮ |

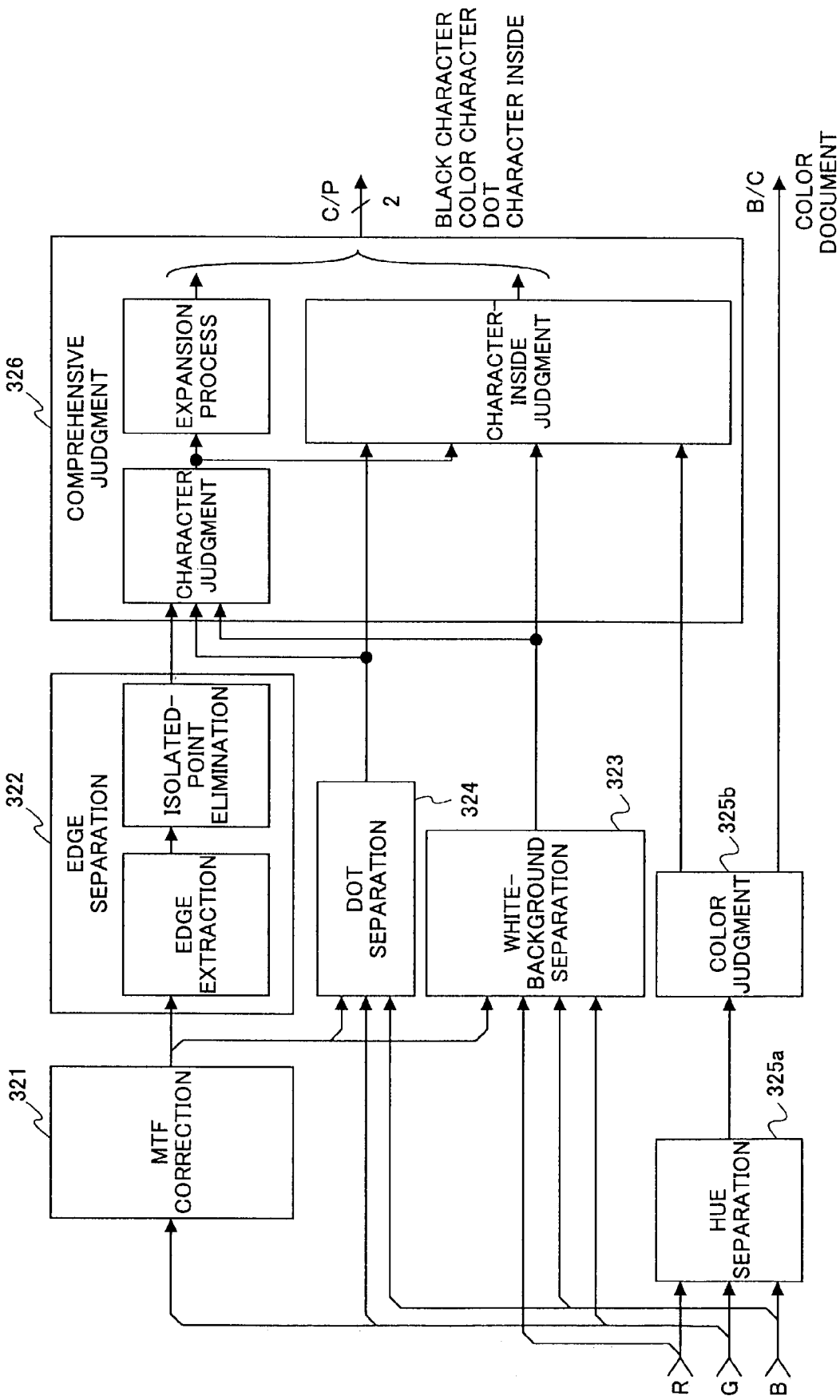

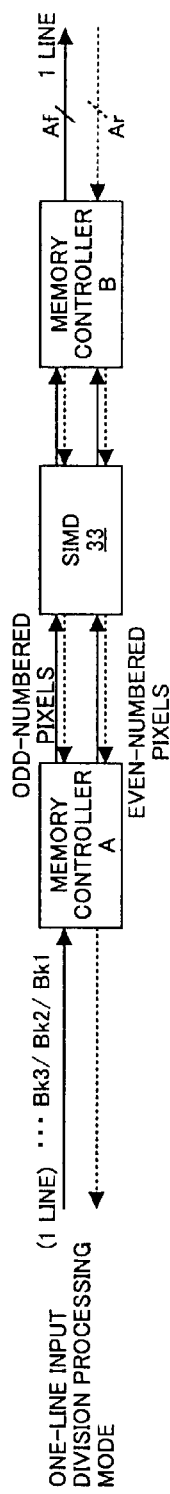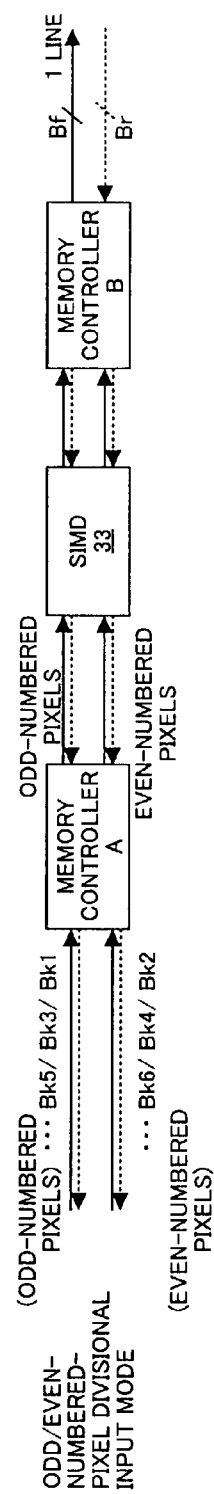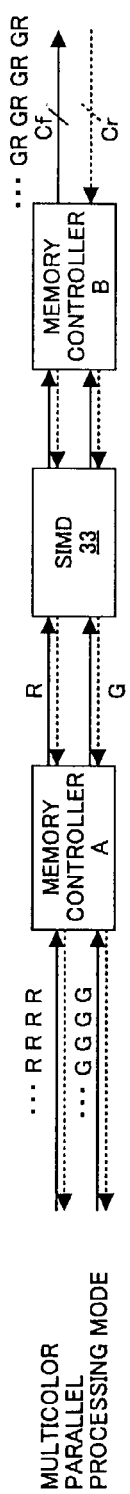

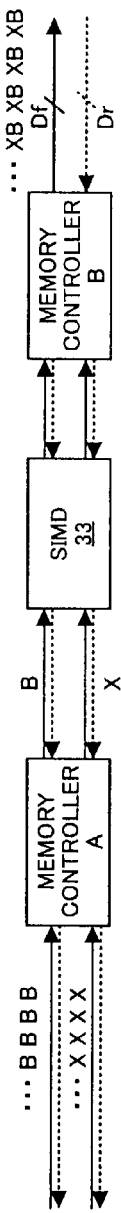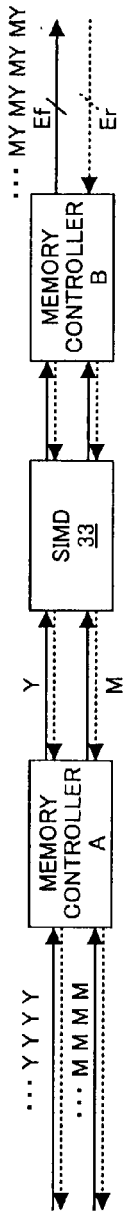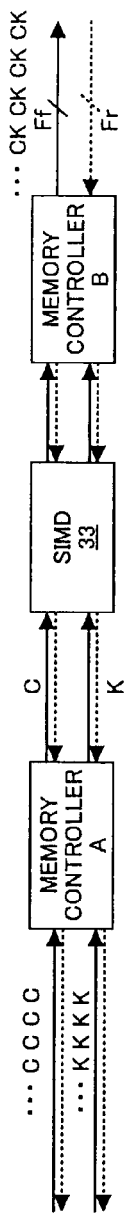

IMAGE DATA PROCESSING DEVICE PROCESSING A PLURALITY OF SERIES OF DATA ITEMS SIMULTANEOUSLY IN PARALLEL

BACKGROUND OF THE INVENTION

1. Field of the Invention

The present invention generally relates to a data conversion device, an image data processing device, a data conversion method, a pattern matching method, and an image data processing method, and more particularly, to an image processing device using the data conversion device, and an image processing device using the image data processing device.

2. Description of the Related Art

As a processing capacity and a processing rate of a computer has been improved, a data processing amount by a computer has been increased, more often involving data conversions or corrections. For example, there are a variety of image data processes, such as: reading corrections (a CCD inter-line correction, a main-scanning resist adjustment, a shading correction, a dot correction, a vertical stripe correction, a γ conversion, etc.) for compensating or correcting reading distortions of RGB image data read by a document scanner; an image area separation of judging whether a read image is an edge (a character edge) or an inside (within a line width: a character inside) of a part having a binary shade (hereinafter simply referred to as character ), such as a character or a line, whether a halftone (dot) image, such as a photograph (hereinafter simply referred to as photograph), or further whether chromatic or achromatic; intermediate processes (a filtering process, a ground-color removal, a color conversion, i.e., a conversion to YMCK image data, an under-color removal, a main-scanning magnification variation, a main-scan shift, a main-scan mirroring, a sub-scan culling, a masking process, and a binarization upon outputting a monochromatic character) mainly for converting RGB image data having undergone the reading corrections into YMCK image data; and output corrections (a printer γ conversion and a gradation process) for correcting YMCK image data having undergone the intermediate processes so as to suit output properties of a printer; besides, the gradation process includes a density conversion, a dither process, a random dither process, and so forth.

Also, there are a variety of manners of processing data, such as a sum-of-product calculation in the filtering process, a pattern matching in the image-area separation, and a data conversion (e.g., a γ conversion) or an interpolative calculation (e.g., a shading correction) using an LUT (Look Up Table: conversion table).

When a preceding image data process and a following image data process are performed at different processing rates, image data needs to be temporarily stored in a buffer memory in each of the processes. In the filtering process or the pattern matching, items of image data of a pixel matrix of several lines need to be referred to simultaneously; therefore, line buffer memories for several lines are necessary. Accordingly, a buffer memory device is used in an image data process.

Japanese Laid-Open Patent Application No. 8-305329 discloses a signal processing device in which: an input data selector 6, an input data latch 10, one memory unit 1, an output data latch 11, and an output data selector 9 are connected in this order along the course of data; further, a writing address selector 7, a reading address selector 8, and a CPU 12 controlling each of the selectors are provided; in this structure, the memory unit 1 is used selectively as a line memory for a TV received image signal or as a lookup table for a nonlinear calculation, according to a setting of the selector by the CPU 12. Data of the lookup table is produced by the CPU 12, and is written to the memory unit 1.

Color image process and adjustment includes a variety of data conversions or data corrections, as mentioned above, which involves problems such as taking a lot of time for processing image data, and requiring a large memory for processing data. For example, supposing that a variety of image processes are performed by a processor provided exclusively for image processes in an image processing device, such as a digital copying machine or a multifunctional machine, increases of processes and data typical of color devices decrease the processing rate.

Especially in a color image reading (by a color scanner) and a color image formation (by a color printer), a processing amount in a color γ conversion becomes a serious problem. For example, a γ conversion of read RGB image data requires at least three LUTs for respective R, G and B data, and a γ conversion of YMCK image data for printing requires at least four LUTs for respective Y, M, C and K data. Accordingly, the color γ conversions using these LUTs consume a lot of time.

In addition to the above-mentioned types of image processes, there are also such image processes as storage in a memory, and edition. Each of processes, such as image reading, storage, and printing, includes a process of black-and-white image data, i.e., a monochrome-image mode process, regarding monochrome reading and monochrome recording, and a process of RGB image data or YMCK image data, i.e., a color-image mode process. Requests for the monochrome-image mode are often made even to a color processing machine; thus the color processing machine is, in general, capable of operating selectively in the monochrome-image mode.

In the monochrome-image mode, monochrome image data is processed. In the color-image mode, respective R (red), G (green) and B (blue) image data, i.e., image data of three colors, are processed in the reading mode; and respective Y (yellow), M (magenta), C (cyan) and K (black) image data, i.e., image data of four colors, are processed in the recording (printing) mode. Accordingly, when an image data transfer system of the monochrome-image mode is used in the color-image mode, an image data transfer of one line in the color-image mode takes a transfer time three or four times as much as in the monochrome-image mode. Accordingly, an image data process of one line in the color-image mode takes a processing time three or four times as much as in the monochrome-image mode.

To shorten this transfer/processing time, the color processing machine is preferred to use an image processor capable of inputting/outputting a plurality of items of image data simultaneously in parallel, and capable of applying data processes, such as correction and conversion, to a plurality of items of image data. Thereby, two colors (two series) or more of image data strings can be processed simultaneously in parallel in the color-image mode so as to increase the processing rate several times. In this case, however, since two colors (two series) or more of image data need to be transferred simultaneously in the color-image mode, the above-mentioned image processor cannot be used simply by a conventional image processing system having only one data transfer line exclusively for monochrome image data. Additionally, when the color processing machine using the above-mentioned image processor transfers and processes monochrome image data in the monochrome-image mode as performed in a conventional monochrome processing machine, the monochrome image data is processed series by series despite the image processor capable of processing two series or more of image data simultaneously; thus, the above-mentioned image processor cannot be fully utilized in the monochrome-image mode.

Data processes of the signal processing device disclosed in Japanese Laid-Open Patent Application No. 8-305329 are an insertion of "0" into line data by a switching control of the output data selector 9 by the CPU 12 in the line-memory mode, and a data conversion by the lookup table in the lookup-table mode. Thus, the signal processing device is not suitable for accelerating data conversion as above.

Besides, in an image data process, a pattern matching is frequently performed in various processing stages. For example, upon converting RGB image data into YMCK image data for recording, supplying the YMCK image data to a printer, and printing the YMCK image data on a sheet by the printer, it is preferable that a binary image, such as a character or a line, is binarized so as to record sharply. On the other hand, for a middle-tone image, such as a photograph, it is preferable that an application of a dot recording or a degree of a dot gradation is determined by converting image data into binary data or multivalued data (representing a small number of values); and by a gradation process (e.g., a dither process)) that realizes an area gradation (a middle tone) according to how many recording dots are distributed in a predetermined size, a smooth density transition is expressed. There is also a case where a binary image, such as a character or a line, and a bitmap image (a middle-tone image), such as a photograph or a picture, coexist in one document image. In this case, by using an image-area separation process of automatically judging whether RGB image data derives from a binary image area (hereinafter simply referred to as a character area), or a middle-tone area (hereinafter simply referred to as a photograph area), processes for the image data are automatically switched between a character-area process and a photograph-area process according to the judgment result, upon the gradation process.

Japanese Laid-Open Patent Application No. 5-48892 discloses a major example of the above-mentioned process switching technology, which is a digital color copying machine. This digital color copying machine comprises a means for judging a color from a color document, and a means for judging a character so as to divide the document into three area of a black character area, a color character area and a picture (photograph) area. Then, digital color copying machine performs processes suitable for the respective areas. Processes to be switched are as follows:

1) UCR process for adjusting an amount of black printer;

2) Filtering process, such as a smoothing process and an edge emphasis process; and 3) Gradation process for determining whether an area gradation (dither) for a photograph or a 1-dot gradation (binary) for a character, and a γ process involved therein.

In Japanese Laid-Open Patent Application No. 5-48892, the processes are switched according to areas as follows.

|  | UCR process | Filtering process | Gradation process (γ process) |
| --- | --- | --- | --- |
| Black character area | Large amount of black printer | Intense edge emphasis | Binary process |
| Color character area | Small amount of black printer | Intense edge emphasis | Binary process |
| Picture area | Small amount of black printer | Smoothing (Weak edge emphasis) | Dither process |

However, at boundaries between these three areas, properties of image data become discontinuous so as to cause image deterioration. Japanese Laid-Open Patent Application No. 7-162687 discloses a technology for preventing this image deterioration. In Japanese Laid-Open Patent Application No. 7-162687, the filtering process is not switched between two processes of a character process and a photograph process, but degrees of edge emphasis are switched variously according to a detected edge amount. Additionally, in Japanese Laid-Open Patent Application No. 9-321986, the gradation process (for a character area ~ for a photograph area) is not switched between two processes of a character process and a photograph process, but dither patterns used in a dither process in the photograph process are switched variously according to a detected edge amount.

These techniques prevent the image deterioration considerably. However, when a document includes a thick character, and when a character judgment width of an image area separation process is larger than the width of the character in the document, a photograph judgment occurs in the middle of the character so that a character judgment and a photograph judgment coexist in the same character; accordingly, at a character/photograph boundary, a flashing or a white spotting occurs in switching the gradation processes. That is, a photograph area is subjected to a dither process for an area gradation. Assuming that image data of a 4-pixel area in the center of an image area has a density of 64 (¼ of the maximum density 256), and when the image area is judged to be a character area, the image data becomes white "0" by binarization, and accordingly, the 4-pixel area within the character line width becomes white. However, when the image area is judged to be a photograph area, one of the four pixels becomes black "1" and the other three pixels become white "0" by area gradation expression, and accordingly, a flashing may occur in which a black pixel appears in a white part of a character area, or a white spotting may occur in which a white spot appears in a black part when the image data has a high density. That is, a character image edge may become blurred, or when the image data has a high density, white spots may appear in a black part.

Thereupon, in Japanese Laid-Open Patent Application No. 2001-57633, an image-area separation is performed to RGB color image data, and when a character areas represented by the resulting image-area separation signals are distributed within predetermined intervals, the image-area separation signals corresponding to the intervals are corrected to represent character areas. In this correction process, the image-area separation signal of a present pixel is corrected so as to be continuous to the image-area separation signal of a preceding pixel.

In the above-mentioned image-area separation, it is judged whether image data of a present pixel (being processed) is chromatic or achromatic, and whether the present pixel exists in a picture area, a character-inside area (within a line width), or a character-edge area, so as to generate image-area data. In this course, a pattern comparison is performed in which it is checked which of image distribution matrixes (reference matrixes or patterns) for an edge area, a dot area or a white background-area, matches pixel information data of a pixel matrix (a matrix or a pattern to be judged) consisting of the present pixel and its peripheral pixels. Then, the judgment result is provided for the present pixel in the matrix to be judged. However, this pattern comparison is performed to each of the pixels composing the pixel matrix one by one; therefore, the matching for the entire pixel matrix takes a long time. This is one of factors prolonging a data processing time of a color image process. Thus, it is preferred that the processing rate of the image-area separation is increased.

In a digital full-color copying machine, not only RGB image data and YMCK image data converted therefrom are multi-bit multivalued data which include many data bits, but also, three sets of read R, G and B image data and four sets of output Y, M, C and K image data have to be processed respectively. Therefore, the digital full-color copying machine involves data amounts and image processes several times as many as a monochrome copying, which largely increases a data processing time. Therefore, it is preferred that the processing rate of image data processes is further increased.

Additionally, for the purpose of preventing areas represented by the image-area separation signal from fluctuating (transiting), an image-area judgment is corrected or smoothed so that the areas stably become continuous. In this case, the image-area judgment result of a preceding pixel is referred to in the image-area judgment of a present pixel. To perform this reference, an image processor retains the image-area judgment result of a preceding pixel. The image processor combines the image-area judgment result of the preceding pixel with image data of the matrix to be judged including the present pixel, and provides an LUT (Look Up Table) with judgment results corresponding to the combinations, and reads judgment result data from the LUT. However, this decreases the image processing rate of the image processor. It is preferable that this decrease in the image processing rate is avoided.

Further, image data, which is read by a CCD and converted by an A/D conversion into digital data, is subjected to a shading correction. For the purpose of setting correction data used in this correction, a reference white plate is read by a scanner for one line; maximum and minimum values of image data for the one line are detected; further one line without illumination (reading light) is read, and maximum and minimum values thereof are detected; and, according to the image data of the reference white plate for the one line and the detected maximum and minimum values, correction coefficients (coefficients for correcting reading distortions in a main-scanning line) for respective pixels on one line are calculated, and are written in a shading correction memory. Upon scanning a document, correction, coefficients corresponding to the same pixel positions with read image data are read from the shading correction memory so as to multiply the read image data therewith. The detection of the above-mentioned maximum and minimum values decreases processing rates of the image processor for performing processes other than the above-described process of processing the data read by the CCD. The detection of the maximum and minimum values of image data for the entire one line or for each division in the one line is often necessary in other image processes than the setting of the shading correction data. It is preferable that the detection of these maximum and minimum values is prevented from decreasing the processing rates of the image processor.

SUMMARY OF THE INVENTION

It is a general object of the present invention to provide an improved and useful data conversion device, an image data processing device, an image processing device, a data conversion method, a pattern matching method, and an image data processing method in which the above-mentioned problems are eliminated.

A more specific object of the present invention is to provide a data conversion device which can perform a data conversion of input data by a conversion table at high speed with a small amount of data and memory capacity prepared for the data conversion, and a high-speed color image processing device using the data conversion device.

Another specific object of the present invention is to provide an image data processing device and a pattern matching method which can perform a pattern matching in an image-area separation at high speed and can make a stable image-area judgment by the image-area separation.

Still another specific object of the present, invention is to provide an image data processing device which can include an input-output interface enabling a high-speed processing using a same image processor both in a color image mode and a monochrome-image mode, and a multifunctional color image forming device having a high image-processing rate.

In order to achieve the above-mentioned objects, there is provided according to one aspect of the present invention a data conversion device comprising a storage for storing conversion data including at least one of a conversion table and interpolative calculation data, a buffer memory device capable of storing data input successively, and outputting a predetermined items of the stored data to a data processor simultaneously, and capable of temporarily storing the predetermined items of the processed data processed by the data processor, and outputting the predetermined items of the processed data, and a data processor receiving and processing simultaneously in parallel the predetermined items of the stored data output from the buffer memory device, outputting the predetermined items of the processed data simultaneously in parallel, and forming a plurality of identical conversion tables in the buffer memory device according to the conversion data stored in the storage, wherein the buffer memory device includes a memory controller being capable of allocating at least a part of a memory thereof for the conversion tables, and relating a plurality of series of data to be converted to the respective conversion tables formed in the memory so as to read converted data corresponding to the series of the data to be converted from the respective conversion tables simultaneously in parallel.

According to the present invention, a plurality of identical conversion tables are formed in the buffer memory device according to the conversion data for generating one conversion table. The memory controller relates a plurality of series of data to be converted to the respective conversion tables formed in the buffer memory device so as to read converted data corresponding to the series of the data to be converted from the respective conversion tables simultaneously in parallel. Therefore, a conversion rate (a data conversion amount/time) is increased.

In order to achieve the above-mentioned objects, there is also provided according to another aspect of the present invention an image data processing device comprising an image processor including a reference data storage storing reference data prepared in integral bytes in a one-dimensional serial arrangement converted from a two-dimensional matrix data set composed of binary pixel information data items, and a predetermined number of processor elements processing a predetermined number of integral-byte data sets simultaneously in parallel, each of the processor elements processing a one-byte data set, and a buffer memory device supplying the image processor with a plurality of subject data sets arranged in integral bytes in a one-dimensional serial arrangement converted from two-dimensional matrix data sets each composed of binary pixel information data items, wherein the processor elements judges whether or not the respective subject data sets match the reference data.

According to the present invention, the image processor is supplied with a plurality of the subject data sets arranged in integral bytes in a one-dimensional serial arrangement converted from the two-dimensional matrix data sets each composed of one-bit binary pixel information data items each corresponding to one pixel, wherein the processor elements of the image processor judges whether or not the respective subject data sets match the reference data; accordingly, judgements as to a plurality of two-dimensional matrix data sets can be obtained at one time. Additionally, the judgment is performed by a byte-data comparison of comparing each of the subject data sets having integral bytes with he reference data having the same integral bytes; therefore, the judgment can be performed at high speed.

In order to achieve the above-mentioned objects, there is also provided according to another aspect of the present invention an image data processing device comprising an image processor capable of inputting/outputting and processing a predetermined number n of multi-bit image data items simultaneously in parallel, where n is a number larger than one, an image port inputting/outputting at least one series of image data items arranged serially in time series, and a buffer memory device including at least one memory usable as a line memory for image data so as to store the series of the image data items, wherein the buffer memory device includes a memory controller capable of dividing each of the image data items of the series successively in time series into n series of image data items, and capable of extracting each of the image data items successively from the n series of the image data items so as to synthesize the n series of the image data items into the series of the image data items.

According to the present invention, by using the dividing function of the memory controller in a monochrome image mode, for example, one series (e.g., one line) of monochrome image data can be divided into n series (e.g., two series of a string of image data items of odd-numbered pixels and a string of image data items of even-numbered pixels), and the image data items of the respective series can be supplied to the image processor simultaneously in parallel, and be processed by the image processor simultaneously in parallel. Therefore, the monochrome image data can be processed at high speed. Further, by using the synthesizing function of the memory controller, the processed image data items of the n series can be synthesized into one line of the processed image data items so as to be output. Therefore, the processed image data items can be transferred through a data transfer line of a monochrome image processing system. These functions can be used also for image data of one color for one line in a color image mode that the image data can be processed at high speed.

Besides, in the color image mode, image data items of a plurality of colors (e.g., two colors) of RGB image data or YMCK image data of one line can be supplied to the image processor simultaneously in parallel, and be processed by the image processor simultaneously in parallel. Subsequently, by using the synthesizing function of the memory controller, the processed image data items of the n series can be synthesized into one series of the processed image data items so as to be output. Therefore, the color image data can be processed at high speed. Further, the processed image data items can be transferred through one data transfer line similar to the data transfer line of the monochrome image processing system.

Other objects, features and advantages of the present invention will become more apparent from the following detailed description when read in conjunction with the accompanying drawings.

BRIEF DESCRIPTION OF THE DRAWINGS

FIG. 3 is a block diagram illustrating main parts of an electric system of the copying machine shown in FIG. 1;

FIG. 7A is a block diagram illustrating a structure of an SIMD processor shown in FIG. 4A and FIG. 5;

FIG. 13A is a diagram showing segments of setting information written to an internal register of the SIMD processor shown in FIG. 5;

FIG. 13B is a diagram showing main items of the setting information shown in FIG. 13A;

FIG. 13C to FIG. 13E are diagrams showing examples of the setting information shown in FIG. 13A;

FIG. 14A to FIG. 14F are diagrams illustrating data reading/writing areas of a RAM 8K shown in FIG. 5;

FIG. 15 is a diagram showing segments of γ conversion data stored in a hard disk drive HDD shown in FIG. 3 according to the first embodiment of the present invention;

FIG. 20 is a diagram showing segments of γ conversion data stored in the hard disk drive HDD according to a third embodiment of the present invention;

FIG. 21 is a diagram illustrating a distribution, on a data RAM shown in FIG. 7A, of a group of parameters read from the HDD and written to the data RAM;

FIG. 22 is a diagram showing segments of γ conversion data stored in the hard disk drive HDD according to a fourth embodiment of the present invention;

FIG. 23 is a functional diagram illustrating data processes in an image-area separation performed by the SIMD processor 33 shown in FIG. 4A;

FIG. 30A to FIG. 30G show a variety of manners of converting parallel/serial data arrangement upon an image data transfer.

DETAILED DESCRIPTION OF THE PREFERRED EMBODIMENTS

A description will now be given, with reference to the drawings, of embodiments according to the present invention.

Embodiment 1

Figure 1:
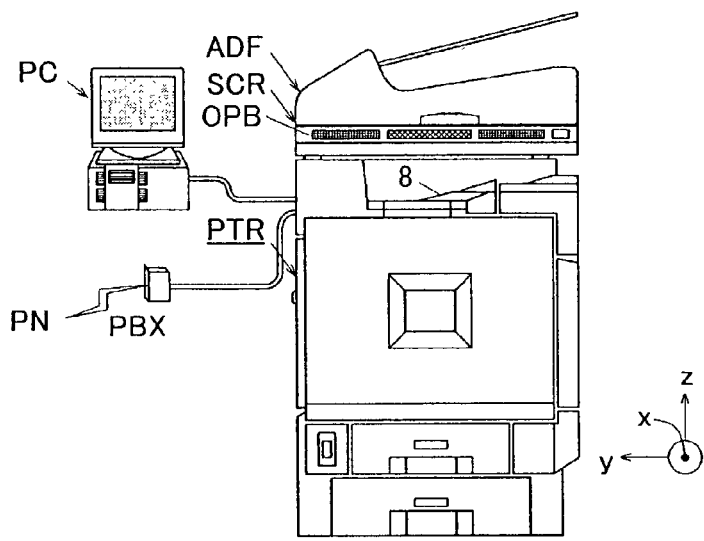
FIG. 1 is an illustration of a multifunctional full-color digital copying machine according to a first embodiment of the present invention.

FIG. 1 is an illustration of a multifunctional full-color digital copying machine according to a first embodiment of the present invention. This full-color copying machine mainly comprises an automatic document feeder ADF, an operation board OPB, a color scanner (an image reader) SCR, and a color printer (an image former) PTR. A color image data processing device ACP (shown in FIG. 3) provided in the machine is connected to a LAN (Local Area Network) that is connected to a personal computer PC, and an exchanger PBX that is connected to a phone network PN (a facsimile communication network). The exchanger PBX is connected to a facsimile control unit FCU (shown in FIG. 3) of a facsimile board. A printed sheet is delivered from the printer PTR onto a delivery tray 8.

Figure 2:
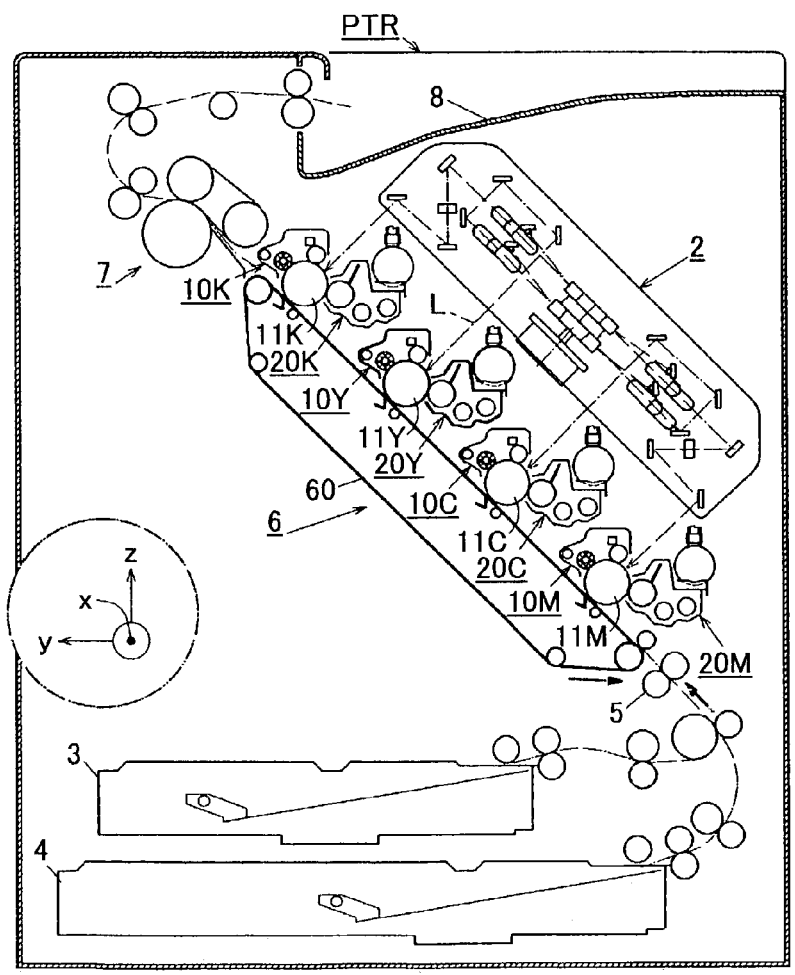
FIG. 2 is a vertical-sectional view of an image-forming mechanism of a color printer PTR shown in FIG. 1.

FIG. 2 shows a mechanism of the color printer PTR. The color printer PTR according to the present embodiment is a laser printer. This laser printer PTR comprises four toner-image forming units for forming images of colors magenta (M), cyan (C), yellow (Y) and black (K), respectively, the four toner-image forming units being arranged in this order along a transferring direction (from bottom right to top left in FIG. 2) of a transfer sheet. That is, the laser printer PTR is a full-color image forming device of a four-serial drum type.

Each of these toner-image forming units of magenta (M), cyan (C), yellow (Y) and black (K) comprises a photosensitive unit 10M, 10C, 10Y or 10K including a photosensitive drum 11M, 11C, 11Y or 11K, and a developing unit 20M, 20C, 20Y or 20K. The toner-image forming units are arranged at a predetermined interval in the transferring direction (on a line rising toward top-left at 45° with respect to y-axis on y-z plane) of a transfer sheet, with respective rotary axles of the photosensitive drums 11M, 11C, 11Y and 11K being positioned in parallel with a horizontal x-axis. A photosensitive drum 30-mm in diameter which has an organic photo conductor on the surface thereof is used as the photosensitive drum 11M, 11C, 11Y or 11K of the photosensitive unit 10M, 10C, 10Y or 10K.

Aside from the above-mentioned toner-image forming units, the laser printer PTR comprises an optical writing unit 2 using laser-scanning, feeding cassettes 3 and 4, a pair of resist rollers 5, a transfer belt unit 6 including a transfer-conveyance belt 60 bearing a transfer sheet and conveying the transfer sheet through transferring positions of the toner-image forming units, a fixing unit 7 of a belt fixation type, the delivery tray 8, and so forth. Additionally, the laser printer PTR comprises a manual-feeding tray, a toner replenishment container, a waste toner bottle, a double-side/reverse unit, a power source unit, and so forth, which are not shown in the figure.

The optical writing unit 2 comprises a light source, a polygon mirror, a f-θ lens, a reflective mirror, and so forth. According to image data, the optical writing unit 2 projects a laser light on the surface of the photosensitive drums 11M, 11C, 11Y and 11K while oscillating the laser light in direction x. Besides, in FIG. 2, a single-dashed chain line indicates a conveyance path for conveying the transfer sheet. The transfer sheet fed from the feeding cassette 3 or 4 is conveyed to the pair of the resist rollers 5 by conveying rollers while being guided by conveyance guides not shown in the figure. The transfer sheet, which is sent to the transfer-conveyance belt 60 according to a predetermined timing by the pair of the resist rollers 5, is borne on the transfer-conveyance belt 60, and is conveyed through the transferring positions of the toner-image forming units.

Toner images formed on the photosensitive drums 11M, 11C, 11Y and 11K of the respective toner-image forming units are transferred to the transfer sheet borne and conveyed by the transfer-conveyance belt 60 so that the toner images of the respective colors are laid over one another so as to form a color image on the transfer sheet, which is sent to the fixing unit 7. The toner images are fixed on the transfer sheet upon passing the fixing unit 7. The transfer sheet bearing the fixed toner images is delivered on the delivery tray 8. Thus, the toner images are directly transferred to the transfer sheet by a direct transferring method.

Next, a description will be given of a structure of the toner-image forming unit of yellow (Y). The other toner-image forming units have the same structure as the toner-image forming unit of yellow (Y). As mentioned above, the toner-image forming unit of yellow (Y) comprises the photosensitive unit 10Y and the developing unit 20Y. Aside from the photosensitive drum 11Y, the photosensitive unit 10Y comprises a brush roller applying a lubricant on the surface of the of the photosensitive drum, a blade capable of oscillating so as to clean the surface of the of the photosensitive drum, a static-elimination lamp projecting a light on the surface of the of the photosensitive drum, a non-contact charging roller uniformly charging the surface of the of the photosensitive drum, and so forth.

In the photosensitive unit 10Y, a laser light L modulated according to print data and deflected by the polygon mirror is projected, while being oscillated, by the optical writing unit 2 on the surface of the photosensitive drum 11Y uniformly charged by the charging roller applied with an alternating-current voltage; thereby, an electrostatic latent image is formed on the surface of the photosensitive drum 11Y. The electrostatic latent image formed on the photosensitive drum 11Y is developed by the developing unit 20Y, and becomes the toner image of yellow (Y). At the transferring position through which the transfer sheet on the transfer-conveyance belt 60 is conveyed, the toner image on the photosensitive drum 11Y is transferred to the transfer sheet. After the toner image is transferred, the surface of the photosensitive drum 11Y is applied with a predetermined amount of lubricant by the brush roller, and thereafter, is cleaned by the blade, and undergoes a static-elimination by the light projected by the static-elimination lamp so as to be ready for a formation of a next electrostatic latent image.

The developing unit 20Y contains a two-component developer including a magnetic carrier and a negatively charged toner. Additionally, the developing unit 20Y comprises a developing roller, a conveyance screw, a doctor blade, a toner density sensor, a powder pump, and so forth. The developing roller is so provided as to be partially exposed from an opening at a photosensitive-drum side of a developing case 1Y. The developer contained in the developing case undergoes a loss-frame agitation conveyance by the conveyance screw so as to be friction-charged. Then, a part of the developer is borne on the surface of the developing roller. The doctor blade regulates a thickness of a layer of the developer on the surface of the developing roller, and the toner included in the developer borne on the surface of the developing roller transfers to the photosensitive drum; thereby, the toner image corresponding to the electrostatic latent image emerges on the photosensitive drum 11Y. The toner density of the developer contained in the developing case is sensed by the toner density sensor. When the density is insufficient, the powder pump is driven so as to replenish the toner.

Next, a description will be given of the transfer belt unit 6. The transfer-conveyance belt 60 of the transfer belt unit 6 is a highly resistive single-layer non-edge belt having a volume resistivity of $10^9$-$10^{11}$ Ωcm, and is composed of PVDF (polyvinylidene fluoride). This transfer-conveyance belt 60 is wound around four grounded stretching rollers so that the transfer-conveyance belt 60 passes the transferring positions facing and contacting the photosensitive drums 11M, 11C, 11Y and 11K of the respective toner-image forming units. Among these stretching rollers, an entrance roller positioned upstream in the transferring direction of the transfer sheet, which is indicated by a double dashed chain line, is opposed by an electrostatic suction roller applied with a predetermined voltage from the power source. The transfer sheet passes between these two rollers, and is sucked electrostatically on the transfer-conveyance belt 60. Additionally, an exit roller positioned downstream in the transferring direction of the transfer sheet is a driving roller friction-driving the transfer-conveyance belt, and is connected to a driving source not shown in the figure. Besides, a bias roller is provided in contact with an outer surface of the transfer-conveyance belt 60. The bias roller is applied with a predetermined cleaning voltage from the power source. This bias roller removes extraneous substances, such as the toner, adhering on the transfer-conveyance belt 60.

Additionally, transfer-bias applying members are provided in contact with a back surface of the transfer-conveyance belt 60 forming facing-and-contacting parts facing and contacting the photosensitive drums 11M, 11C, 11Y and 11K. These transfer-bias applying members are stationary brushes made of mylar, and are applied with transfer biases from respective transfer bias power sources. The transfer biases applied by the transfer-bias applying members provide the transfer-conveyance belt 60 with transfer charges so that a transfer electric field having a predetermined intensity is formed between the transfer-conveyance belt 60 and the surface of the photosensitive drums at the respective transferring positions.

FIG. 3 shows main parts of an electric system of the copying machine shown in FIG. 1. The color document scanner SCR, which optically reads a document, condenses a reflected light of a lamp projection onto the document on a photoreceptive element through mirrors and lenses by a reading unit 21. The photoreceptive element (a CCD in the present embodiment) is provided in a sensor board unit (hereinafter referred to as SBU) of the reading unit 21. An RGB image signal converted into an electric signal in the CCD is converted into respective 8-bit multivalued R, G and B image data on the SBU, and thereafter, is supplied from the SBU to a first image processing unit IPU1 (hereinafter referred to as IPU1; IPU1 composing a data conversion device).

The IPU1 applies reading corrections (a CCD inter-line correction, a main-scanning resist adjustment, a shading correction, a dot correction, a vertical stripe correction, and a scanner γ conversion) to each input RGB image data (the R, G, B image data), and also performs an image area separation of judging whether an image represented by the RGB image data is an edge (a character edge) or an inside (within a line width: a character inside) of a part having a binary shade (hereinafter simply referred to as character), such as a character or a line, whether a halftone (dot) image, such as a photograph (hereinafter simply referred to as photograph), or further whether chromatic or achromatic. Additionally, the IPU1 performs a judgment of whether the RGB image data represents copy-prohibited materials, such as bills or securities, which are prohibited from being copied (hereinafter simply referred to as bill recognition).

Then, the IPU1 adds image-area data Fd representing results of the image area separation, i.e., judgment results, to the respective 8-bit multivalued R, G and B image data subjected to the reading corrections, and outputs these data to a compression/expansion and color data interface controller CDIC (hereinafter simply referred to as CDIC). When the result of the bill recognition indicates the copy-prohibited material, the IPU1 informs a system controller 106 (composing a data conversion device) thereof. In response to this information, the system controller 106 refers to image processing conditions (e.g., whether or not a full-color reading upon a copy instruction) attached to the document image reading by the color document scanner SCR. When copying conditions resulting in a faithful duplication are set, the system controller 106 provides the IPU1 with a scanner γ conversion for tarnishing an image which differentiates colors of the duplication image.

With respect to the RGB image data, YMCK image data, and the image-area data Fd attached thereto, the CDIC conducts a data transfer among the IPU1, a parallel bus Pb, and a second image processing unit IPU2 (hereinafter simply referred to as IPU2) for intermediate processes, and also conducts an image data transfer and a communication concerning other controls between the system controller 106 controlling the digital copying machine shown in FIG. 1 as a whole, and a process controller 101 mainly controlling operations of the reading unit 21 and image forming processes of the color printer PTR. The system controller 106 and the process controller 101 intercommunicate via the parallel bus Pb, the CDIC, and a serial bus Sb. The CDIC performs therein a data format conversion for a data interface between the parallel bus Pb and the serial bus Sb.

The RGB image data attached with the image-area data Fd (hereinafter also referred to simply as RGB image data) from the IPU1 of the color document scanner SCR is transferred or transmitted to the IPU2 or the parallel bus Pb via the CDIC. The RGB image data transmitted to the parallel bus Pb is written in an image memory MEM by an image memory access controller IMAC (hereinafter simply referred to as IMAC). The RGB image data read out from the image memory MEM to the parallel bus Pb is output to the FCU upon a facsimile transmission, or to the IPU2 otherwise.

The IPU2 converts the RGB image data into the respective 8-bit multivalued YMCK image data, and also applies other several image processes before and after the conversion. The YMCK image data is transmitted to the parallel bus Pb via the CDIC, and is stored in the image memory MEM by the IMAC; or the Y, M, C and K image data are output directly to third image processing units IPU3y, IPU3m, IPU3c and IPU3k (hereinafter simply referred to as IPU3y, IPU3m, IPU3c and IPU3k; composing a data conversion device), respectively.

The IPU3y, IPU3m, IPU3c and IPU3k apply respective-color printer γ conversions to the respective Y, M, C and K image data, and thereafter converts the Y, M, C and K image data into Y, M, C and K binary image data for printing, by a-gradation process, and outputs the Y, M, C and K binary image data to an image forming unit 105 of the color printer PTR.

As mentioned above, the CDIC has a job of storing the RGB image data or the YMCK image data in the image memory MEM and reusing the image data, and a job of converting the RGB image data into the YMCK image data by the IPU2, outputting the YMCK-image data to the IPU3y, IPU3m, IPU3c and IPU3k, and printing YMCK image data, without storing the RGB image data in the image memory MEM. As an example of storing the image data in the image memory MEM, upon making a plurality of copies from one document, the reading unit 21 is operated only once, and the RGB image data of the IPU1 or the YMCK image data converted therefrom by the IPU2 is stored in the image memory MEM so that the stored data is read a plurality of times. As an example of not using the memory MEM, upon making only one copy from one document, the RGB image data of the IPU1 is output to the IPU2 as it is, and the YMCK image data thereof is processed by the IPU3y, IPU3m, IPU3c and IPU3k for a printer output, wherein the image data needs not to be stored in the memory MEM.

First, in the case of not using the memory MEM, the image data transferred from the IPU1 to the CDIC is transmitted from the CDIC to the IPU2. The IPU2 applies the intermediate processes (a filtering process, a ground-color removal, a color conversion, i.e., a conversion to the YMCK image data, an under-color removal, a main-scanning magnification variation, a main-scan shift, a main-scan mirroring, a sub-scan culling, a masking process, and a binarization upon outputting a monochromatic character) to the RGB image data.

The IPU3y, IPU3m, IPU3c and IPU3k apply respective output corrections (printer γ conversion and the gradation process) to the Y, M, C and K image data. The Y, M, C and K image data made binary by the gradation process are supplied to respective laser modulators of Y, M, C and K image forming units in the image forming unit 105 of the color printer PTR, and binary electrostatic latent images for forming images of the respective colors are formed on the photosensitive drums 11M, 11C, 11Y and 11K. The gradation process includes a density conversion, a dither process, a random dither process, and so forth, a main process of which is an area approximation of gradation information.

In the case of storing the image data in the image memory MEM, and performing additional processes, such as a rotation of an image direction, and a synthesis of images, upon reading out the image data, the data transferred from the IPU1 to the CDIC is subjected to a primary compression for a bus transfer by the CDIC, and is transmitted to the IMAC via the parallel bus Pb. In the IMAC, an access control over the image data and the image memory MEM, a loading (a conversion of character code to character bits) of print data of the external personal computer PC (hereinafter, simply referred to as PC), a secondary compression for an effective use of the memory, are performed under the control of the system controller 106.

The data subjected to the secondary compression in the IMAC is stored-in the image memory MEM, and the stored data is read out when necessary. The read data is subjected to a secondary expansion (an expansion corresponding to the secondary compression) in the IMAC so as to be returned to the primary compression data, and is returned to the CDIC via the parallel bus Pb. In the CDIC, the primary compression data is subjected to a primary expansion (an expansion corresponding to the primary compression) so as to be returned to the image data, and is transmitted to the IPU2.

When the image data is the RGB image data, the image data is converted therein into the YMCK image data, and is compressed as described above so as to be written in the image memory MEM; or, the YMCK image data of the IPU2 are sent directly to the IPU3y, IPU3m, IPU3c and IPU3k so that images are formed by the image forming unit 105.

In the above-described course of processing the image data, the read/write control of the image data from/to the image memory MEM and the parallel bus Pb conducted by the IMAC, and the bus control between the IPU1/IPU2 and the parallel bus Pb conducted by the CDIC, realize multi-functions of the digital copying machine. In a FAX transmission function, which is one of the multi-functions, the RGB image data produced by the reading unit 21 of the color document scanner SCR is subjected to the reading corrections in the IPU1, and further converted into the YMCK image data in the IPU2 when necessary, and is transferred to the FCU via the CDIC and the parallel bus Pb. In the FCU, the image data is converted into data for the public line communication network PN (hereinafter simply referred to as PN), and is transmitted to the PN as FAX data. In a FAX reception, the line data from the PN is converted into the image data in the FCU, and is transferred to the IPU2 via the parallel bus Pb and the CDIC. When the received data is RGB image data, the data is converted into the YMCK image data in the IPU2; when the received data is YMCK image data, the received data is transmitted to the IPU3y, IPU3m, IPU3c and IPU3k without special intermediate processes being applied, and images are formed by the image forming unit 105.

Under a condition where a plurality of jobs, such as a copying function, a FAX transmission/reception function, and a printing function, operate in parallel, the system controller 106 and the process controller 101 control the allocation of the rights, among the jobs, to use the color document scanner SCR, the color printer PTR, the parallel bus Pb and the IPU2.

The process controller 101 controls the course of the image data. The system controller 106 controls the system as a whole, and manages the start of each resource. In order to select the functions of this multifunctional digital color copying machine, the selection is input by using the operation board OPB, and processing details for the selected function, such as the copying function or the FAX function, are also set. Processing details for the printing function responding to a print command of the personal computer PC are set by the print command of the personal computer PC.

The RGB image data undergoing the reading corrections and output by the color document scanner SCR is temporarily stored in the memory MEM; accordingly, various reproduced images can be ascertained by varying the processes applied by the IPU3y, IPU3m, IPU3c and IPU3k, and when necessary, by the IPU2. For example, varying γ conversion properties, fluctuating the density of the reproduced image, or changing the number of lines in a dither matrix can change an atmosphere of the reproduced image. In this course, the image needs not to be reread by the color document scanner SCR each time the processes are varied; instead, different processes can be performed to the same data any number of times by reading the image stored in the memory MEM.

Figure 4A:
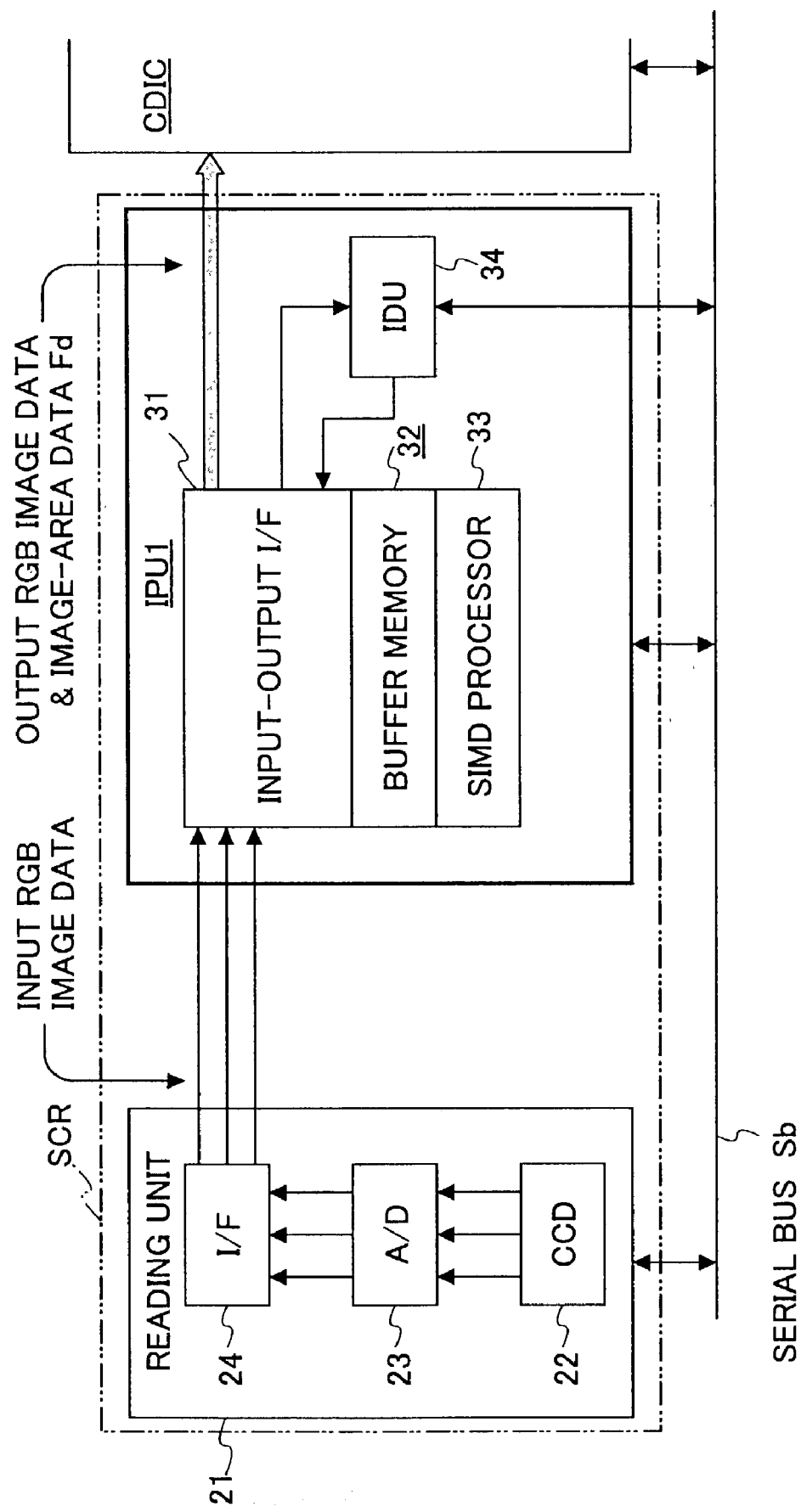
FIG. 4A is a block diagram illustrating an image processing system of a color document scanner SCR shown in FIG. 3.

FIG. 4A shows an image data processing system of the color document scanner SCR. R, G and B image signals produced by a CCD 22 are converted into 8-bit multivalued R, G and B image data by an A/D converter 23, and are supplied to the IPU1 via an interface (hereinafter referred-to as I/F) 24.

A main part of the IPU1 is a color image processing unit formed by combining an input-output I/F 31, a buffer memory 32, and an SIMD (Single Instruction Multiple Data) processor (a data processor) 33.

Figure 5:
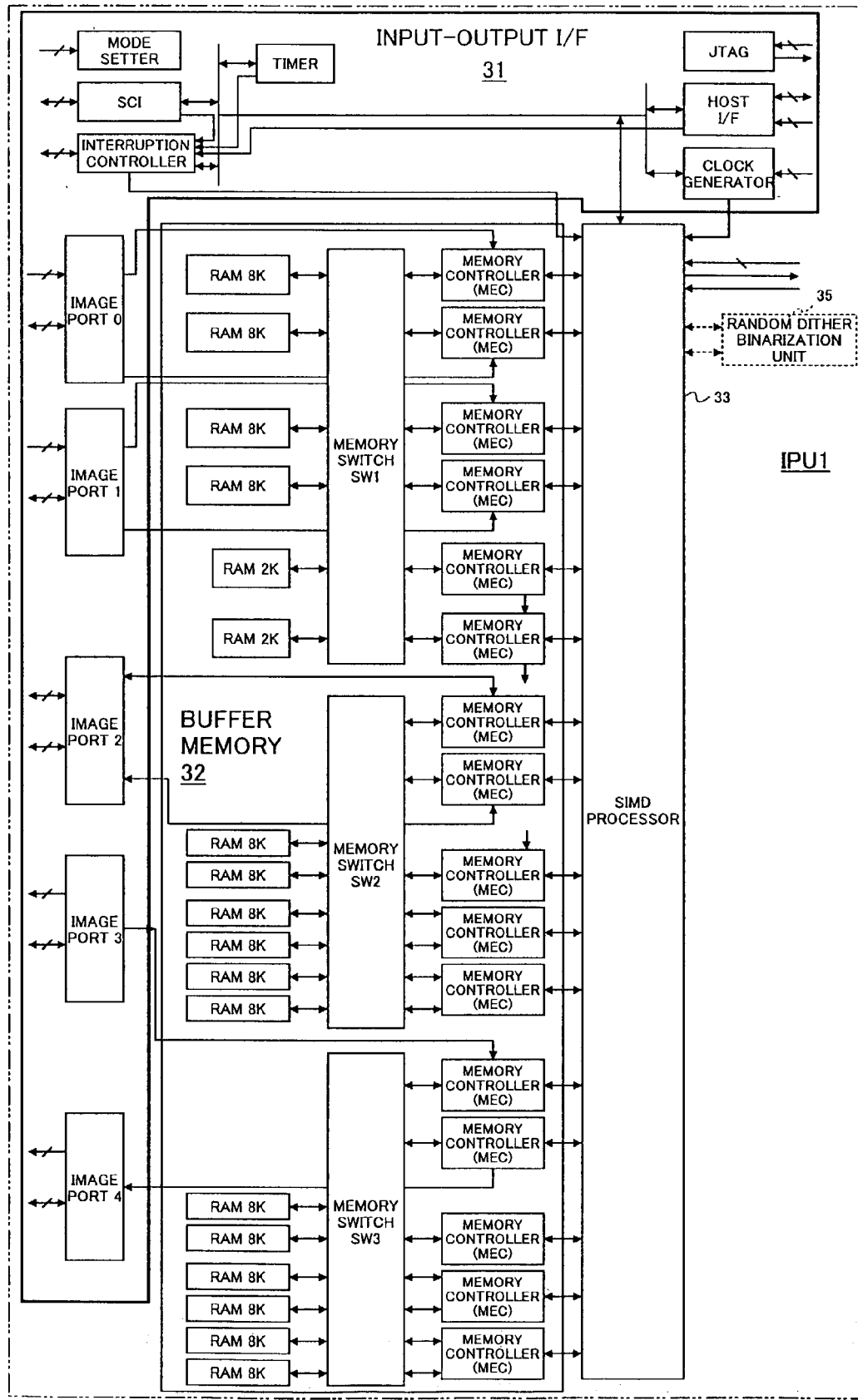
FIG. 5 is a block diagram showing a configuration of an input-output I/F and a buffer memory 32 of a first image processing unit IPU1 shown in FIG. 4A.

FIG. 5 shows a configuration of the elements of the color image processing unit (31+32+33) of the IPU1. The input-output I/F 31 includes image ports 0 to 4 inputting and outputting the image data, a mode setter (a mode designation decoder) exchanging control data, control signals or synchronizing signals, an SCI (Serial Communication Interface), an interruption controller, a JTAG (a job designation decoder/encoder), a host I/F, a clock generator, and a timer. The image ports 0 and 1 are used exclusively for inputting-the image data. The image port 2 is used for inputting and outputting the image data. The image ports 3 and 4 are used exclusively for outputting the image data.

The image ports are capable of inputting and/or outputting 2-byte data simultaneously in parallel, i.e., capable of inputting and/or outputting two series of image data simultaneously in parallel. The RGB and YMCK color image data (having multivalued gradation) are 8-bit; also, read data and/or printout data (having multivalued gradation) upon designating a monochrome (black-and-white image) reading and/or a monochrome (black-and-white) printing (upon designating a monochrome-processing/image mode), i.e., black-and-white image data, are 8-bit. Accordingly, upon the monochrome-processing mode, two items of image data, i.e., two-pixel image data, can be simultaneously input and/or output in parallel. Upon a color-processing mode, two items of one-pixel RGB image data can be simultaneously input and/or output in parallel.

Each of RAMs 8K (8K byte) of the buffer memory 32 has a capacity capable of storing one line of multivalued image data of 600 dpi parallel with a shorter side of an A3 sheet (8-bit: a kind of R, G, B, Y, M, C, K image data), and is used as a line buffer for inputting and/or outputting image data, or is used as an LUT. The RAMs 8K total 16, each of which can select reading/writing of two bytes at one time, or reading/writing of one byte at one time. Two RAMs 2K are used as a cyclic shift register cyclically shifting the image data so as to absorb a difference in rates of serial data transfer between a source of the image data transfer and a destination of the image data transfer.

These RAMs are connected to one of memory switches SW1 to SW3. Memory controllers (MECs) are provided between the image ports 0 to 4, the memory switches SW1 to SW3, and the SIMD processor 33. The memory controllers determine ON/OFF of switches inside the memory switches SW1 to SW3 according to an input/output mode designation provided by the SIMD processor 33. That is, upon an image-port/memory-controller/RAM using mode, the memory controllers arrange connections of the memory-switches, the RAMs to be used, and the SIMD-processor 33. Then, the memory controllers perform inputting/outputting (parallel, serial conversions and transfer) of the image data according to the designated mode.

When the designated mode is a writing to the LUT (conversion table), the memory controller writes γ conversion data provided by the SIMD processor 33 at an address designated by the SIMD processor 33 in the RAM 8K (LUT RAM) designated by the SIMD processor 33. When the designated mode is a reading of input color image data, the memory controller writes color image data supplied via the image port in the RAM 8K (input line buffer) designated by the SIMD processor 33.

When the designated mode is a conversion (e.g., γ conversion) of gradation properties of color image data by using the LUT, the memory controller reads γ conversion data corresponding to input image data by accessing the RAM 8K (LUT RAM) having the LUT, and writes the input image data of the image port or the RAM 8K (input line buffer) designated by the SIMD processor 33 in the SIMD processor 33 or the RAM 8K (output line buffer) designated by the SIMD processor 33. When the designated mode is a transmitting of color image data, the memory controller transmits color image data output by the SIMD processor 33 or color image data of the RAM 8K (output line buffer) designated by the SIMD processor 33, to the image port.

Other designated modes include a mode of writing color image data to the RAM 8K (input line buffer) that performs a parallel/serial conversion or a serial/parallel conversion, and a mode of reading color image data from the RAM 8K (output line buffer).

Figure 6A:
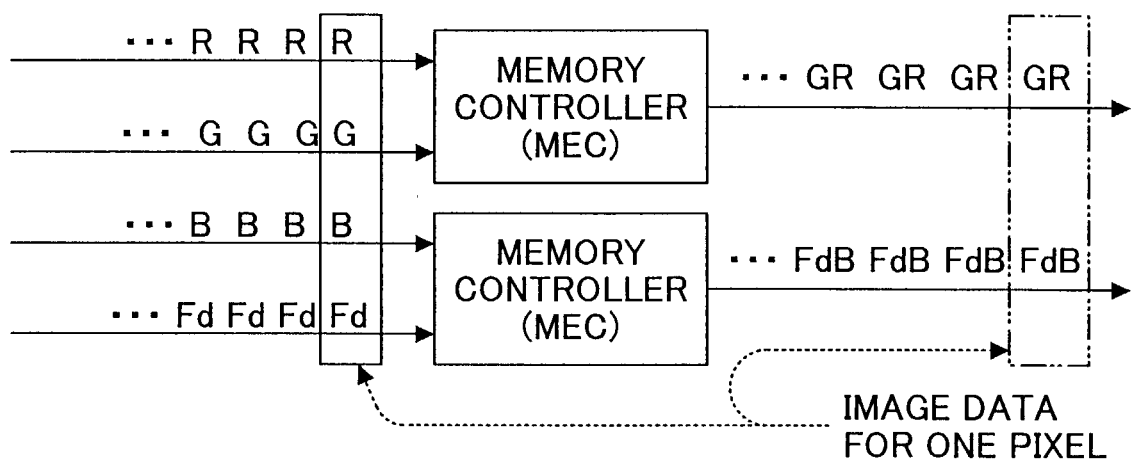
FIG. 6A to FIG. 6E show a variety of manners of converting parallel/serial data arrangement upon an image data transfer.

FIG. 6A to FIG. 6E show a variety of parallel/serial conversions or serial/parallel conversions of image data performed by the memory controller. FIG. 6A shows a manner of performing a parallel/serial conversion in which respective R, G and B image data (three series: one series includes one line of image data of one color) and image-area data Fd (one series: one line of image-area data) supplied from the image port, the RAM or the SIMD processor 33 are converted into a total of two series, wherein each of the memory controllers compiles two series into one series. In this example, the R image data and the G image data input in parallel in two series are converted into one series by an alternate pickup compilation; the B image data and the image-area data Fd input in parallel in two series are converted into one series by an alternate pickup compilation.

Figure 6B:
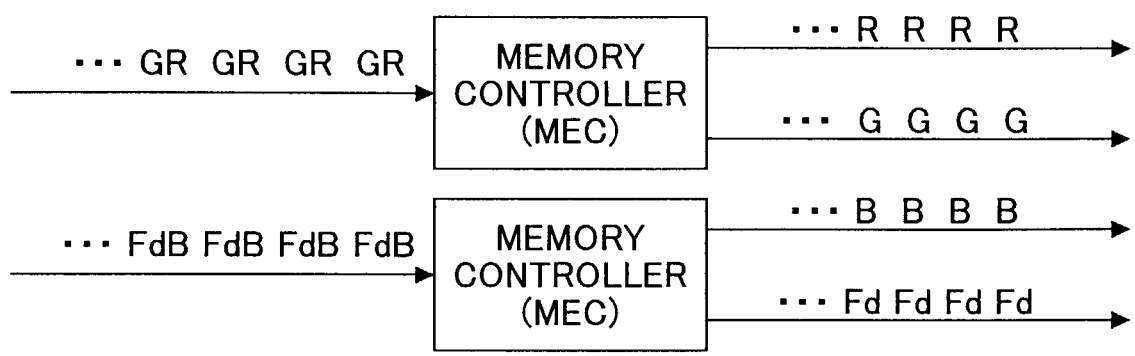

FIG. 6B shows a serial/parallel conversion in which the two series of serial data serial-converted in FIG. 6A are returned to the original four series of parallel data.

Figure 6C:
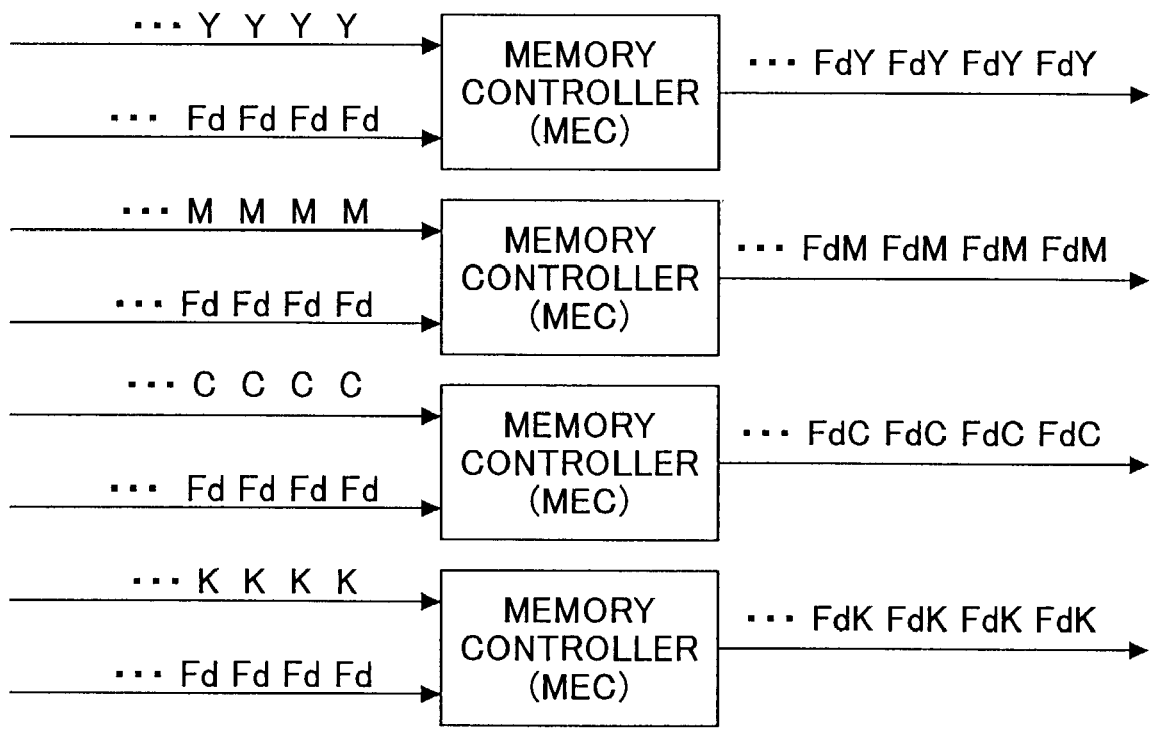

FIG. 6C shows a parallel/serial conversion performed in a similar buffer memory of the IPU2 upon outputting YMCK image data to the IPU3y, IPU3m, IPU3c and IPU3k, though not performed in the buffer memory 32 of the IPU1. In this parallel/serial conversion, five series of parallel data, i.e., respective Y, M, C and K image data (four series) and image-area data Fd (one series), are converted into four series of serial data. Each of the four series of serial data is transferred to the IPU3y, IPU3m, IPU3c or IPU3k, respectively. Each of the IPU3y, IPU3m, IPU3c and IPU3k performs an inverse conversion, i.e., a serial/parallel conversion, so as to divide the one series of serial data into two series of the Y, M, C or K image data and the image-area data Fd.

Figure 6D:
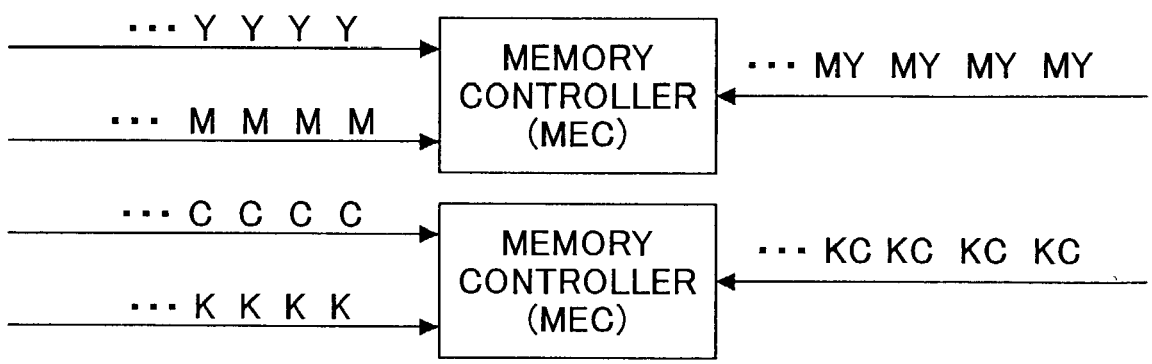

FIG. 6D shows a parallel/serial conversion performed in the similar buffer memory of the IPU2 upon serially outputting parallel YMCK image data generated by an SIMD processor of the IPU2 to the parallel bus Pb, though not performed in the buffer memory 32 of the IPU1. In this parallel/serial conversion, four series of the parallel data, i.e., respective Y, M, C and K image data (four series), are converted into two series of serial data. Upon receiving these two series of serial data, the IPU2 performs an inverse conversion, i.e., a serial/parallel conversion, so as to divide the two series of serial data into the original four series of the Y, M, C and K image data.

Figure 6E:
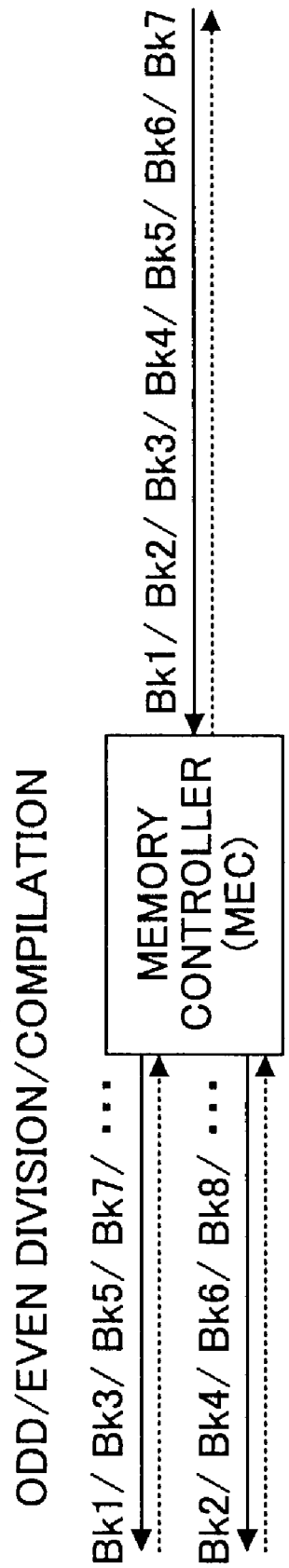

In FIG. 6E, one line of image data is divided into two series, i.e., one series of odd-numbered pixels and the other series of even-numbered pixels (indicated by solid-lined arrows); or, conversely, two series, i.e., image data string of odd-numbered pixels and image data string of even-numbered pixels are compiled into a series of one line (indicated by broken-lined arrows). FIG. 6E shows the division/compilation of monochrome image data Bk output by the reading unit 21 in a monochrome mode, and the same division/compilation applies to color image data of one color (e.g., R image data; R in place of Bk).

The SIMD processor 33 includes an input-output port capable of inputting/outputting 2-byte data simultaneously in parallel from/to outside (the memory controllers), which not only can input/output two bytes simultaneously, but also can input/output each of the two bytes individually. Any of the two-byte input/output and the byte-byte input/output can be selected.

The SIMD processor 33 may include a plurality of input-output ports, each of which can be selectively used for inputting/outputting.

Figure 7B:
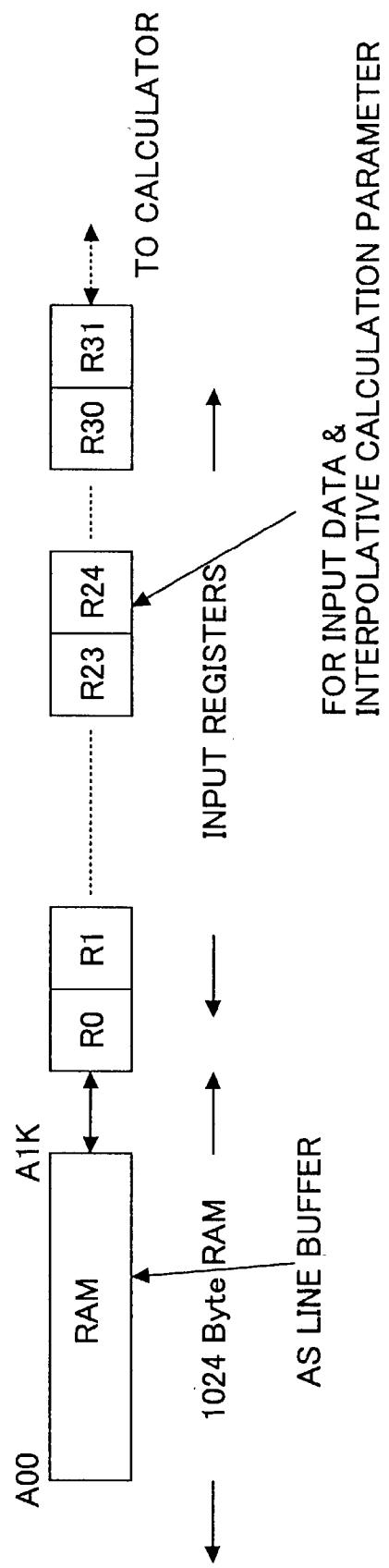
FIG. 7B is a block diagram illustrating a structure of a part of one of processor elements PE shown in FIG. 7A.

FIG. 7A illustrates an internal structure of the SIMD processor 33 shown in FIG. 5. FIG. 7B illustrates a structure of a part of one of processor elements PE shown in FIG. 7A. This SIMD processor 33 has local memory RAMs divided according to the processor elements PE, and controls memory areas and data paths, which are to be used, by a data bus control provided in a global bus processor 38. Input data and data to be output are stored in each of the local memory RAMs assigned as buffer memories, and are output to the outside by an external I/F 39. The global bus processor 38 provides same operation commands simultaneously to the 320 processor elements PE including the local memory RAMs and applying same image processes to 8-bit-or-more multivalued image data in parallel. An operation result of the processor element PE is stored again in the local memory RAM, and then is output to the memory controller via the external I/F 39.

A processing procedure for the processor element PE, parameters for the processing and so forth are exchanged between a program RAM 36 and a data RAM 37. Programs and data stored in a HDD (which is a storage, e.g., a nonvolatile memory, composing the data conversion device) is downloaded to the program RAM 36 and the data RAM 37 via the IMAC, the parallel bus Pb, the CDIC and the serial bus Sb, according to a command from the system controller 106. A DMAC (Direct Memory Access Controller) provided in the external I/F 39 performs this data transfer in response to the load command provided by the system controller 106. The process controller 101 controls the course of the data according to a request from the DMAC.

When contents of the image processes are varied, or when processing modes required by the system are changed, the selection by the system controller 106 as to the data set transferred from the HDD to the program RAM 36 and the data RAM 37 is changed by instructions from the operation board OPB or the PC. Alternatively, the data set of the HDD to be transferred to the program RAM 36 and the data RAM 37 may be changed therefor.

Referring again to FIG. 4A, an image processing function of the color image processing unit (31+32+33) of the IPU1 is determined according to a reading process program written in the program RAM 36 provided in the SIMD processor 33. The reading process program applies the CCD inter-line correction, the main-scanning resist adjustment, the shading correction, the dot correction, the vertical stripe correction, and the scanner γ conversion to the input RGB image data in this order. Further, the reading process program performs the image area separation based on the RGB image data having undergone the vertical stripe correction so as to generate the image-area data Fd, and adds the image-area data Fd to the output RGB image data having undergone the reading process correspondingly at a same position on the image, and outputs the data to the CDIC. Also, the reading process program supplies the RGB image data having undergone the vertical stripe correction to an exterior bill recognition unit 34.

The scanner γ conversion provides RGB image data as a reading address to six of the RAMs 8K of the buffer memory 32 (shown in FIG. 5) in which γ conversion LUTs (conversion tables) for the R, G and B image data are formed respectively so as to read γ conversion data corresponding to the provided image data, and supplies the γ conversion data to the SIMD processor 33.

More specifically, identical γ conversion tables (γ LUT-Rs) for R image data are written to two of the RAMs 8K; then, the γ LUT-Rs of the RAMs 8K are simultaneously in parallel supplied with odd-numbered R image data and even-numbered R image data provided simultaneously in parallel in two series of R image data string of odd-numbered pixels and R image data string of even-numbered pixels so as to read γ conversion data corresponding to the respective image data, and outputs the γ conversion data simultaneously in parallel to the SIMD processor 33. In addition, identical γ conversion tables (γ LUT-Gs) for G image data are written to other two of the RAMs 8K, and identical γ conversion tables (γ LUT-Bs) for B image data are written to the other two of the RAMs 8K; then, γ conversions of the G image data and the B image data are performed in the same manner as the γ conversion of the R image data so as to output the γ conversion data to the SIMD processor 33. It is noted that, since the SIMD processor 33 can accept only 2-byte data (γ conversion data of two pixels including an even-numbered pixel and an odd-numbered pixel of a same color) simultaneously, the γ conversions of the G image data, the B image data and the R image data are performed according to different timings.

Processes for generating the respective γ conversion LUTs to be written to the RAMs 8K for R, G and B image data will be described hereinafter with reference to FIG. 15, FIG. 16 and FIG. 17.

Figure 4B:
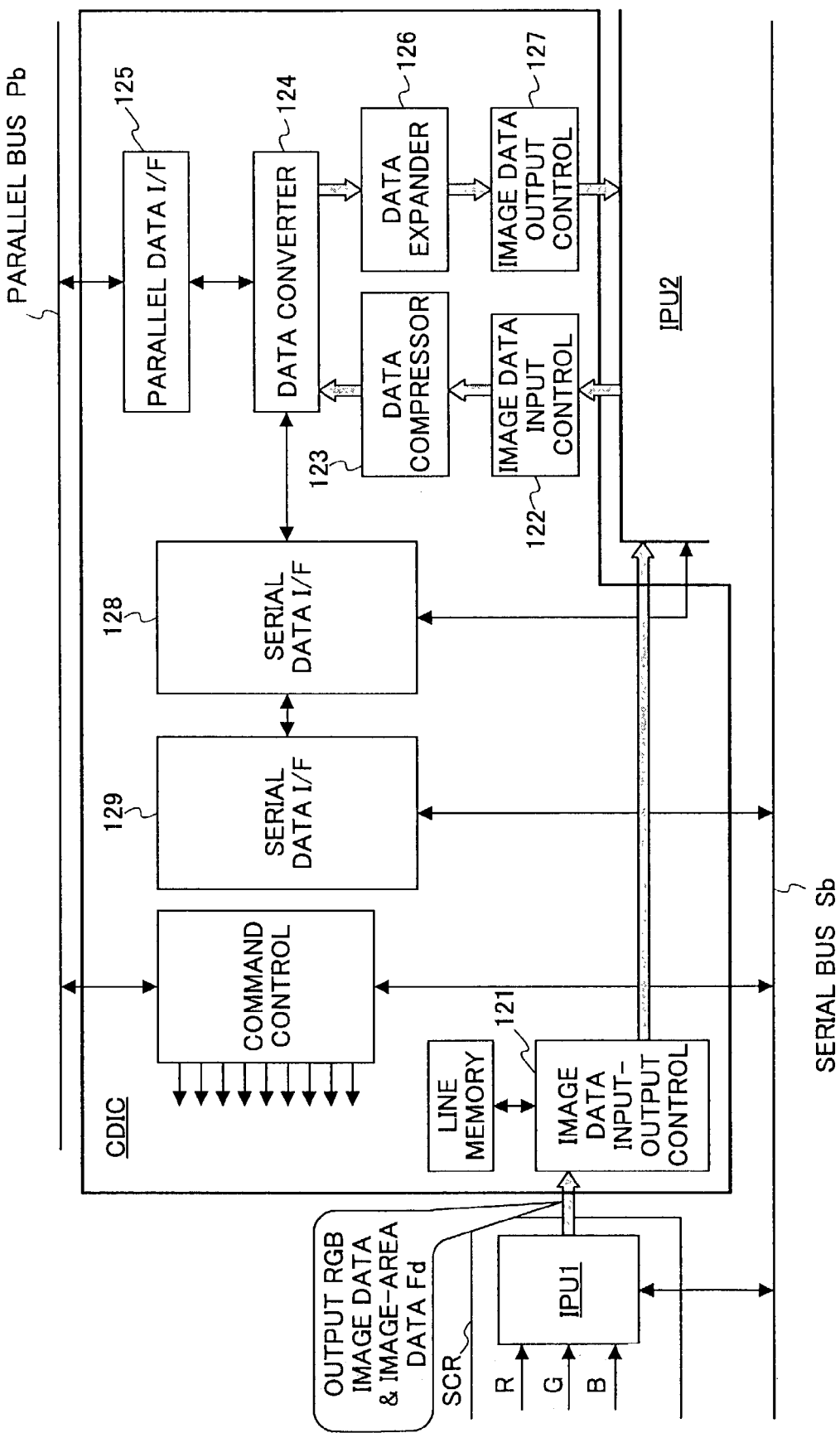
FIG. 4B is a block diagram illustrating a data transfer system of a color data interface controller CDIC shown in FIG. 3.

FIG. 4B show a configuration of the CDIC. An image data input-output control 121 receives the RGB image data (including the image-area data Fd) serial-converted by the IPU1 in the manner shown in FIG. 6A or in hereinafter-described manners (Cf, Df: X=Fd) shown in FIG. 30C and FIG. 30D, and outputs the RGB image data (including the image-area data Fd) to the IPU2. The IPU2 performs the serial/parallel conversion shown in FIG. 6B by a memory controller thereof so as to divide the RGB image data (including the image-area data Fd) into the respective R, G and B image data and the image-area data Fd. Then, the IPU2 applies the intermediate processes to the RGB image data so as to produce 8-bit multivalued YMCK image data of the respective YMCK recording colors. When an image formation (printing out) is designated, the IPU2 performs the parallel/serial conversion shown in FIG. 6C, or in the manners (Df: B=Y/M/C/K, X=Fd) shown in FIG. 30D, so as to output the YMCK image data to the IPU3y, IPU3m, IPU3c and IPU3k. When an output to the parallel bus Pb is designated, the IPU2 performs the parallel/serial conversion shown in FIG. 6D, or in hereinafter-described manners (Ef, Ff) shown in FIG. 30E and FIG. 30F, so as to output the YMCK image data to an image data input control 122 of the CDIC.

The image data received by the image data input control 122 is subjected to the primary compression by a data compressor 123 so as to enhance a transfer efficiency in the parallel bus Pb. The compressed image data is converted into parallel data by a data converter 124, and is transmitted to the parallel bus Pb via a parallel data I/F 125. Image data supplied from the parallel bus Pb via the parallel data I/F 125 is converted into serial data by the data converter 124. This data, which has been subjected to the primary compression for a bus transfer, is expanded by a data expander 126. The expanded image data is two series of serial data output from memory controllers shown in FIG. 6D, and is transferred to the IPU2 by an image data output control 127. The IPU2 performs a serial/parallel conversion so as to divide the two series of serial data into the Y, M, C and K image data.

The CDIC has functions of converting parallel data transferred by the parallel bus Pb and serial data transferred by the serial bus Sb. The system controller 106 transfers data to the parallel bus Pb, and the process controller 101 transfers data to the serial bus Sb. The data converter 124 and a serial data I/F 129 convert parallel/serial data conversion for communications on the parallel bus Pb and the serial bus Sb. A serial data I/F 128 is an I/F for the IPU2, and transfers serial data to the IPU2.

Figure 8A:
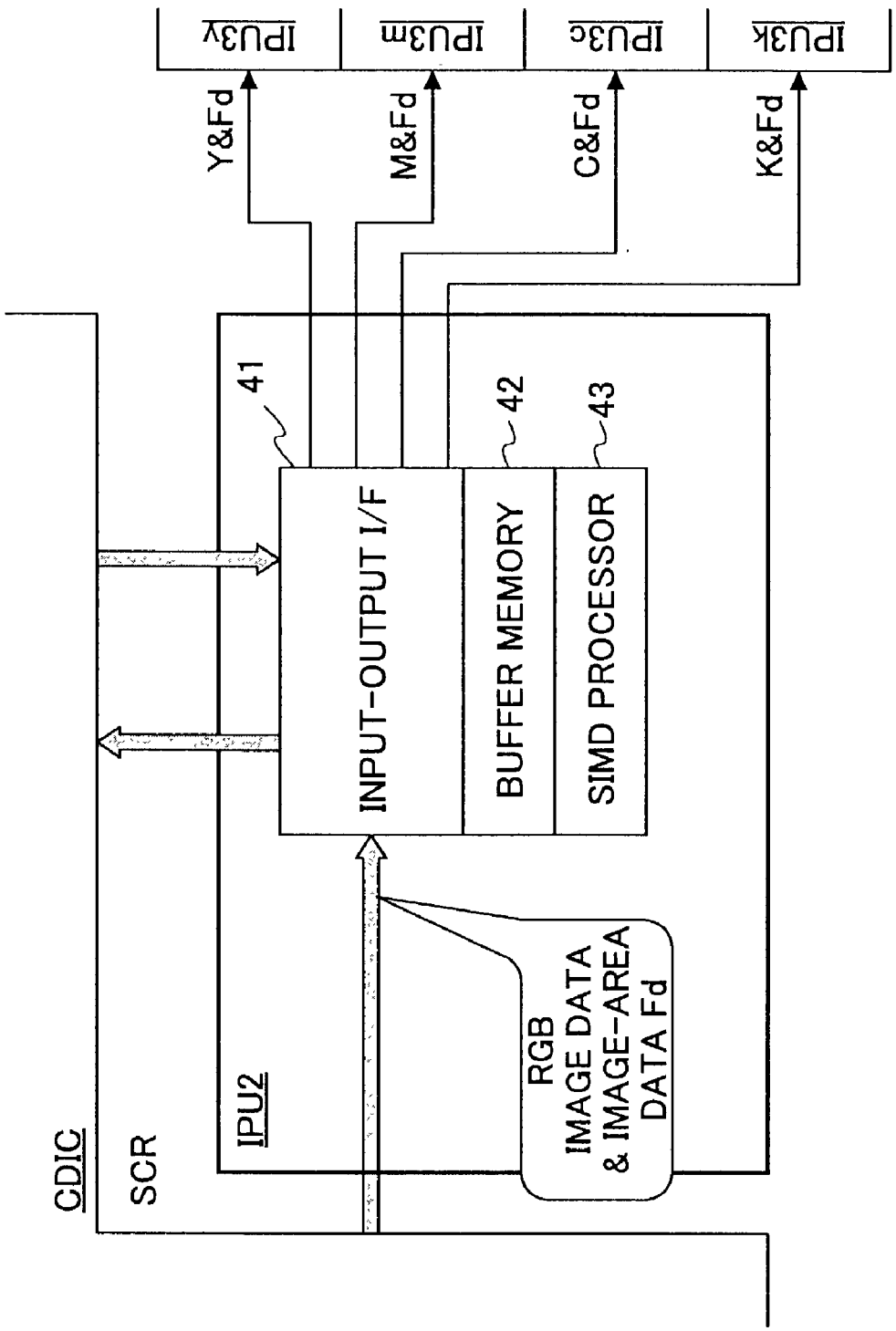
FIG. 8A is a block diagram illustrating an image processing system of a second image processing unit IPU2 shown in FIG. 3.

FIG. 8A shows a configuration of the IPU2. The IPU2 is a color image processing unit formed by combining an input-output I/F 41, a buffer memory 42, and an SIMD processor 43. This color image processing unit has a similar configuration as the color image processing unit (31+32+33) of the IPU1 shown in FIG. 5;

however, data and programs stored in a program RAM and a data RAM of the SIMD processor 43 of the IPU2 apply the intermediate processes (a filtering process, a ground-color removal, a color conversion, i.e., a conversion to the YMCK image data, an under-color removal, a main-scanning magnification variation, a main-scan shift, a main-scan mirroring, a sub-scan culling, a masking process, and a binarization upon outputting a monochromatic character) to the RGB image data.

Figure 8B:
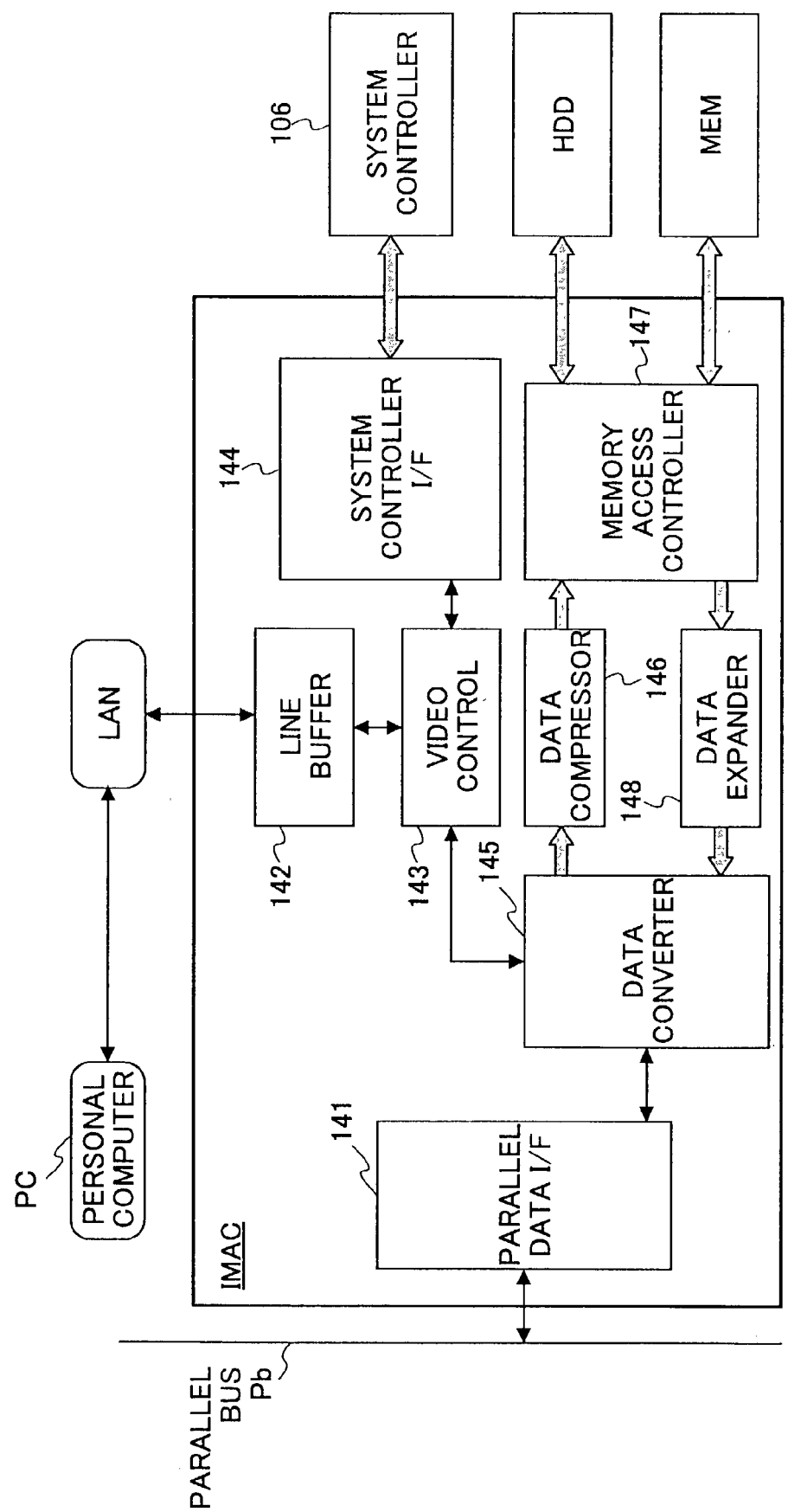
FIG. 8B is a block diagram illustrating a data transfer system of an image memory access controller IMAC shown in FIG. 3.

FIG. 8B shows a configuration of the IMAC. A parallel data I/F 141 manages input/output of image data form/to the parallel bus Pb, and controls storing/reading of the image data to/from the MEM, and controls a conversion of code data, which is input mainly from the external personal computer PC, to image data. The code data input from the external personal computer PC is stored in a line buffer 142. That is, data is stored in a local area. The code data stored in the line buffer 142 is converted into image data in a video control 143 according to a conversion process command supplied from the system controller 106 via a system controller I/F 144.

The converted image data or the image data supplied from the parallel bus Pb via the parallel data I/F 141 is stored in the MEM. In this case, a data converter 145 selects image data to be stored; a data compressor 146 performs the secondary compression so as to enhance efficiency in using memories; and a memory access controller 147 stores the compressed data in the MEM while managing addresses in the MEM. In reading the stored image data, the memory access controller 147 controls the reading address, and the read image data is expanded in a data expander 148. The expanded image data is data of the primary compression performed for being transferred in the parallel bus Pb, and is transmitted via the parallel data I/F 141 to the parallel bus Pb.

The facsimile control unit FCU shown in FIG. 3 which performs FAX transmission/reception, converts image data into a communication format, and transmits the data to the external line PN; conversely, the FCU converts data supplied from the external line PN into image data, and records (outputs) the image data in the image forming unit 105 via an external I/F and the parallel bus Pb. The FCU comprises a FAX image process, an image memory, a memory controller, a facsimile controller, an image compression/expansion, a modem, and a network control device. An output buffer function of image data is partially aided by the IMAC and the MEM.

In this FCU, upon starting to transmit image information, the facsimile controller orders the memory controller to read stored image information from the image memory successively. The read image information is decoded into the original signal by the FAX image process, and also is subjected to a density conversion process and a magnification varying process, and then is supplied to the facsimile controller. The image signal supplied to the-facsimile controller is subjected to an encoding compression by the image compression/expansion unit, and is modulated by the modem, and thereafter is transmitted to a destination via the network control device. Then, the transmitted image information is deleted from the image memory.

Upon reception, a received image is temporarily stored in the image memory in the FCU, and if the received image can be output (recorded) at this point, the received image is output (recorded) upon completion of the reception of images corresponding to one page.

Figure 9:
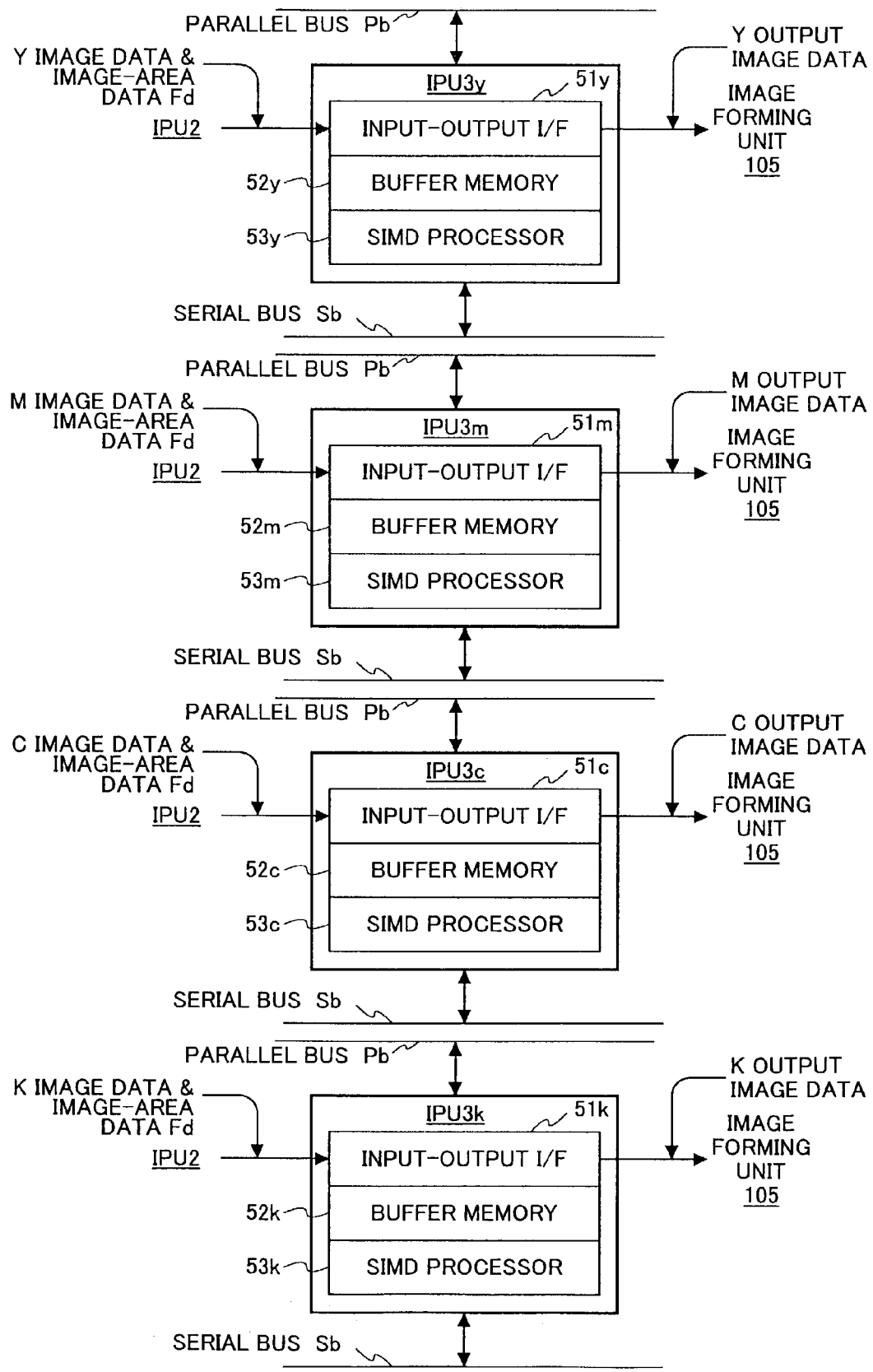
FIG. 9 is a block diagram illustrating an image processing system of third image processing units IPU3y, IPU3m, IPU3c and IPU3k shown in FIG. 3.

FIG. 9 shows a configuration of the IPU3y, IPU3m, IPU3c and IPU3k. The IPU3y, IPU3m, IPU3c and IPU3k have the same configuration, and perform substantially similar output corrections (a printer γ conversion and a gradation process). Herein, the IPU3y will be described. The IPU3y is a color image processing unit formed by combining an input-output I/F 51$y$, a buffer memory 52$y$, and an SIMD processor (a data processor) 53$y$. This color image processing unit has a similar configuration as the color image processing unit (31+32+33) of the IPU1 shown in FIG. 5; however, data and programs stored in a program RAM and a data RAM of the SIMD processor 53$y$ of the IPU3y apply the printer γ conversion for Y to the Y image data, and further convert the data into binary data for printing, by the gradation process. The gradation process includes a density gradation process, a dither process, a random dither binarization, one of which is performed according to an image process mode designation or the image-area data Fd. As for the IPU3y according to the present embodiment, the SIMD processor 53$y$ is connected to a random dither binarization unit 35 shown in FIG. 5. In FIG. 9, this random dither binarization unit 35 is-not shown.

Upon receiving serial data including image-area data Fd output from memory controllers shown in FIG. 6C, the IPU3y, IPU3m, IPU3c and IPU3k perform an inverse conversion of the parallel/serial conversion shown in FIG. 6C, i.e., a serial/parallel conversion shown in FIG. 30D (Dr), so as to divide the Y, M, C or K image data and the image-area data Fd. For example, the IPU3y parallel-converts one series of serial data including the Y image data and the image-area data Fd alternately into one series of the Y image data and one series of the image-area data Fd.

Upon receiving image data of two pixels (an odd-numbered pixel and an even-numbered pixel) simultaneously in parallel in two series of a data string of odd-numbered pixels and a data string of even-numbered pixels of one line, the two series of the two-pixel image data are supplied simultaneously to the IPU3y, IPU3m, IPU3c and IPU3k, and are processed simultaneously in parallel therein. The two series of the data string of the odd-numbered pixels and the data string of the even-numbered pixels, which are generated by the IPU3y, IPU3m, IPU3c and IPU3k for outputting to the image forming unit 105, are output to the image forming unit 105 after the data of the odd-numbered pixels and the data of the even-numbered pixels are compiled into a image data string of serial data in one series for printing out one line, as indicated by the broken-lined arrows in FIG. 6E (or as indicated by direction Bf in FIG. 30B). In a case where the odd-numbered pixels and the even-numbered pixels are exposed by different laser lights or different scanning lines in the image forming unit 105, the two series of the data string of the odd-numbered pixels and the data string of the even-numbered pixels are output, as they are, to the image forming unit 105. Although FIG. 6E shows a case of Bk image data processed by the IPU3k, the same applies to Y, M and C image data processed by the IPU3y, IPU3m and IPU3c.

In the above-described examples, the CDIC, which is an image data controller, and the IMAC, which is an image memory controller, are connected by the parallel bus Pb. Since the SCR, the IPU2, and the PTR, which are independent from one another, are not directly connected to the parallel bus Pb but to the CDIC or the IMAC, only the CDIC and the IMAC controls the use of the parallel bus Pb. Therefore, it is easy to control a mediation and a transfer with respect to the parallel bus Pb efficiently.

Figure 10A:
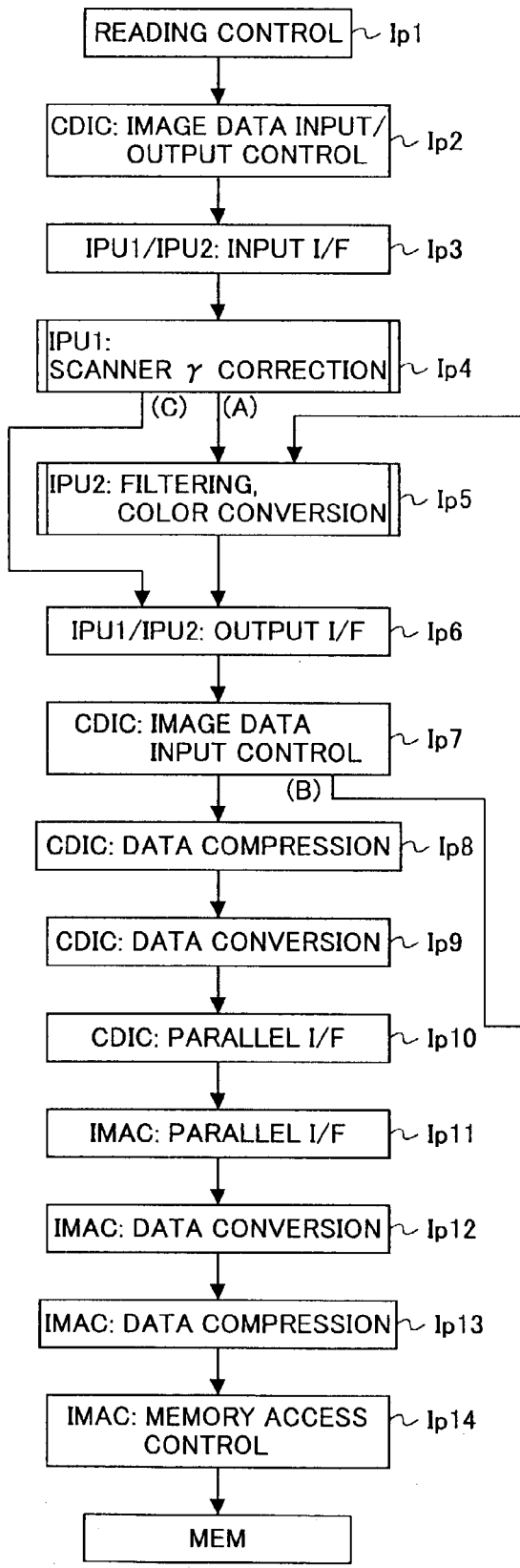
FIG. 10A and FIG. 10B are flowcharts for illustrating examples of courses of data in the image processing system shown in FIG. 3.
Figure 10B:
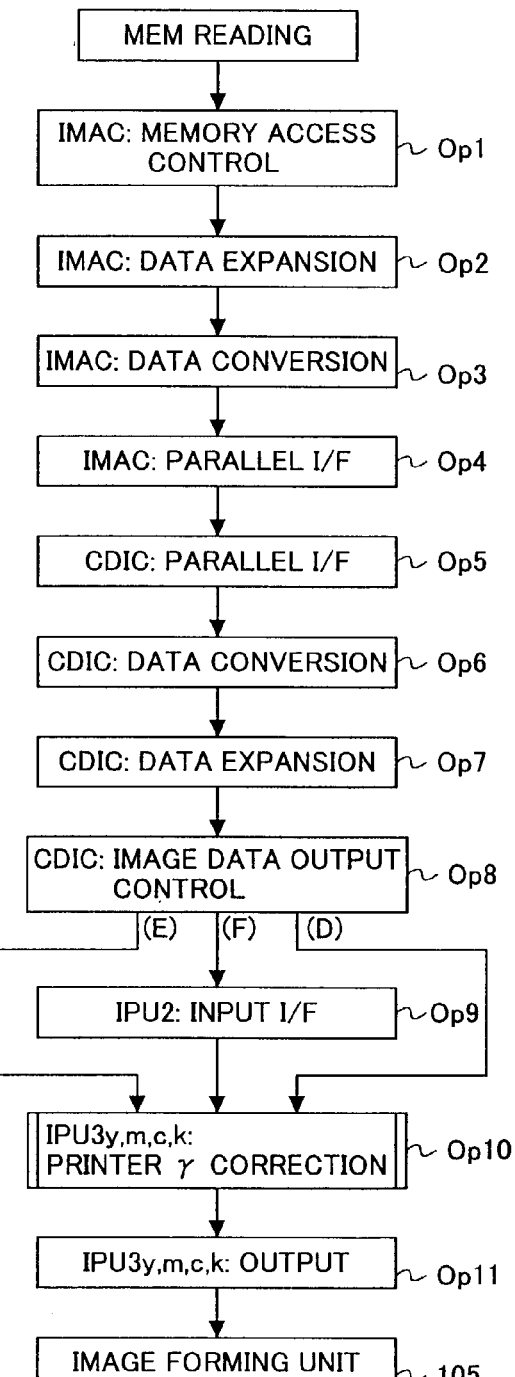

FIG. 10A and FIG. 10B are flowcharts of a process of storing an image in the image memory MEM and an image data process of reading an image from the image memory MEM. FIG. 10A shows a process of writing RGB image data produced by the SCR, or YMCK image data converted by the IPU2, in the MEM, i.e., transfer processes Ip1 to Ip14. FIG. 10B shows an image data process of reading image data from the MEM and outputting to the image forming unit 105 of the PTR, or reading RGB image data, converting the RGB image data into YMCK image data by the IPU2, and rewriting the YMCK image data in the MEM, i.e., transfer processes Op1 to Op13. The CDIC controls the data flow as above between busses and units.

Upon writing RGB image data produced by the SCR in the MEM, the CDIC selects a route (C) from step Ip4 to step Ip6. Upon printing YMCK image data converted by the IPU2 from RGB image data produced by the SCR, the CDIC selects a route (A) from step Ip4 to step Ip5.

Upon reading from the MEM, the CDIC selects a route (D) from step Op8 to step Op10 when read data is YMCK image data; the CDIC selects a route (E) from step Op8 via Ip5-Ip8 to step Op10 when reading RGB image data, converting the RGB image data into YMCK image data, and rewriting the YMCK image data in the MEM; the CDIC selects a route (F) from step Op8 to step Op9 when reading RGB image data, converting the RGB image data into YMCK image data, and printing the YMCK image data.

Each of the reading corrections of RGB image data by the IPU1, the intermediate processes including the conversion to YMCK image data by the IPU2, and the output corrections for printing by the IPU3k applies substantially similar image processes to each image data corresponding to each pixel on one line. Specifically, there are processes switching contents of the processes according to differences as to image-area data Fd; even in this case, the processes of the same contents are applied if the image-area data Fd are identical.

Accordingly, the IPU1 to IPU3 use the SIMD processors 33, 43, 53$y$, 53$m$, 53$c$ and 53$k$ to apply same image processes simultaneously in parallel to each of a number of multivalued gradation color image data by a number of the processor elements PE so as to enhance a color image processing rate for the above-mentioned reading corrections, the intermediate processes and the output corrections.

Besides, according to the present embodiment, each of the SIMD processors 33, 43, 53$y$, 53$m$, 53$c$ and 53$k$ comprises the 320 processor elements PE each processing 8-bit-or-more multivalued image data so as to process 320 items (320 pixels) of image data simultaneously. Matrixes used in the dither process may have sizes of 4×4, 8×8 and 16×16. In order to adapt to each of these sizes, and further to perform a plurality of matrix processes simultaneously in parallel for enhancing a dither process rate, the processor elements PE needs to be provided in number corresponding to integral multiples of 96 (6×16) which is the least common multiple of 6 and 16 because 4 and 8 are divisors of 16. Accordingly, in the present embodiment, the 320 [=96×3+32 (offsets)] processor elements PE are provided. These offsets are used upon processing image data of 96×3 pixels. Specifically, upon referring to image data of neighboring pixels outside the 96×3 pixels, the offsets are used for retaining or supplying the image data of the neighboring pixels, or applying intermediate operation processes thereto.

In a matrix segment including a plurality of pixels in two-dimensional directions on both sides of a pixel of concern (a present pixel), upon processing image data of the matrix segment, such as a filtering process (an MTF correction) applying an edge emphasis or a smoothing process to image data of the present pixel, or an edge detection of judging whether or not the present pixel is an image edge by comparing an image data distribution of the matrix with an edge pattern matrix, 16 processor elements need to be allocated as offsets on each side of the 96×3 processor elements PE (effective elements) actually calculate and output operation data; and the respective 16 processor elements need to be supplied with image data of neighboring pixels on both sides of the 96×3 pixels, and need to perform a sum-of-product calculation or a pattern comparison so as to supply the results to the effective elements. Thus, depending on contents of image processes, more than 96×3 processor elements are used in the simultaneous and parallel image processes.

Besides, upon performing an interpolative calculation of a linear approximation for generating the foregoing γ conversion LUTs, image data of neighboring pixels needs not to be referred to for the interpolative calculation of a present pixel. Therefore, all of the 320 processor elements PE can be used as effective elements for simultaneous and parallel interpolative calculations for image data of 320 pixels. However, in the present embodiment, since color image data to be subjected to γ conversions are 8-bit multivalued gradation data, interpolative calculations only need to be performed for a total of 256 multivalued gradation data 0-255. Therefore, all of the 256 multivalued gradation data 0-255 are calculated simultaneously by using the 256 processor elements PE.

Besides, when the number of multivalued gradation data exceeds 312, such as 512, 1024 or 2048, in cases the multivalued gradation data are of 9, 10, 11 or 12 bits, for example, when the number of multivalued gradation data is 512, first multivalued gradation data 0-319 are subjected to interpolative calculations at one time, and calculated γ conversion data are written to LUT RAMs; and next, the remaining multivalued gradation data 320-511 are subjected to interpolative calculations at one time, and calculated γ conversion data are written to LUT RAMs. Thus, γ conversions by interpolative calculations may be performed separately at a plurality of times.

Here, a description will be given of the generation of LUTs used in the γ conversion (the scanner γ conversion in the IPU1 and the printer γ conversion in the IPU3y, IPU3m, IPU3c and IPU3k) among the numerous image processes applying simultaneously in parallel identical processes to a multitude of image data which are performed by the IPU1, IPU2 and the IPU3y, IPU3m, IPU3c and IPU3k.

The hard disk HDD (shown in FIG. 3) includes image processing programs and data to be loaded to the respective program RAMs and the data RAMs (36 and 37 shown in FIG. 7) of the SIMD processors 33, 43, 53y, 53m, 53c and 53k.

When the system controller 106 performs initial settings for the system in response to a reset signal produced according to the power on, and a reset instruction from the operation board OPB or the host PC, the programs and the data stored in the-hard disk HDD for the SIMD processors 33, 43, 53y, 53m, 53c and 53k are loaded to the respective program RAMs and the data RAMs of the SIMD processors 33, 43, 53y, 53m, 53c and 53k by utilizing the above-described data transfer using the IMAC, the parallel bus Pb, the CDIC, the serial bus Sb and the process controller 101.

Figure 11:
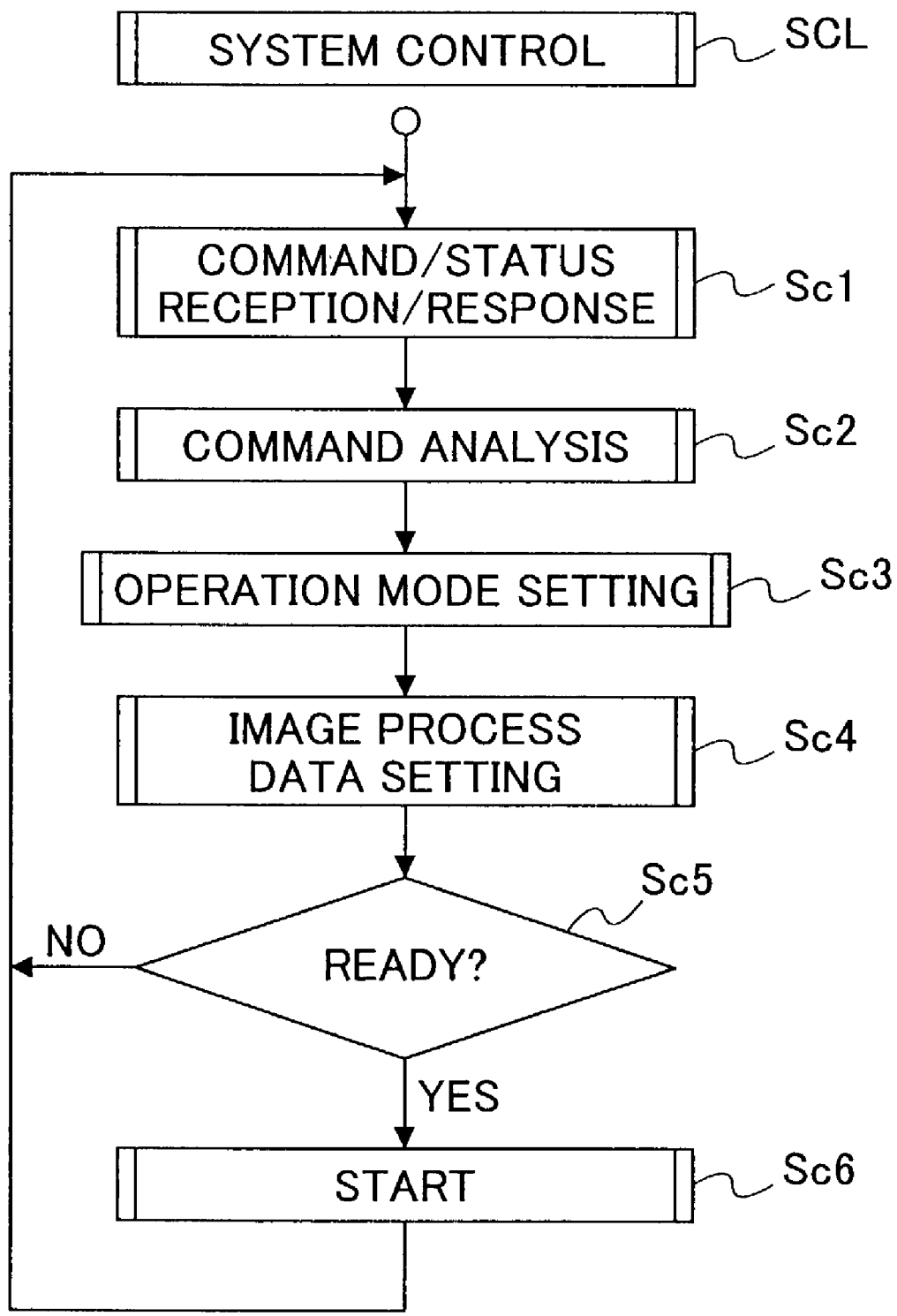
FIG. 11 is a flowchart illustrating a system control of a system controller shown in FIG. 3 in response to an image process command from an operation board OPB or a personal computer PC.

FIG. 11 is a flowchart of system settings of the system controller 106 in response to an image process instruction from the operation board OPB or the host PC. The system controller 106 exchanges commands, responses and status information between the OPB, the PC, the FCU, the SCR and the PTR. When the system controller 106 receives an image processing command (instruction) from the OPB, the PC or the FCU (step Sc1), the system controller 106 analyses the command, i.e., decodes the command data (step Sc2).

Then, the system controller 106 determines an operation mode of each of the system elements shown in FIG. 3 according to the command analysis result (Sc3), and transfers image process data corresponding to the operation mode (Sc4). Each of the system elements sets therein the received operation mode and the image process data, and communicates "ready" to the system controller 106 when the execution thereof is possible. When all of the system elements relating to the execution of the designated operation mode are ready (Sc5), the system controller 106 orders each of the system elements to commence the image process (Sc6).

Figure 12:
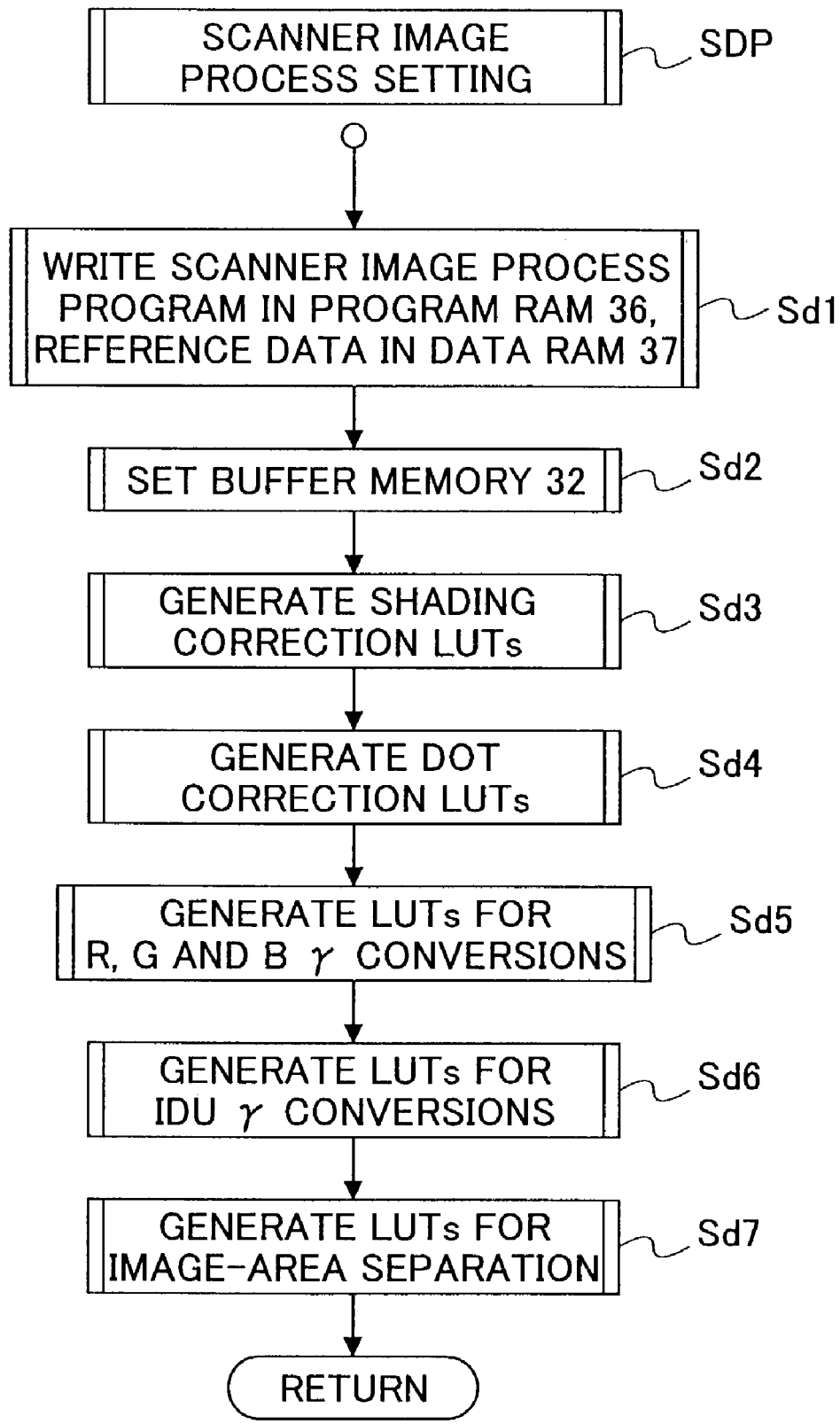
FIG. 12 is a flowchart of an initial setting performed by the IPU1 in response to an initial-setting instruction of the system controller shown in FIG. 3.

FIG. 12 is a flowchart of initial settings of the SIMD processor 33 of the IPU1 in response to an initial-setting instruction of the system controller 106. The system controller 106 supplies the SIMD processor 33 with an initial-setting command that includes a transfer source address and a download instruction of the programs and the image process data stored in the hard disk HDD for the SIMD processor 33. The DMAC of the external I/F 39 responses to this command, and writes program data at the designated-address in the program RAM 36, and writes the image process data (reference data) in the data RAM 37 (step Sd1).

Upon completion of this data transfer, in response to a "ready" notice of the DMAC, the SIMD processor 33 performs a setting of the buffer memory 32 (Sd2), a generation of shading correction LUTs (Sd3), a generation of dot correction LUTs (Sd4), a generation of LUTs for R, G and B γ conversions (Sd5), a generation of LUTs for IDU γ conversions (Sd6), and a generation of various LUTs for image-area separation (Sd7), according to an initial-setting program of the program RAM 36. Upon completion of these processes, the SIMD processor 33 provides a "ready" notice.

In the setting of the buffer memory 32 (Sd2), the usage allocation of the 16 RAMs 8K and the 2RAMs shown in FIG. 5 is performed according to memory allocations in the initial-setting program. Types of the usage include an input line buffer temporarily storing input image data, an output line buffer temporarily storing image data to be output, an intermediate line buffer temporarily storing image data being processed, an LUT, and a delay memory for data delay or synchronization.

These settings are realized by the SIMD processor 33 supplying each of the 16 memory controllers shown in FIG. 5 with corresponding memory-controller setting information written in a memory-controller setting register provided in the SIMD processor 33. An initial information of the memory-controller setting information is read from the data RAM 37 by the SIMD processor 33 according to the initial-setting program, and is written in the memory-controller setting register. Thereafter, when the image process starts, the memory-controller setting information is rewritten as the process proceeds. For example, with respect to (a memory controller controlling reading/writing of data from/ to) a RAM 8K designated as an input line buffer, "write" is designated upon a timing of receiving input image data; "read" is designated upon a timing of completion of receiving (writing) the image data, and then reading and processing the image data in every predetermined number.

FIG. 13A shows segments of the memory-controller setting information on the memory-controller setting register. FIG. 13B shows main items of the memory-controller setting information. Upon designating one (No. 1) of the 16 RAMs 8K shown in FIG. 5 as a line buffer for inputting image data, and writing input image data therein, the setting information supplied to a memory controller 1 controlling reading/writing of data from/to RAM 8K No. 1 designates "line buffer" and "write", as shown in FIG. 13C. A writing-designated area ranges from a start address to an end address. After writing input image data in the RAM 8K No. 1, upon reading the image data, the setting information designates "read", as shown in FIG. 13D. The setting information shown in FIG. 13E indicates that one area of RAM 8K No. 15 is used as a line buffer for inputting and outputting image data, and another area of the RAM 8K No. 15 is used as an LUT. By using this setting information, each of the RAMs 8K shown in FIG. 5 can be not only used as a line buffer or an LUT, but also can be used as a line buffer and an LUT at the same time. The line buffer and the LUT are accessed in time division, i.e., are accessed according to different timings.

FIG. 14A to FIG. 14F show a variety of manners of using each of the RAMs 8K. FIG. 14A shows a data reading/writing area of the RAM 8K upon using the RAM 8K as a line buffer memory (an input buffer, an intermediate buffer or an output buffer) for one line of image data parallel with a shorter side of an A3 sheet. FIG. 14B shows a manner of using the RAM 8K as a line buffer memory for two lines of image data parallel with a shorter side of an A4 sheet. FIG. 14C shows a manner of using the RAM 8K as a line buffer memory for one line of the A3 sheet and one LUT. FIG. 14D shows a manner of using the RAM 8K as one LUT. FIG. 14E shows a manner of using the RAM 8K as seven LUTs. The manner shown in FIG. 14E is preferable in a case where seven types of LUTs each for a monochromatic component are prepared, and one is selectively used real-time according to an image-area separation result, or according to a property designation from the OPB or the PC.

FIG. 14F shows a manner of using some of the RAMs 8K as memories for temporarily storing an LUT read from the HDD or an LUT generated by the SIMD processor 33. For example, an LUT10, an LUT11 and an LUT12 for RGB γ conversions, respectively, are generated by the SIMD processor 33 and stored; when the γ conversions for RGB image data is performed, the LUT10 for R image data is written in other two RAMs 8K, which are used to apply the γ conversions to one series of R image data of odd-numbered pixels and one series of R image data of even-numbered pixels simultaneously in parallel. The same applies to G image data and B image data.

Referring again to FIG. 13B, an access mode of "(½) odd-number synchronism detection/(½) even-number synchronism detection" designates parallel/serial conversions shown in FIG. 6A, FIG. 6C, FIG. 6D, FIG. 30A to FIG. 30G and so forth, or designates a compilation into one series indicated by the broken-lined arrows in FIG. 6E and FIG. 30A to FIG. 30G. For example, with respect to a memory controller compiling R image data and G image data into one series shown in FIG. 6A (or FIG. 30C), "(½) odd-number synchronism detection" and "(½) even-number synchronism detection" are designated for a first RAM 8K (or one area of one RAM 8K) outputting R image data a second RAM 8 K (or another area of the one RAM 8K) outputting G image data, respectively. The memory controller reads image data from the first RAM 8K upon an odd-numbered data-reading synchronizing signal (pulse), and reads image data from the second RAM 8K upon an even-numbered data-reading synchronizing signal (pulse).

In the generation of dot correction LUTs (Sd4), the generation of LUTs for R, G and B γ conversions (Sd5), the generation of LUTs for IDU γ conversions (Sd6), and the generation of various LUTs for image-area separation (Sd7) shown in FIG. 12, also when a change or an adjustment of LUTs is ordered from the OPB or the PC in a system control (SCL) shown in FIG. 11, the SIMD processor 33 is started according to a corresponding order of the system controller 106, so as to rewrite an LUT of the RAM 8K to an LUT corresponding to property designation data included in the order.

Here, a description will be given of contents of the generation of LUTs for R, G and B γ conversions (Sd5) performed by the IPU1 and the generation of LUTs for Y, M, C and K γ conversions performed by the IPU3y, IPU3m, IPU3c and IPU3k.

A reading-correction program stored in the hard disk drive HDD for the IPU1 includes storage addresses (for example, S1R, S1G and S1B in a first group shown in FIG. 15) of scanner γ conversion programs inserted at a location of γ conversion. When the reading-correction program is transferred from the HDD to the program RAM 36 of the SIMD processor 33 of the IPU1, R, G and B scanner γ conversion programs at the storage addresses are replaced with the storage addresses so as to be transferred. Even after the transfer to the program RAM 36, the programs in the program RAM 36 can be rewritten to programs of other groups shown in FIG. 15 (for example, programs at S3R, S3G and S3B) by providing a rewrite command to the system controller 106 by a changing operation (an rewrite order input) from the OPB or the host PC.

Similarly, Y, M, C and K output-correction programs stored in the hard disk drive HDD for the IPU3y, IPU3m, IPU3c and IPU3k, respectively, include storage addresses (for example, P1Y, P1M, P1C and P1K in a first group shown in FIG. 15) of Y, M, C and K printer γ conversion programs inserted at a location of γ conversion. When the Y, M, C and K output-correction programs are transferred from the HDD to the respective program RAMs of the SIMD processors 53y, 53m, 53c and 53k of the IPU3y, IPU3m, IPU3c and IPU3k, the printer γ conversion programs at the storage addresses are replaced with the storage addresses so as to be transferred. Even after the transfer to the respective program RAMs, the programs in the respective program RAMs can be rewritten to programs of other groups shown in FIG. 15 (for example, programs at P3Y, P3M, P3C and P3K) by a changing operation from the OPB or the host PC. Next, a description will be given of a generation of LUTs for γ conversions by interpolative calculation programs.

Figure 17:
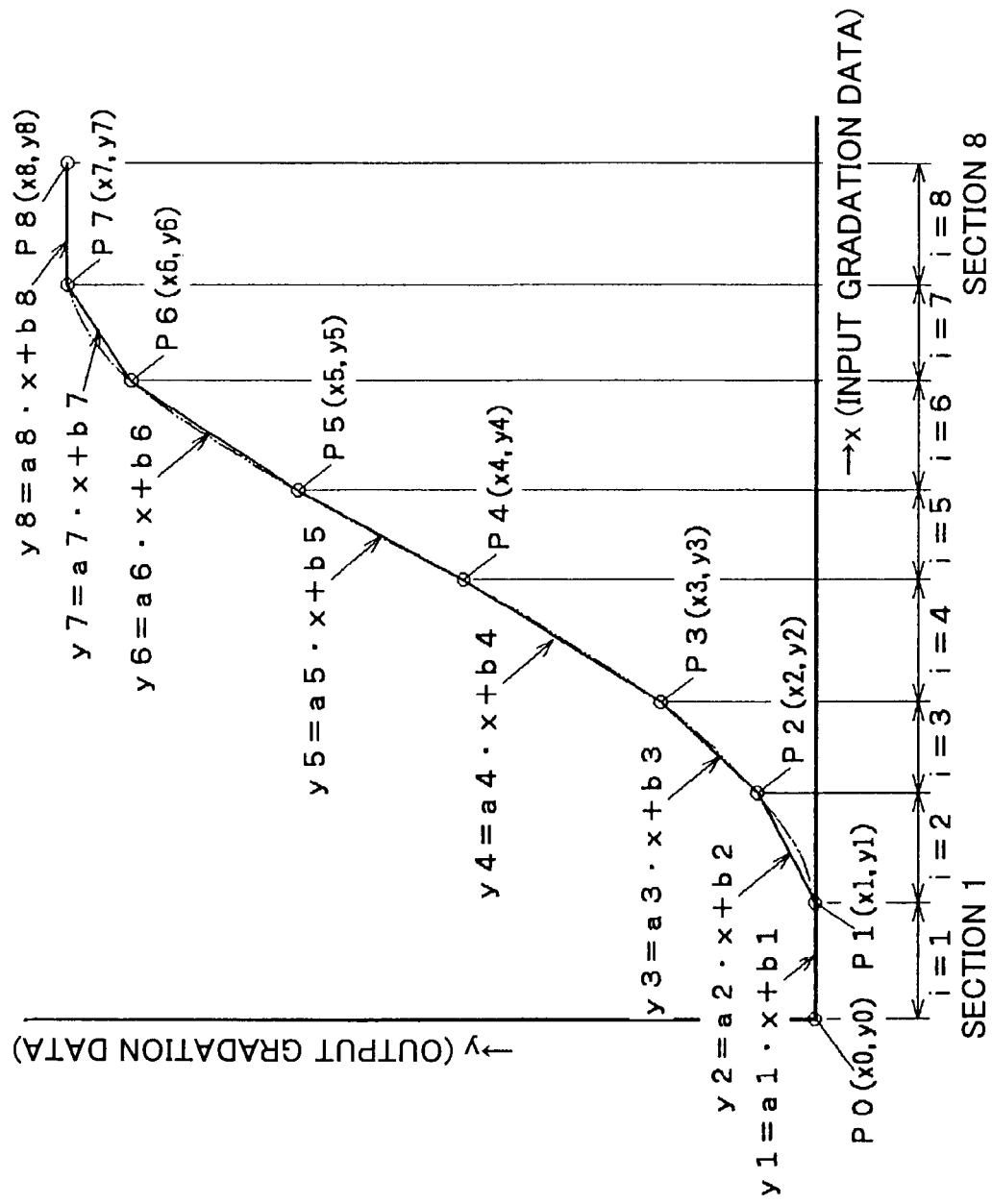
FIG. 17 is a graph showing a γ conversion property curve by a double-dashed chain line, and approximate lines by solid lines.

As shown in FIG. 17, in the present embodiment, in a γ conversion applied by the IPU1 to RGB image data output by the reading unit 21 and γ conversions applied by the IPU3y, IPU3m, IPU3c and IPU3k to YMCK image data output by the IPU2, input image data x (R, G, B/Y, M, C, K image data of the axis of abscissas) is converted (a conversion of gradation properties) into output image data y (not meaning yellow: the axis of ordinates) so that a conversion property becomes substantially S-shaped curve (for example) as indicated by a double-dashed chain line in FIG. 17. The range of numerical values 0-255 representable by the 8-bit input image dataxis divided into smaller m=8 sections (m: an integer larger than one), and each of the sections of the conversion property curve is approximated by a solid line shown in FIG. 17. Each gradation data representing 0-255 is subjected to a γ conversion by an interpolative calculation of a linear approximation using numerical epressions representing the resulting lines. The following is the sections to which these interpolative calculation expressions are applied.

| Section No. i | Boundary value | Calculation expression (parameters ai, bi) |
| --- | --- | --- |
| 1 | x1 | y1 = a1 · x + b1 |
| 2 | x2 | y2 = a2 · x + b2 |
| 3 | x3 | y3 = a3 · x + b3 |
| 4 | x4 | y4 = a4 · x + b4 |
| 5 | x5 | y5 = a5 · x + b5 |
| 6 | x6 | y6 = a6 · x + b6 |
| 7 | x7 | y7 = a7 · x + b7 |
| 8 | (x8: unnecessary) | y8 = a8 · x + b8 |

Besides, at a boundary between adjacent sections, the calculation expressions of the two sections coincide. For example, y1 equals y2 when providing x=x1 for y1=a1·x+b1 and y2=a2·x+b2

$$y1 = a1 \cdot x1 + b1 = a2 \cdot x1 + b2 = y2$$

The boundary value is xi (x1–x8), and the interpolative calculation parameters are inclination ai (a1-a8) and y-intercept (offset) bi (b1-b8).

Each of conversion programs listed in FIG. 15 calculates γ-converted output gradation data y corresponding to input gradation data x according to these calculation expressions. Besides, the numerous conversion programs listed in FIG. 15 are different from one another with respect to (parameters governing) linear equations or (boundary values governing) sections, i.e., different with respect to γ conversion properties (gradation conversion properties).

Figure 16:
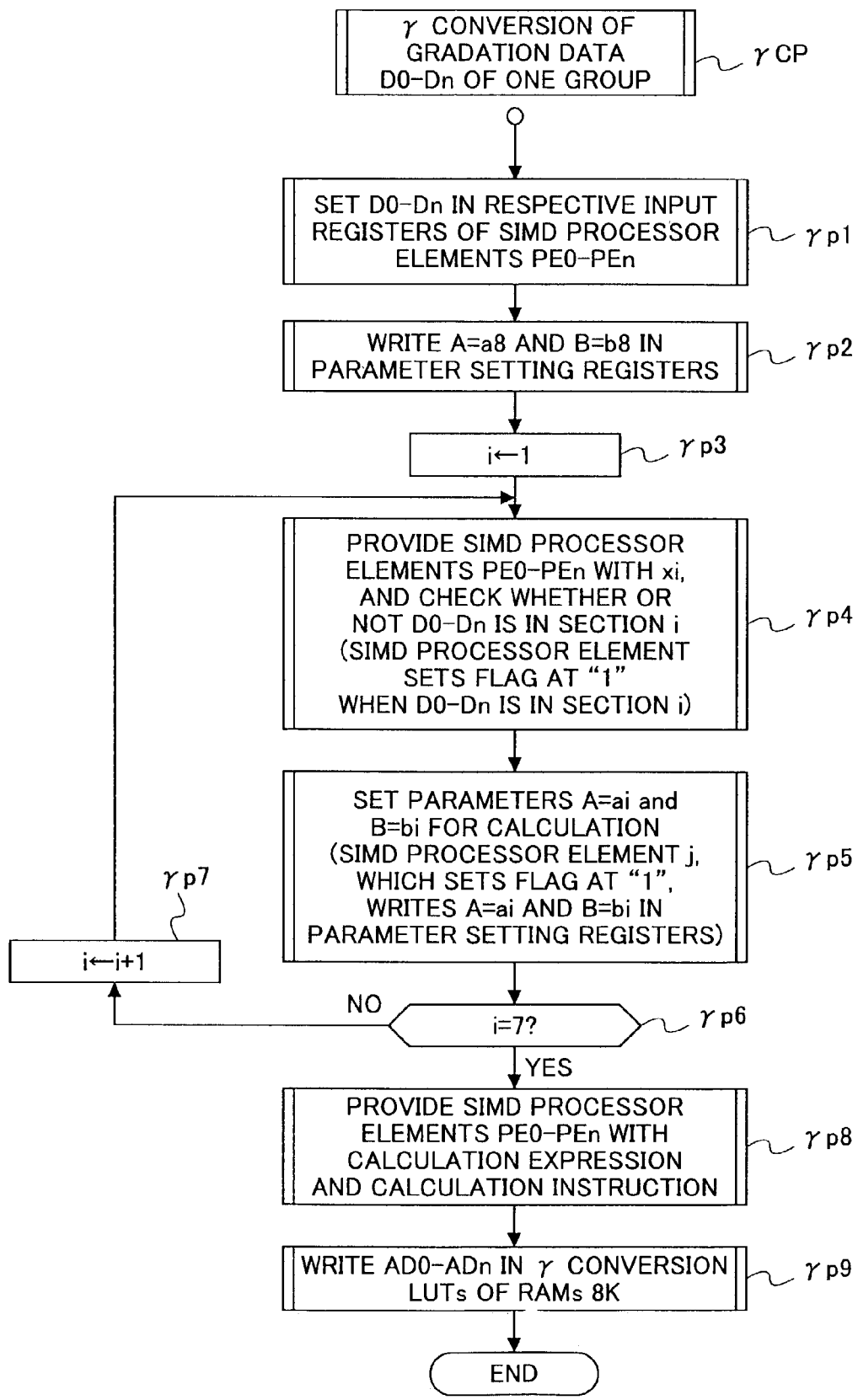
FIG. 16 is a flowchart of an interpolative calculation process performed by a global bus processor shown in FIG. 7A, based on γ conversion programs in a reading-correction program stored in a program RAM shown in FIG. 7A.

FIG. 16 is a flowchart of simultaneous and parallel γ conversions applied by the global bus processor (38) to n+1 (n=255) items of gradation data representing 0-255, based on the conversion programs of the program RAM (36) of the SIMD processors 33, 53y, 53m, 53c and 53k of the IPU1, the IPU3y, the IPU3m, the IPU3c and the IPU3k. In the present embodiment, the gradation data is 8-bit multivalued gradation data.

First, the global bus processor (38) initializes all of the processor elements PE0 to PEn, and sets n+1 (n=255) items D0 to Dn of gradation data representing 0-255 in respective input registers of the n+1 processor elements PE0 to PEn among the 320 processor elements PE (step γp1).

Next, the global bus processor (38) provides the interpolative calculation parameters am (a8) and bm (b8) of the last section i=m=8 to all of the processor elements PE0 to PEn, and each of the processor elements writes these parameters in its parameter setting register (step γp2)

Next, the global bus processor (38) determines the first section (i=1) as a section i to be calculated (step γp3), and provides the boundary value xi of the section i to the processor elements PE0 to PEn, and orders a comparison. Each of the processor elements PE0 to PEn checks whether or not the set gradation data Dj (each of D0 to Dn) is of the section i (xi<Dj: NO, i.e., xi>=Dj), and sets its flag at "1" when the set gradation data Dj is of the section i (step γp4). Next, the global bus processor (38) provides the parameters A=ai and B=bi governing the calculation expressions of the first section to the processor elements PE0 to PEn. At this point, the processor element, which sets its flag at "1" (i.e., from "0" to "1") for the first time, writes the parameters A=ai and B=bi in its parameter setting register (step γp5)

The above-described process, in which the section i to be calculated is the first section (i=1), is similarly repeated until the seventh section (m−1=7) by successively updating i to 2, 3, . . . (γp6/γp7/γp4/γp5/γp6). In this course, the processor element, which has already set its flag at "1" (i.e., no transition from "0" to "1"), does not overwrite the parameters A=ai and B=bi in its parameter setting register.

Upon completion of the process until the seventh section (m−1=7), each of the processor elements PE0 to PEn retains the parameters A=ai and B=bi corresponding to the section to which the set gradation data belongs to, in its parameter setting register.

At this point, the global bus processor (38) provides a calculation instruction of Y=A·x+B (x: the set gradation data) to the processor elements PE0 to PEn. Each of the processor elements PE0 to PEn calculates Y=A·x+B by using the parameters A=ai and B=bi retained in its parameter setting register, and stores data representing the calculated Y, i.e., γ-converted gradation data, i.e., γ conversion data, in its output resister (γp8) The global bus processor (38) writes the data (AD0 to ADn: the calculated Y) stored in the output resisters of the processor elements PE0 to PEn to output data areas of the respective RAMs of the processor elements, and orders the memory controller (shown in FIG. 5) designated as conducting reading/writing of γ conversion LUTs by the memory-controller setting register shown in FIG. 13 A to read the data from the output data areas. The memory controller writes the γ conversion data (γ conversion table) correspondingly to the gradation data representing 0-255, in a designated area in the RAM 8K designated as an LUT by the setting information (γp9)

In the above-described interpolative calculation according to the present first embodiment, the conversion of items D0 to Dn of gradation data is completed by the setting of one group of items D0 to Dn of gradation data in the processor elements PE, the simultaneous supply of the boundary value of the section i followed by the simultaneous supply of the interpolative calculation parameters of the section i to the processor elements, the m-time repetition of these simultaneous supplies to the section i (i=1 to m), and one designation of calculation expressions and one calculation instruction.

The processor elements perform only one calculation; thus, a conversion rate is high. The image processor (33) has a small number of data processing steps, when a total of 256 items of gradation data representing 0-255 are γ-converted simultaneously by using the 256 processor elements among the 320 processor elements (PE). Compared to a conventional case where the γ conversion of gradation data is repeated 256 times, the number of steps is largely reduced, and a generation rate of γ conversion LUTs is high.

The above-described γ conversion can be changed by rewriting the scanner γ conversion programs in the reading-correction program written in the program RAM (36) of the SIMD processor 33 of the IPU1, or the printer γ conversion programs in the output-correction programs written in the program RAMs of the SIMD processors of the IPU3y, IPU3m, IPU3c and IPU3k, with other programs stored in the HDD which have different γ conversion properties.

Figure 18:
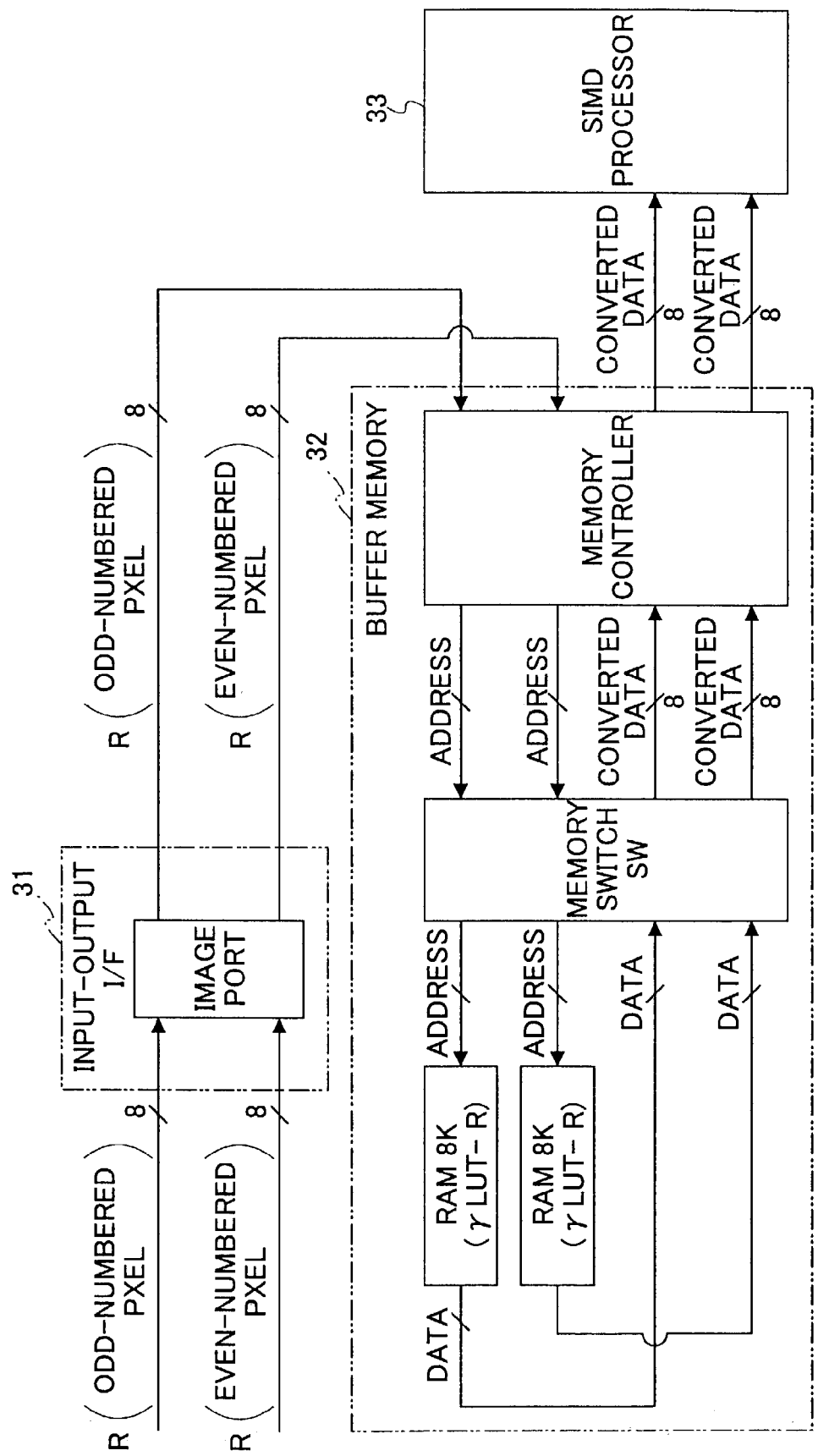
FIG. 18 is a block diagram illustrating courses of image data upon a γ conversion of R image data using a conversion table generated by an interpolative calculation process.

Regarding the γ conversion table written in the RAM 8K in step γp9 in FIG. 16, when the γ conversion is performed, one conversion table (γ LUT-R) is written in the two RAMs 8K, as shown in FIG. 18, one of which is allocated for the γ conversion of image data of odd-numbered pixels and the other is allocated for the γ conversion of image data of even-numbered pixels. FIG. 18 shows the course of data upon the γ conversion of R image data. The same applies to the γ conversions of G image data and B image data. In FIG. 18, one series of R image data of odd-numbered pixels and one series of R image data of even-numbered pixels on the same line, each odd-numbered pixel and each even-numbered pixel being adjacent on an image, are supplied to a memory controller via one image port simultaneously in parallel. The memory controller-provides the first RAM 8K storing the first γ LUT-R with an LUT access address including R image data of the odd-numbered pixel plus a write-start address of the first γ LUT-R as a reading address, and simultaneously in parallel provides the second RAM 8K storing the second γ LUT-R with an LUT access address including R image data of the even-numbered pixel plus a write-start address of the second γ LUT-R as a reading address. Then, first γ conversion data (data in the first γ LUT-R) and second γ conversion data (data in the second γ LUT-R) are read from the addresses, and the read data are output to the SIMD processor 33 simultaneously in parallel. Besides, instead of supplying input image data from the image port directly to the memory controller, the input image data may be stored temporarily in a RAM 8K, and then be supplied to the memory controller. Additionally, instead of reading γ conversion data from the LUT and outputting the γ conversion data directly to the SIMD processor 33, the γ conversion data may be stored temporarily in a RAM 8K, and then be output to the SIMD processor 33.

As described in the present first embodiment, in the generation of the γ conversion tables (FIG. 16) the boundary value is changed from the minimum value to larger values successively, and is compared with the gradation data. It may also be possible that the boundary value is changed from the maximum value to smaller values successively, and is compared with the gradation data. For example, in step γp2 shown in FIG. 16, A=a1 and B=b1 are written in the parameter setting register; i is set at 8 in step γp3; and in step γp4, and x(I−1) is provided to the processor elements PE0 to PEn so as to check whether or not the set gradation data Dj is in the section i (Dj>=x(I−1)). Then, in step γp6, it is checked whether or not i is "1". When i is "1", the process proceeds to step γp8. When i is not "1", i is decreased by 1 in step γp7.

Embodiment 2

Hardware according to a second embodiment is the same as in the foregoing first embodiment; however, the second embodiment has different data processes in an interpolative calculation of the γ conversion for generating LUTs.

Figure 19:
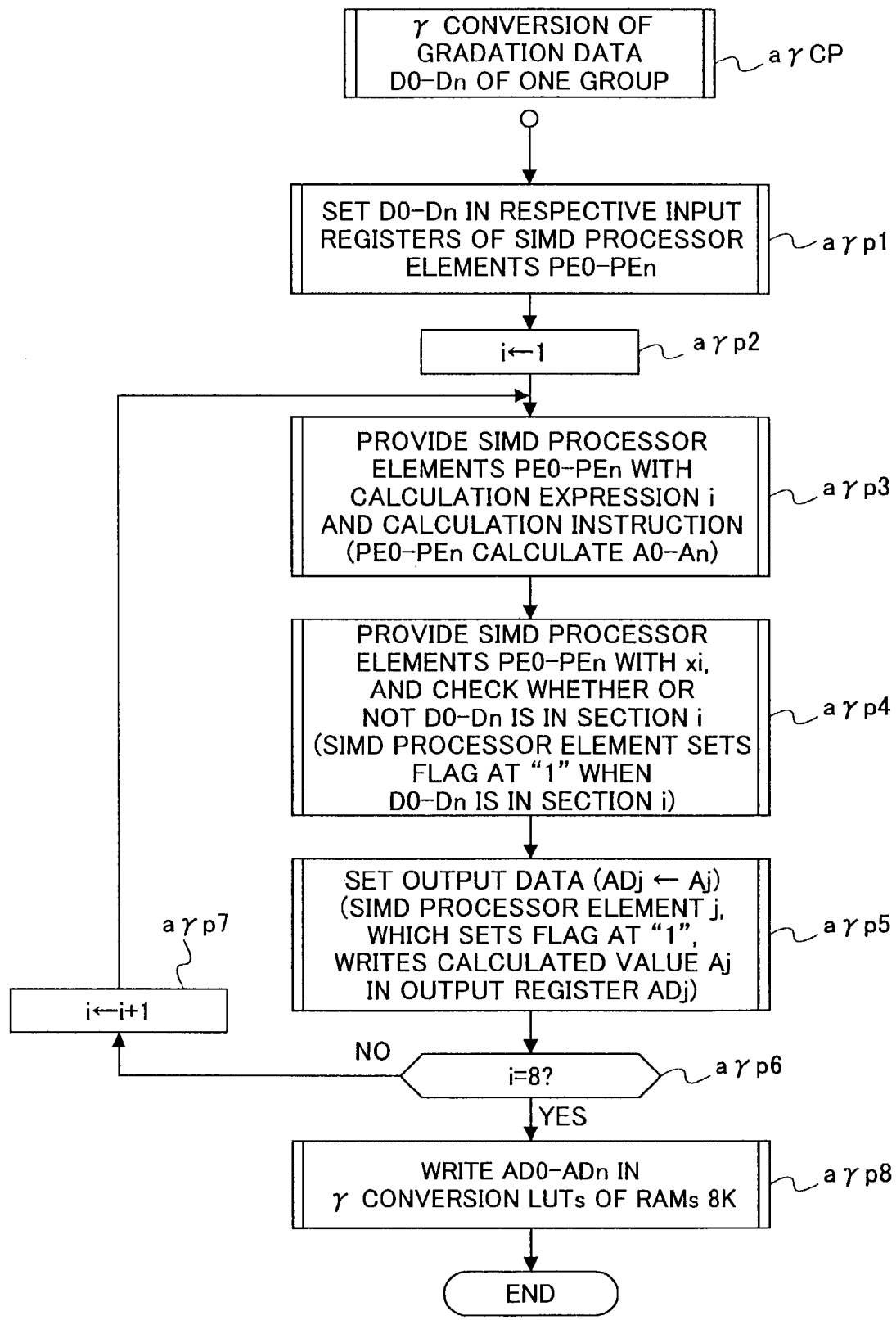
FIG. 19 is a flowchart of an interpolative calculation process performed by the global bus processor, based on γ conversion programs in a reading-correction program stored in the program RAM according to a second embodiment of the present invention.

FIG. 19 is a flowchart of the γ conversion for generating LUTs (a generation of LUTs for a scanner γ conversion in the IPU1, and a generation of LUTs for printer γ conversions in the IPU3y, the IPU3m, the IPU3c and the IPU3k) performed by the IPU1, the IPU3y, the IPU3m, the IPU3c and the IPU3k of the second embodiment.

First, the global bus processor (38) of the SIMD processor (33) according to the second embodiment initializes all of the processor elements PE0 to PEn, and sets n+1 (n=255) items D0 to Dn of gradation data representing 0-255 in the respective input registers of the n+1 processor elements PE0 to PEn (step aγp1).

Next, the global bus processor (38) determines the first section (i=1) as a section i to be calculated (step aγp2), provides the interpolative calculation parameters ai and bi of the section i to all of the processor elements PE0 to PEn, and orders a calculation of yi=ai·x+bi (step aγp3). All of the processor elements PE0 to PEn assume the respective set gradation data Dj (each of D0 to Dn) to be x, and calculate yi so as to obtain respective calculated values A0 to An (step aγp3).

Next, the global bus processor (38) provides the boundary value xi of the section i to all of the processor elements PE0 to PEn, and orders a comparison. Each of the processor elements PE0 to PEn checks whether or not the set gradation data Dj is of the section i (xi<Dj: NO, i.e., xi>=Dj), and sets its flag at "1" when the set gradation data Dj is of the section i (step aγp4)

Next, the processor element, which sets its flag at "1" (i.e., from "0" to "1") for the first time, writes the calculated value Aj (either of A0 to An) in an output register ADj (step aγp5). The processor element, which does not change its flag from "0" to "1", does not perform this writing.

The above-described process, in which the section i to be calculated is the first section (i=1), is similarly repeated until the seventh section (i=m−1=7) by successively updating i to 2, 3, . . . (aγp6/aγp7/aγp3/aγp4/aγp5/aγp6). In this course, the processor element, which has already set its flag at "1" (i.e., no transition from "0" to "1"), does not write the calculated value in the output register ADj. Then, in the last section i=m=8, only the processor element, which has not set its flag at "1", writes the calculated value Aj in the output register ADj.

Upon completion of the process until the seventh section (m−1=7), each of the processor elements PE0 to PEn retains the calculated value based on the parameters A=ai and B=bi corresponding to the section to which the respective set gradation data belongs to, in its output register.

Next, the global bus processor (38) writes the data (AD0 to ADn) stored in the output resisters of the processor elements PE0 to PEn to the output data areas of the respective RAMs of the processor elements, and orders the memory controller (shown in FIG. 5) designated as conducting reading/writing of γ conversion LUTs by the memory-controller setting register shown in FIG. 13A to read the data from the output data areas. The memory controller writes the γ conversion data correspondingly to the gradation data representing 0-255, in an area designated for LUT formation in the RAM 8K designated as an LUT by the setting information (aγp8)

According to the interpolative calculation of the present second embodiment, each of the processor elements calculates γ conversion data by performing an interpolative calculation of the same section at the same time. However, gradation data provided for each of the processor elements is not necessarily the same, and is not necessarily in the section i corresponding to the interpolative calculation. A calculation output of the processor element provided with gradation data out of the section i is an error, and a calculation output of the processor element provided with gradation data within the section i is correct.

Each interpolative calculation of the section i=1–m is performed one by one by all of the processor elements simultaneously in parallel, and when the interpolative calculations of all of the sections are completed, any of the processor elements outputs a correct conversion value once in the course of the interpolative calculations. This correct conversion value is treated as effective, i.e., is output as conversion data.

With respect to one gradation data, the processor element provided therewith repeats an interpolative calculation m times (e.g., m=8) apparently, i.e., performs an interpolative calculation yi (i=1–m) of each of the sections. Accordingly, although the number of calculations is increased, one calculation is simple and not time-consuming; thus, n items of gradation data (n: large values) as a whole take a short conversion time.

Embodiment 3

Hardware according to a third embodiment is the same as in the foregoing first embodiment; however, in the third embodiment, an interpolative calculation program used in a generation of LUTs for γ conversions has a different configuration A description will be given of γ conversions (a generation of LUTs for a scanner γ conversion in the IPU1, and a generation of LUTs for printer γ conversions in the IPU3y, the IPU3m, the IPU3c and the IPU3k) performed by the IPU1, the IPU3y, the IPU3m, the IPU3c and the IPU3k of the third embodiment.

A reading-correction program for the IPU1 includes a storage address S00 of a scanner γ conversion program inserted at a location of the generation of γ conversion LUTs, as shown in FIG. 20. When the reading-correction program is transferred from the HDD to the program RAM 36 of the SIMD processor 33 of the IPU1, the scanner γ conversion program at the storage address S00 is replaced with the storage address so as to be transferred. In addition, a set of "boundary values, parameters" for R, G and B γ conversions, e.g., data at addresses S1R, S1G and S1B shown in FIG. 20, is transferred and written to a γ-conversion data storage area of the data RAM 37 of the SIMD processor 33. Each group of "boundary values, parameters" for the R conversion, for example, corresponds to the boundary value xi between sections, and the parameters a1 and b1 for the interpolative calculation expression y1, which are shown in FIG. 17 (i=1-8: for eight sections).

FIG. 21 shows information divisions of a group of parameters on the data RAM 37.

Even after writing the above-mentioned set including three groups (for R, G and B: addresses S1R, S1G and S1B) to the data RAM 37, the set in the data RAM 37 can be rewritten to other sets shown in FIG. 20 (for example, a set at S3R, S3G and S3B) by a changing operation from the OPB or the host PC.

Similarly, each of Y, M, C and K output-correction programs for the IPU3y, IPU3m, IPU3c and IPU3k, respectively, includes a storage address P00 of a γ conversion program inserted at a location of γ conversion, as shown in FIG. 20. When the Y, M, C and K output-correction programs are transferred from the HDD to the respective program RAMs (36) of the SIMD processors 53y, 53m, 53c and 53k of the IPU3y, IPU3m, IPU3c and IPU3k, the printer γ conversion programs at the storage address P00 are replaced with the storage address so as to be transferred. In addition, a set of "boundary values, parameters" for respective Y, M, C and K γ conversions, e.g., data at addresses P1Y, P1M, P1C and P1K shown in FIG. 20, are transferred and written to γ-conversion data storage areas of the respective data RAMs of the SIMD processors 53y, 53m, 53c and 53k. Even after writing the set to the data RAMs, the set can be rewritten to other sets shown in FIG. 20 (for example, a set at P1Y, P1M, P1C and P1K) by a changing operation from the OPB or the host PC.

A process flow of γ conversion according to the third embodiment is similar to the process flow according to the first embodiment shown in FIG. 16. However, the boundary value xi and the parameters a1 and b1 are read from the data RAM (37) of the SIMD processor (33), and are provided to the processor elements PE.

<Variation of Interpolative Calculation>

The interpolative calculations according to the foregoing embodiments use linear approximate expressions. However, in a variation, in place of the interpolative calculation by linear approximation, based on a conversion expression defining a Bezier curve, converted data related to multivalued gradation data representing each gradation in a gradation range representable by a multi-bit configuration is calculated so as to generate a conversion table. For example, by using an extended three-dimensional Bezier curve disclosed in Japanese Patent No. 3112751, in a case of a 1-byte gradation data, for example, gradients c and d at a starting point (0) and an ending point (255) are provided as parameters, and a conversion expression is as follows.

$$y=cx(255-x)^2+(3\times255-d)\,(255-x)x^2+x^3$$

y: converted data (output data)

x: data to be converted (output data)

By using this conversion expression, y upon x=0 to 255 is calculated so as to generate a conversion table including x as an address and y as stored data. A small number of parameters can generate a property curve having a predetermined shape.

Embodiment 4

Hardware according to a fourth embodiment is the same as in the foregoing first embodiment; however, in the fourth embodiment, γ conversion tables are not generation by an interpolative calculation, but original conversion tables are stored in the HDD. A reading-correction program for the IPU1 includes a storage address S00 (FIG. 22) of a scanner γ conversion program inserted at a location of the generation of γ conversion LUTs. When the reading-correction program is transferred from the HDD to the program RAM 36 of the SIMD processor 33 of the IPU1, the scanner γ conversion program at the storage address S00 is replaced with the storage address so as to be transferred. In addition, a set of R, G and B γ conversion tables, e.g., conversion tables at addresses S1R, S1G and S1B (FIG. 22), is transferred and written to a γ-conversion table storage area of the data RAM 37 of the SIMD processor 33.

Upon γ-converting RGB image data, the SIMD processor 33 reads the γ conversion tables from the data RAM 37, and writes one conversion table in the two RAMs 8K, as shown in FIG. 18, so as to γ-convert image data of odd-numbered pixels and image data of even-numbered pixels on one line simultaneously in parallel.

Even after writing the above-mentioned set including three groups (for R, G and B: addresses S1R, S1G and S1B) to the data RAM 37, the set in the data RAM 37 can be rewritten to other sets shown in FIG. 22 (for example, a set at S3R, S3G and S3B) by a changing operation from the OPB or the host PC.

Similarly, each of Y, M, C and K output-correction programs for the IPU3y, IPU3m, IPU3c and IPU3k, respectively, includes a storage address P00 (FIG. 22) of a γ conversion program inserted at a location of γ conversion. When the Y, M, C and K output-correction programs are transferred from the HDD to the respective program RAMs (36) of the SIMD processors 53y, 53m, 53c and 53k of the IPU3y, IPU3m, IPU3c and IPU3k, the printer γ conversion programs at the storage address P00 are replaced with the storage address so as to be transferred. In addition, a set of Y, M, C and K γ conversion tables, e.g., data at addresses P1Y, P1M, P1C and P1K (FIG. 22), are transferred and written to γ-conversion data storage areas of the respective data RAMs of the SIMD processors 53y, 53m, 53c and 53k. Even after writing the set to the data RAMs, the set can be rewritten to other sets shown in FIG. 22 (for example, a set at P1Y, P1M, P1C and P1K) by a changing operation from the OPB or the host PC.

Besides, in each of the embodiments according to the present invention, YMCK image data are processed simultaneously in parallel by the four respective SIMD processors 53y, 53m, 53c and 53k. However, printer γ conversions or outputting processes of YMCK image data can be performed as a whole by one SIMD processor successively for each color. This adapts to a one-drum type color printer forming images of respective colors successively by one photosensitive unit. However, in the above-described color printer including the four photosensitive units arranged tandem, using the four SIMD processors 53y, 53m, 53c and 53k for YMCK image data, respectively, is preferable for a high-speed printing because the outputting processes of YMCK image data as a whole become fast.

Embodiment 5

Next, a description will be given, with reference to FIG. 23, of the image-area separation performed by the global bus processor 38 using the processor elements PE and the buffer memory 32 according to the reading process program written in the program RAM 36 provided in the SIMD processor 33 (an image processor) of the IPU1 (the IPU1 and the system controller 106 composing an image data processing device). The image-area separation described herein is based on RGB image data, and judges whether an image represented by the RGB image data is a character area (an area of a character or a line), or a picture area (an area of a photograph or a picture, and a non-character area), and produces a C/P signal and a B/C signal. The C/P signal represent a character-edge area, a character-inside area, or a picture area. The B/C signal represents a chromatic (color) area or an achromatic (blank) area. The "character-inside" means within the character edges, i.e., within a width of a character line. In the present fifth embodiment, a combination of 3-bit signals of the C/P signal and the B/C signal is the image-area data Fd.

The C/P signal is a 2-bit signal: two bits of "11" meaning "3" represents the character-edge area; two bits of "01" meaning "1" represents the character-inside area; and two bits of "00" meaning "0" represents the picture area.

The B/C signal is a 1-bit signal: H ("1") represents the achromatic (blank) area; and L ("0") represents the chromatic (color) area.

The image-area separation mainly comprises an MTF correction 321, an edge separation 322, a white-background separation 323, a dot separation 324, a hue separation 325a, a color judgment 325b, and a comprehensive judgment 326. In the present description, a reading density by the reading unit 21 of the scanner SCR (composing the image processing device) is approximately 600 dpi, for example.

<<MTF Correction 321>>

The MTF correction 321 corrects G image data produced by the reading unit 21 mainly for extracting an edge of a character. At this point, since data read by the reading unit 21 is sometimes blurred depending on a capability of the lenses, the data is subjected to an edge emphasizing filter. In the present fifth embodiment, a pixel matrix of the MTF correction 321 contains seven pixels in a main scanning direction x times five pixels in a sub scanning direction y. The data RAM 37 (a reference data storage) includes a coefficient group (a coefficient matrix) A and B containing weighing coefficients a1 to a7, b1 to b7, c1 to c7, d1 to d7 and e1 to e7 corresponding to the respective pixels. A coefficient of a pixel at the center of a third transverse row in the coefficient matrix, i.e., of a present pixel (a subject pixel), is c4. A total sum (a sum of products) (7 times 5 totaling 35 products) obtained by multiplying the coefficients in the coefficient matrix by respective values represented by the image data of respective pixels corresponding to the coefficients is supplied to the edge separation 322, the white-background separation 323, and the dot separation 324, as a image data value processed in the MTF correction 321. Herein, the present pixel means a pixel being processed at present, which is updated to another pixel successively in the direction x and the direction y.

<<Edge separation 322>>

A character area includes a multitude of pixels of a high-level density and pixels of a low-level density (hereinafter referred to as black pixels and white pixels, respectively). Additionally, in an edge part of the character area, the black pixels and the white pixels are continuous. The edge separation 322 detects a character edge according to continuity of the black pixels and the white pixels. First, the image data subjected to the MTF correction is converted into a ternary value by using two threshold values TH1 and TH2. The threshold values TH1 and TH2 are set at 20 and 80, respectively, for example, when image data represents 256 gradations ranging from 0 to 255 (0=white). When input data<TH1, the input data is converted into 2-bit ternary data representing a pixel corresponding to the input data as a white pixel. When TH1≦input data<TH2, the input data is converted into the 2-bit ternary data representing the pixel corresponding to the input data as a middle-tone pixel. When TH2≦input data, the input data is converted into the 2-bit ternary data representing the pixel corresponding to the input data as a black pixel. Then, the ternary data is made binary so as to obtain pixel information data representing the presence/absence of an image component ("1" indicating an image component present; "0" indicating an image component absent). Based on this binary data, a part where the black pixels are continuous, and a part where the white pixels are continuous are detected, respectively, by respective pattern matching judgments.

Figure 25A:
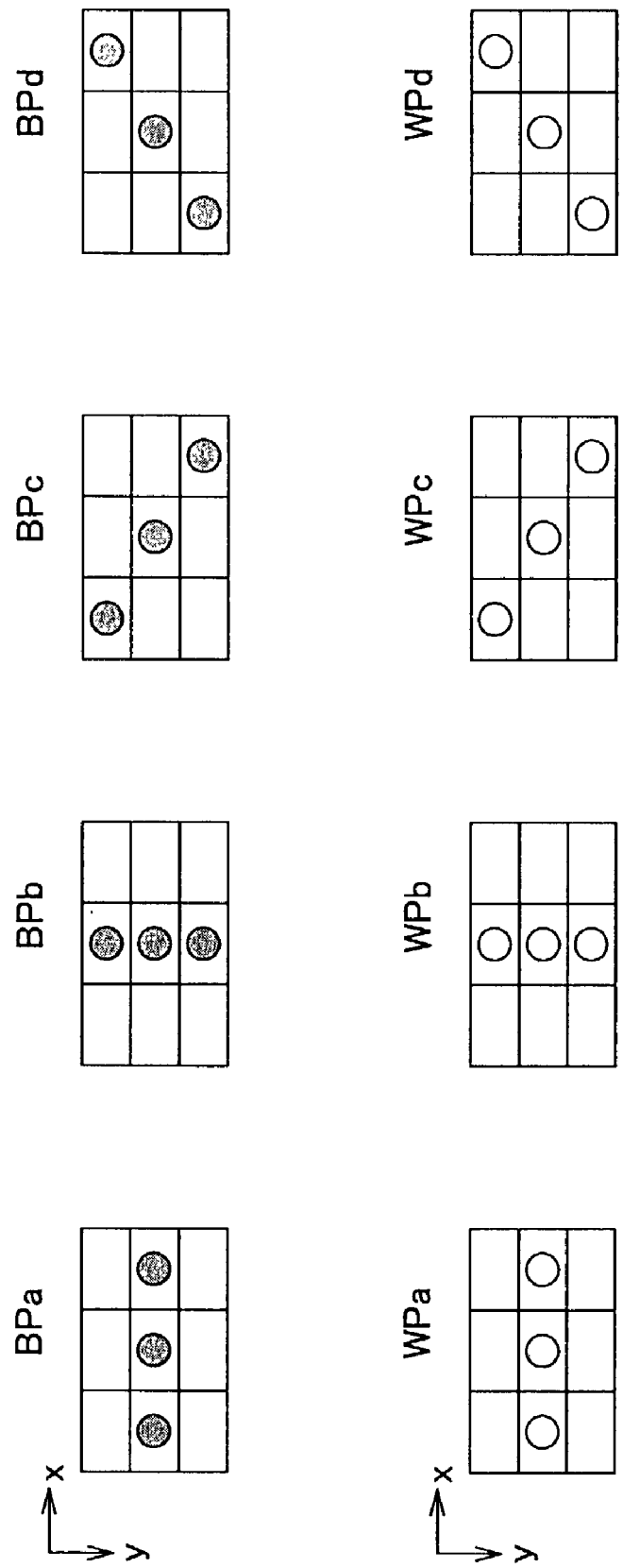
FIG. 25A shows examples representing reference patterns used in a black/white-pixel continuity detection performed in an edge separation shown in FIG. 23.

Examples representing reference patterns used in the black-pixel continuity detection are 3×3 pixel matrixes BPa to BPd shown in FIG. 25A. In each of the 3×3 pixel matrixes BPa to BPd, three pixels aligned vertically (y), horizontally (x) and obliquely including at least a present pixel (a central pixel) have pixel information data of "1". Besides, all of other patterns satisfying this condition (with blank pixels in the pixel matrixes BPa to BPd being "1") are reference patterns used in the black-pixel continuity detection. Hereinbelow, these reference patterns are referred to as black-pixel continuity detection reference patterns.

Examples representing reference patterns used in the white-pixel continuity detection are 3×3 pixel matrixes WPa to WPd shown in FIG. 25A. In each of the 3×3 pixel matrixes WPa to WPd, three pixels aligned vertically (y), horizontally (x) and obliquely including at least a present pixel have pixel information data of "0". Besides, all of other patterns satisfying this condition (with blank pixels in the pixel matrixes WPa to WPd being "0") are reference patterns used in the white-pixel continuity detection. Hereinbelow, these reference patterns are referred to as white-pixel continuity detection reference patterns.

In the reference patterns shown in FIG. 25A, a black circle in a pixel indicates that the pixel information data of the pixel is "1" (an image component present), and a white circle in a pixel indicates that the pixel information data of the pixel is "0" (an image component absent). The central pixel in each of the 3×3 pixel matrixes is the present pixel.

In the pattern matching judgments for the black-pixel continuity detection and the white-pixel continuity detection, the black-pixel continuity and the white-pixel continuity contradict. Therefore, first, in the black-pixel continuity detection, it is checked whether or not pixel information data of pixels in a 3×3 pixel matrix (a-i in FIG. 25B) with a present pixel being at the center thereof matches either of the black-pixel continuity detection reference patterns while switching the reference patterns. When the pixel information data of the pixels in the 3×3 pixel matrix matches either of the black-pixel continuity detection reference patterns, the present pixel is provided with judgment data indicating that the present pixel is a pixel of "black-pixel continuity" ("11": black-continuity pixel). When the pixel information data of the pixels in the 3×3 pixel matrix matches neither of the black-pixel continuity detection reference patterns, next, it is checked whether or not the pixel information data of the pixels in the 3×3 pixel matrix matches either of the white-pixel continuity detection reference patterns while switching the reference patterns. When the pixel information data of the pixels in the 3×3 pixel matrix matches either of the white-pixel continuity detection reference patterns, the present pixel is provided with judgment data indicating that the present pixel is a pixel of "white-pixel continuity" ("01": white-continuity pixel). When the pixel information data of the pixels in the 3×3 pixel matrix matches neither of the white-pixel continuity detection reference patterns, the present pixel is provided with judgment data ("00") indicating that the present pixel is a pixel of neither "black-pixel continuity" nor "white-pixel continuity".

For the purpose of performing these pattern matching judgments, the data RAM 37 contains groups of reference data of the black-pixel continuity detection reference patterns and the white-pixel continuity detection reference patterns. One reference data includes two groups of reference-pattern pixel-information (9-bit) data arranged serially so as to form 2-byte data, as shown in FIG. 25C, for example, in which pixel information data a-i is of a reference pattern (e.g., Bpa).

Figure 25B:
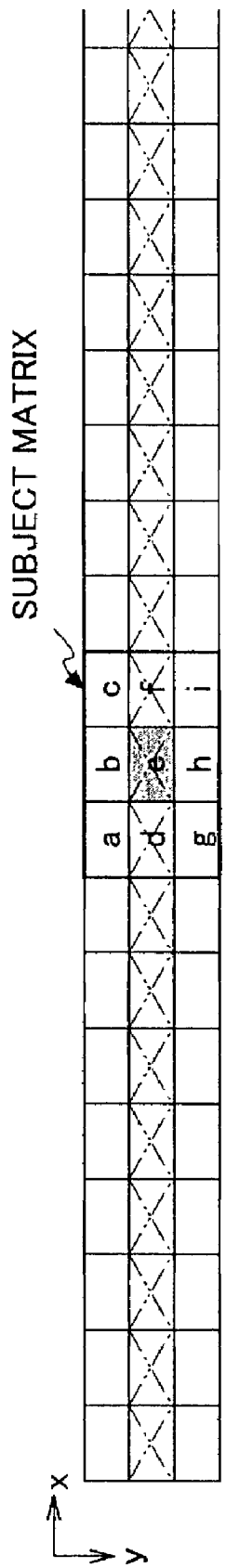
FIG. 25B shows a 3×3 pixel matrix of a present pixel and peripheral pixels.
Figure 25C:
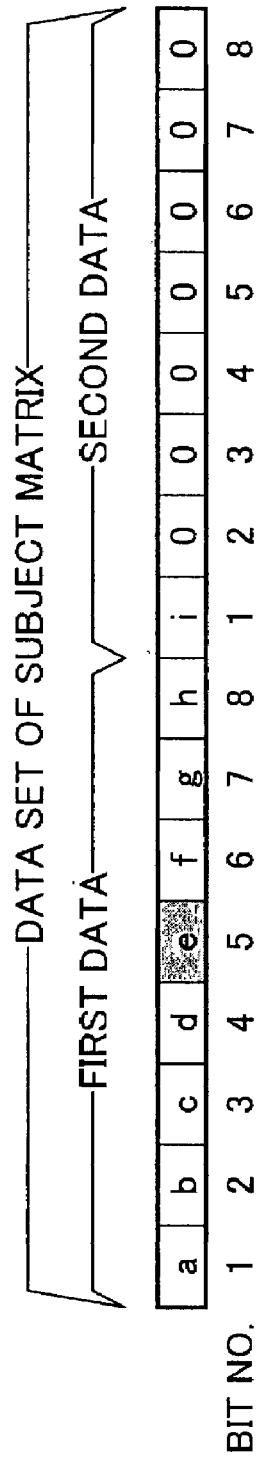
FIG. 25C shows a data distribution of a-byte data (a=integer) converted from data of the pixel matrix shown in FIG. 25B.

For example, the pixel information data items a-i of the present (subject) 3×3 pixel matrix shown in FIG. 25B are converted into 2-byte subject data, in which the eight pixel information data items a-h form a first byte, and the remaining pixel information data item i forms a first bit of a second byte, with remaining seven bits of the second byte provided with "0" indicating no image component, as shown in FIG. 25C. Correspondingly, for the reference data, the nine pixel information data items of the 3×3 pixel reference matrix (pattern) are prepared as 2-byte data. In this case, it is judged whether or not the first byte of the subject data matches the first byte of the reference data. When the first byte of the subject data matches the first byte of the reference data, next, it is judged whether or not the second byte of the subject data matches the second byte of the reference data. When the second byte of the subject data matches the second byte of the reference data, it is judged that the subject data (matrix) matches the reference data.

Figure 25D:
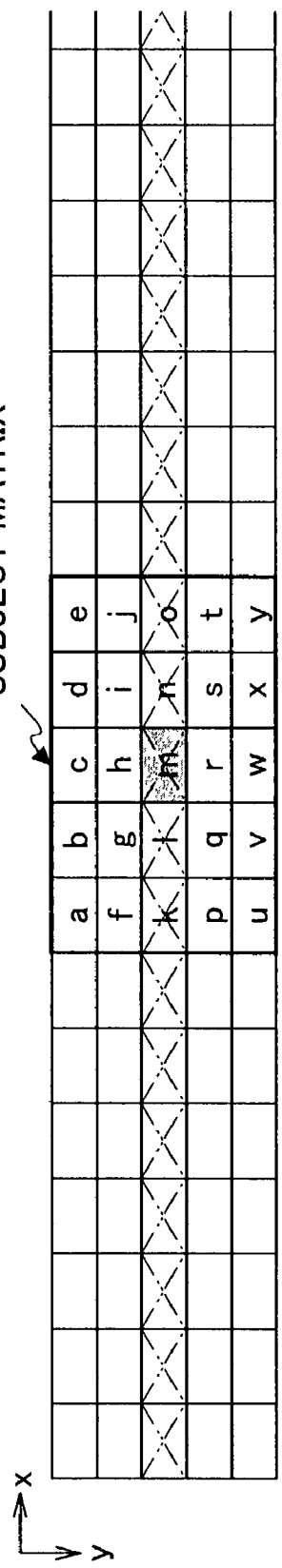
FIG. 25D shows a 5×5 matrix of a present pixel and peripheral pixels.
Figure 25E:
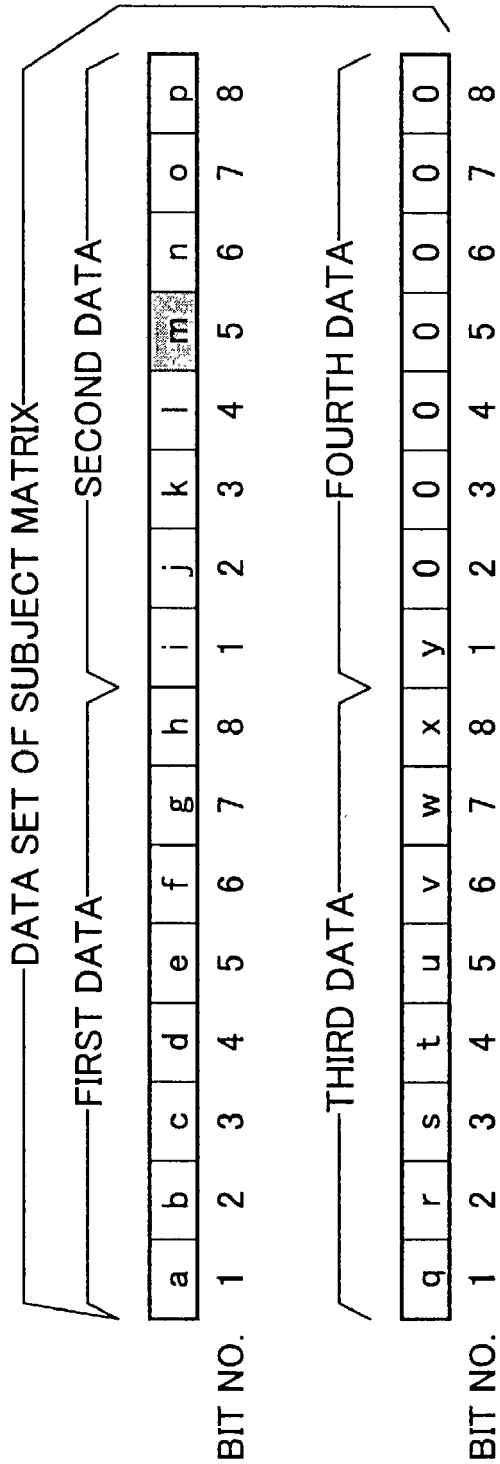
FIG. 25E shows a data distribution of a-byte data (a=integer) converted from data of the pixel matrix shown in FIG. 25D.

Additionally, for example, when a 5×5 pixel matrix shown in FIG. 25D is a subject matrix, pixel information data items a-y thereof are converted into 4-byte subject data, in which the 24 pixel information data items a-x form first to third bytes, and the remaining pixel information data item y forms a first bit of a fourth byte, with remaining seven bits of the fourth byte provided with "0" indicating no image component, as shown in FIG. 25E. Correspondingly, reference data is prepared as similar 4-byte data.

Figure 24:
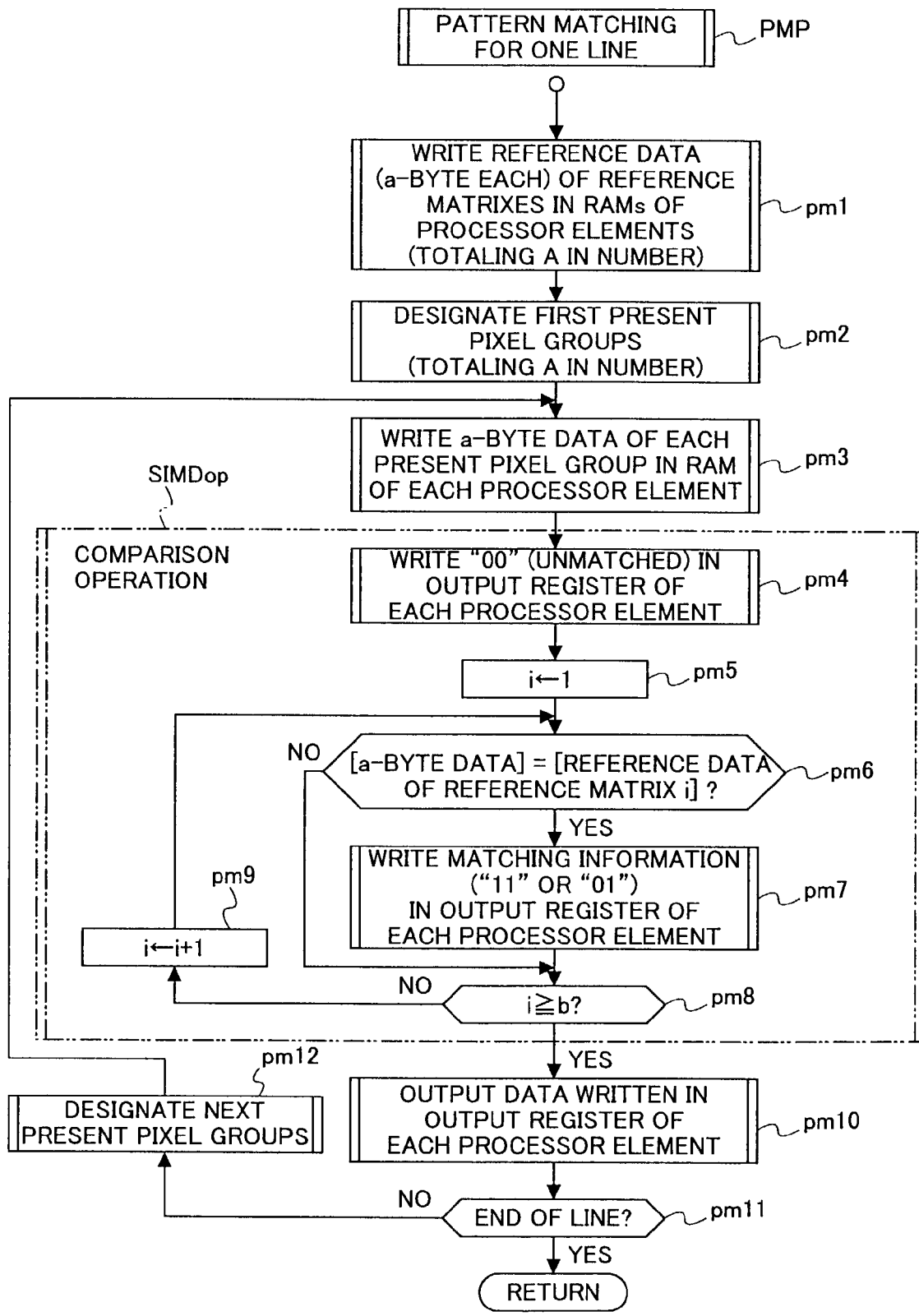
FIG. 24 is a flowchart of a pattern comparison performed by the SIMD processor shown in FIG. 4A according to a fifth embodiment of the present invention.

FIG. 24 is a flowchart of a judgment, i.e., a pattern matching PMP, performed by the SIMD processor 33, of whether or not a pixel matrix with each pixel on one line being at the center thereof matches a reference matrix.

Besides, upon the pattern matching using the 3×3 pixel matrixes shown in FIG. 25A, for example, the SIMD processor 33 provides the buffer memory 32 with input line buffers for storing ternary data of three lines or more, and also provides the buffer memory 32 with judgment-result line buffers for storing the above-mentioned judgment data ("11": black-continuity pixel/"01": white-continuity pixel/"00": unmatched) corresponding to each pixel in the center line of the three lines.

In FIG. 24, the global bus processor 38 of the SIMD processor 33 writes groups of reference data of reference patterns (reference matrixes) (b in number), e.g., groups (b in number) of reference data of the black-pixel continuity detection reference patterns and the white-pixel continuity detection reference patterns, in the RAMs (shown in FIG. 7B) of the processor elements (totaling A=320 in number, for example) (pm1).

Next, the SIMD processor 33 orders the memory controllers of the buffer memory 32 to transfer the number (A) of items of the data (pm2). In response to this order, the memory controller converts pixel information data of each pixel matrix centered around each of present pixels (A in number) aligned in series on the center line (the present line) stored in the input line buffer into a-byte data in the manner shown in FIG. 25C on an individual matrix basis, and transfers the a-byte data to the SIMD processor 33. The global bus processor 38 of the SIMD processor 33 writes the first a-byte data to the last a-byte data in order in the RAMs of the processor elements (A in number) (pm3).

For example, the memory controller of the buffer memory 32 writes the pixel information data binarized from the foregoing ternary data in three RAMs 8K allocated as line buffer memories. Then, the memory controller reads pixel information data corresponding to the 3×3 pixel matrix consisting of pixels a-i in which the present pixel e is surrounded by one pixel each in two-dimensional direction (x, y), as shown in FIG. 25B. Then, the memory controller converts the pixel information data into 2-byte data in one line as shown in FIG. 25C, and supplies the 2-byte data to the SIMD processor 33. Subsequently, the memory controller repeats this process A times, with shifting the present pixel one by one on the same line. The global bus processor 38 of the SIMD processor 33 writes each 2-byte data in the RAMs of the processor elements (pm3).

Then, the processor elements perform comparison operations SIMDop simultaneously in parallel. In the comparison operation SIMDop, each of the processor elements writes "00: unmatched" in its output register (pm4). Next, the processor element checks whether or not reference data of type i (No. i) stored in the RAM matches the 2-byte data byte by byte (pm5, pm6). When the reference data matches the 2-byte data, the processor element overwrites "11" (for the black-pixel continuity detection reference patterns) or "01" (for the white-pixel continuity detection reference patterns) in the output register (pm7). When the reference data does not match the 2-byte data, the processor element writes nothing. This match/non-match judgment is repeated with switching the reference data groups (the reference patterns) (pm8, pm9). Upon finishing comparisons of all of the groups of the reference data contained in the data RAM 37 with the foregoing 2-byte data, the comparison operation SIMDop is completed.

Upon this completion, the data in the output register represents whether or not a pixel matrix image represented by the foregoing 2-byte data stored in the RAM of the processor element matches the reference patterns (the black-pixel continuity detection reference patterns or the white-pixel continuity detection reference patterns) represented by the reference data.

The global bus processor 38 of the SIMD processor 33 transfers the data in the output registers of the processor elements (A in number) to the judgment-result line buffers via the memory controllers (pm10). Then, it is checked whether or not the above-described pattern matching is completed to all of the pixels on one line (pm11). When the pattern matching is not completed, next present pixels on the same line are designated as pixels to be subjected to the pattern comparison, and the pattern matching of the foregoing steps starting from pm3 is performed similarly.

In the above-described patter matching, each of the processor elements judges whether or not all of groups of pixel information data (2-byte data) of one pixel matrix C×D=E (3×3=9 in the foregoing example) coincide either of groups of reference data of reference patterns, and obtains a judgment result. Besides, C represents the number of pixels in one matrix in the main scanning direction x; D represents the number of pixels in one matrix in the sub scanning direction y; and E represents the number of pixels of one matrix, where (a−1)×8<E=<a×8 (a=a positive integer). Since this judgment is based on a comparison of byte data, the judgment rate is high. Further, since this judgment is performed by a number A of the processor elements simultaneously in parallel, pattern matching processes for the number A of pixel matrixes are completed simultaneously; thus, the pattern matching judgment rate is high.

Figure 26:
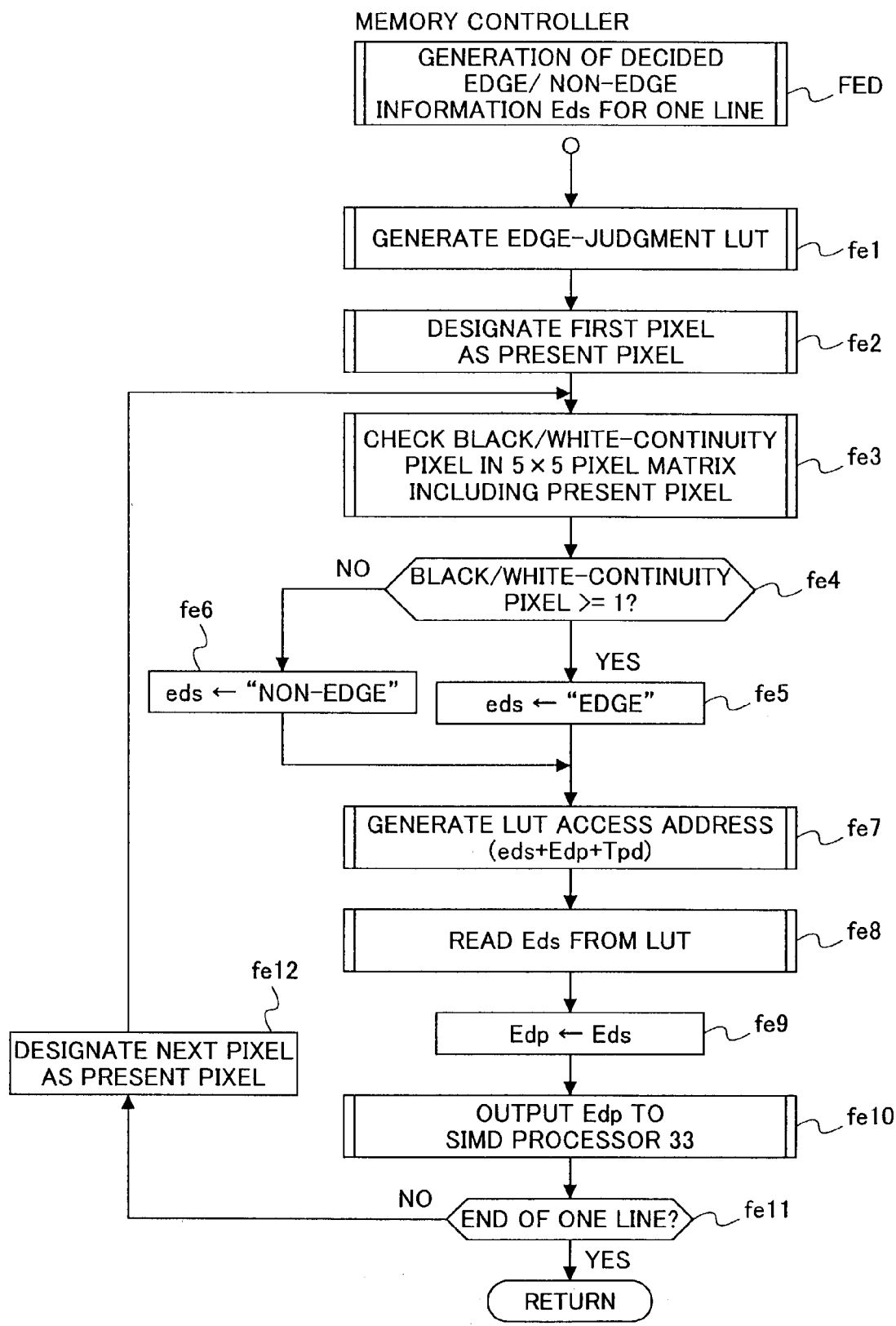
FIG. 26 is a flowchart of a process for generating decided edge/non-edge information performed by the memory controller shown in FIG. 5 using a data feedback.
Figure 27A:
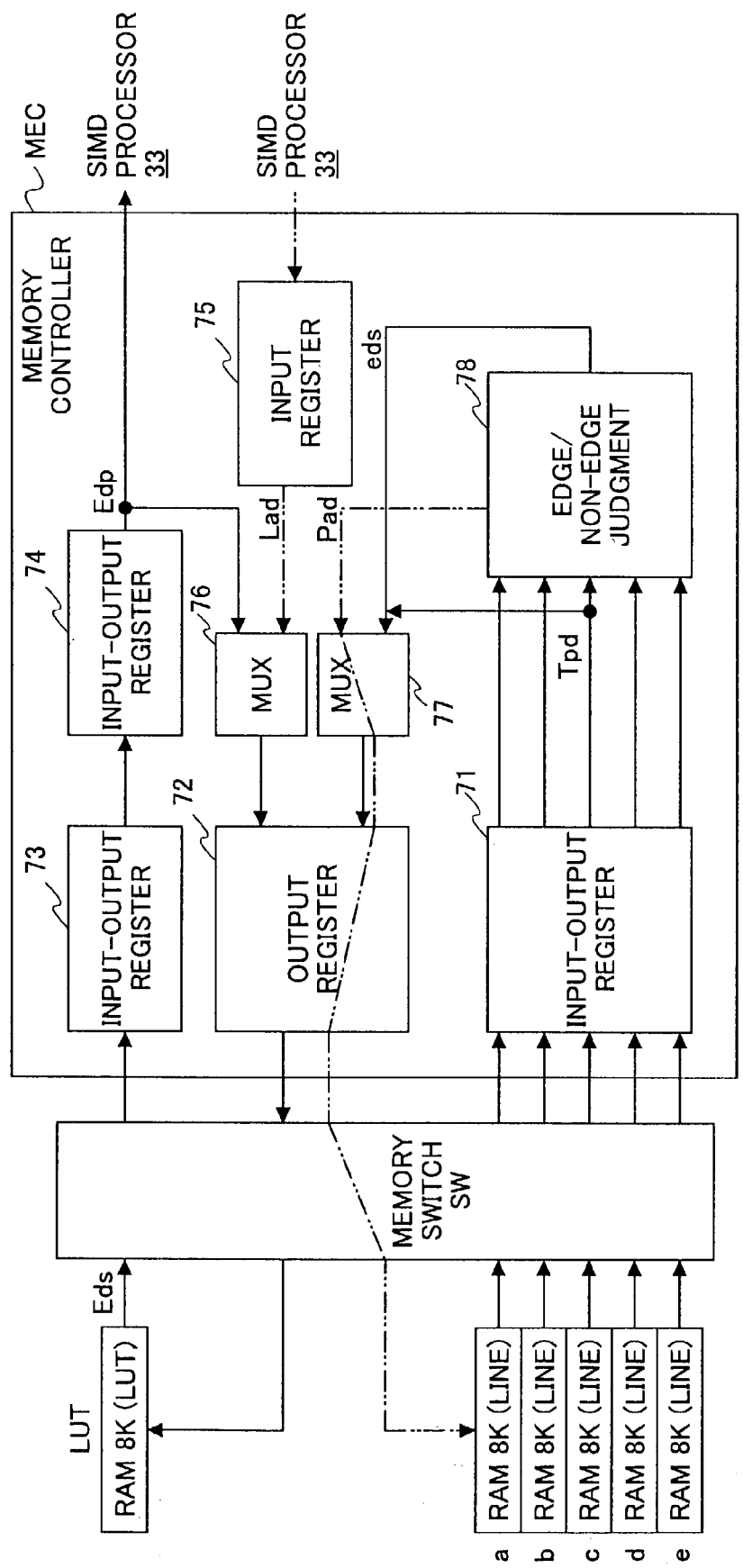
FIG. 27A is a block diagram of one type of a data feedback function of the memory controller shown in FIG. 5.

FIG. 26 is a flowchart of a data process FED of an edge/non-edge area judgment performed by the memory controller. FIG. 27A shows an internal feedback loop in the memory controller upon this edge/non-edge area judgment. With reference to FIG. 27A, after the black-pixel continuity detection and the white-pixel continuity detection, the global bus processor 38 of the SIMD processor 33 reads an edge/non-edge area judgment LUT from the data RAM, and transfers the LUT to the RAM 8K via the memory controller. This RAM 8K is referred to as an edge/non-edge judgment RAM 8K (LUT). The memory controller receives an LUT address Lad (input data to be converted) from the SIMD processor 33 in an input register 75, and supplies the LUT address Lad to an address line of the RAM 8K (LUT) via a multiplexer 76, an output register 72, and a memory switch SW. The memory controller receives an LUT storage data (output converted data) from the SIMD processor 33 in an input-output register 74, and supplies the LUT storage data to an data line of the RAM 8K (LUT) via an input-output register 73 and the memory switch SW, i.e., writes the LUT storage data in the RAM 8K (LUT).

Regarding the detection results of the black-pixel continuity detection and the white-pixel continuity detection, the global bus processor 38 examines, by using this RAM 8K (LUT) and the memory controller, whether or not a black-continuity pixel or a white-continuity pixel exists in the vicinity of a present pixel so as to judge which of an edge area or a non-edge area the present pixel exists in.

More specifically, in the present embodiment, when one or more black-continuity pixel and one or more white-continuity pixel exist within a block consisting of a 5×5 pixel matrix, the block is judged to be an edge area, and a present pixel that is a center pixel of the matrix is provided with information indicating "edge area"; otherwise, the block is judged to be a non-edge area, and the present pixel is provided with information indicating "non-edge area".

In FIG. 26, according to an instruction from the SIMD processor 33, the memory controller defines an LUT (RAM 8K (LUT)) and line memories (RAMs 8K (LINE)) for five lines or more in the buffer memory 32 as shown in FIG. 27A (fe1). The memory controller stores detection results of the above-described black-pixel continuity detection and the white-pixel continuity detection for five lines or more in the line memories (RAMs 8K (LINE)), and regards the third (middle) line of the five lines as a present line, and regards each pixel on the present line as a present pixel successively (fe2).

The memory controller retrieves the foregoing detection results as to each of 5-pixel rows of a 5×5 pixel matrix having a present pixel at the center thereof via an input-output register 71 by supplying a reading address Pad to an address line of the RAMs 8K (LINE) via a multiplexer 77, the output register 72, and the memory switch SW. When one or more black-continuity pixel and one or more white-continuity pixel exist within the 5×5 pixel matrix, the memory controller judges the present pixel to be an edge area, and generates edge/non-edge information eds (fe3-fe6).

The memory controller (an image-area judgment unit) supplies this edge/non-edge information eds of the present pixel, decided edge/non-edge information Edp (data in the input-output register 74) of a preceding pixel preceding-the present pixel by one pixel in the main scanning direction x, and a detection result Tpd of the above-described black-pixel continuity detection and the white-pixel continuity detection, which is image process data of the present pixel, to the RAM 8K (LUT) as an LUT access address via the input register 75 the multiplexer 76, and the output register 72 (fe7) so as to read decided edge/non-edge information Eds corresponding to a combination of the eds, the Edp and the Tpd from the edge/non-edge judgment RAM 8K (LUT) (fe8). The memory controller writes the decided edge/non-edge information Eds in the input-output register 74, and supplies the decided edge/non-edge information Eds (the overwritten decided edge/non-edge information Edp) to the SIMD processor 33 (fe9, fe10). Then, the memory controller checks whether or not the above-described edge/non-edge judgment is completed to all of the pixels on one line (fe11). When the edge/non-edge judgment is not completed, a next pixel on the same line is regarded as a present pixel, and the process of the foregoing steps starting from fe3 is performed similarly.

The decided edge/non-edge information Edp of the preceding pixel is feedback information. The edge/non-edge judgment of the RAM 8K (LUT) is as follows. When the edge/non-edge information eds of the present pixel indicates "edge" (one or more black-continuity pixel and one or more white-continuity pixel exist within the 5×5 pixel matrix), the decided edge/non-edge information Eds is caused to indicate "edge". When the eds indicates "non-edge", the decided edge/non-edge information Eds is caused to indicate "edge" if the decided edge/non-edge information Edp of the preceding pixel indicates "edge" and the detection result Tpd of the above-described black-pixel continuity detection and the white-pixel continuity detection as to the present pixel indicates "black-pixel continuity" or "white-pixel continuity". When the eds indicates "non-edge", the decided edge/non-edge information Eds is caused to indicate "non-edge" if the Edp indicates "edge" and the detection result Tpd indicates "black-pixel continuity" nor "white-pixel continuity". When the eds indicates "non-edge", the decided edge/non-edge information Eds is caused to indicate "edge" if the Edp indicates "non-edge" and the detection result Tpd as to the present pixel indicates only "black-pixel continuity". Otherwise, the decided edge/non-edge information Eds is caused to indicate "non-edge".

Adding the feedback of the decided edge/non-edge information Edp of the preceding pixel and the reference of the detection result Tpd of the black-pixel continuity detection and the white-pixel continuity detection indicating "black-pixel continuity" or "white-pixel continuity" as to the present pixel to the edge/non-edge judgment LUT prevents an edge/non-edge oscillation from occurring frequently at short intervals so that the edge/non-edge detection is performed more reliably.

Besides, the feedback LUT process using the input register 75 and the multiplexer 76 is not necessarily performed by retrieving data from several RAMs 8K (LINE) to the memory controller, generating an LUT access data (input data) and accessing the LUTs, as shown in FIG. 27A, but also performed in a manner of providing the memory controller with one or more sets of data from the SIMD processor 33 and generating the LUT access data.

Figure 27B:
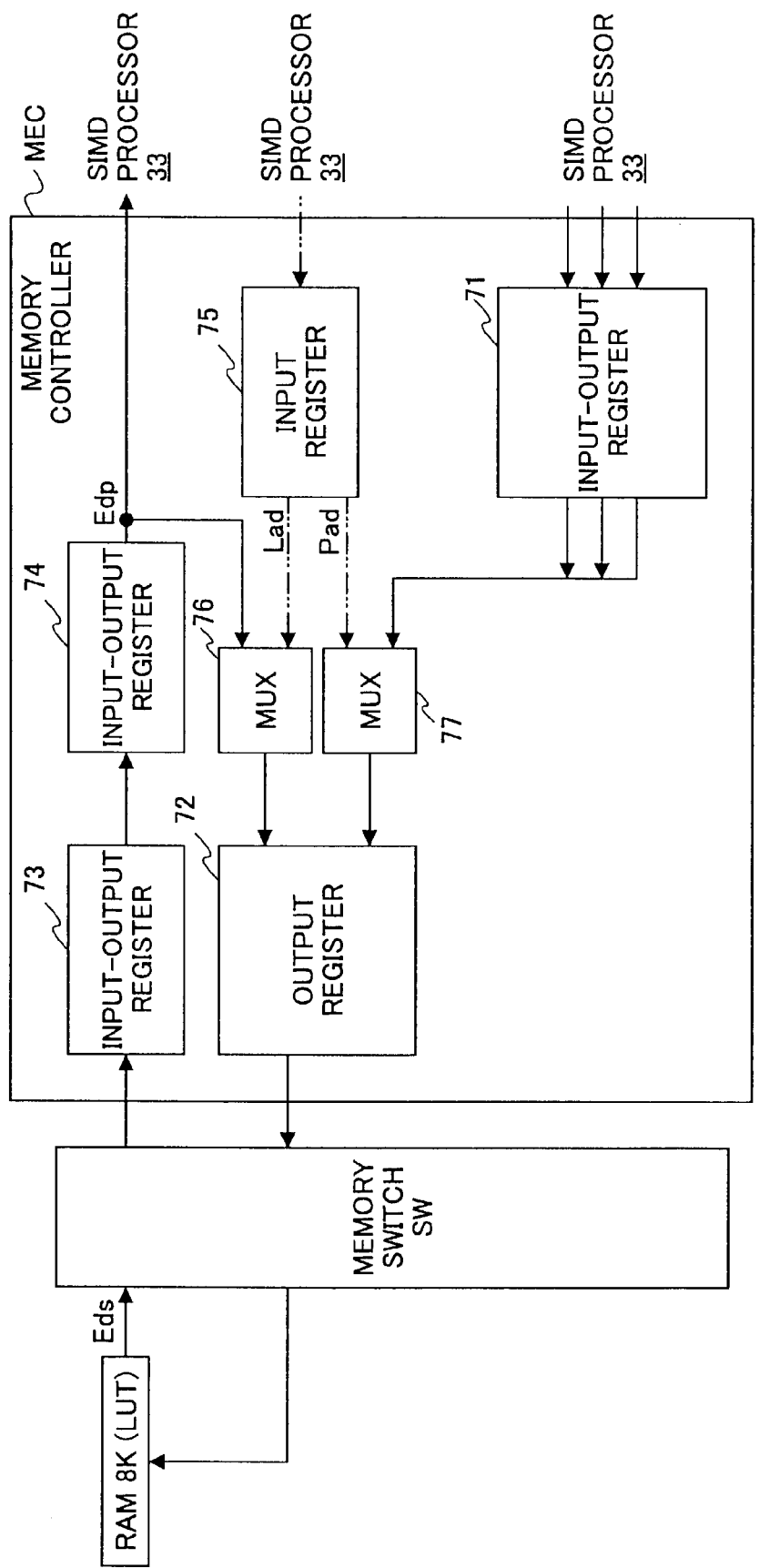
FIG. 27B is a block diagram of another type of a data feedback function of the memory controller shown in FIG. 5.

FIG. 27B shows an internal feedback loop in the memory controller, in which this manner is applied to the above-described edge/non-edge area judgment. In this manner, another memory controller supplies detection results of the black-pixel continuity detection and the white-pixel continuity detection as to the 5×5 pixel matrix from five RAMs 8K (LINE) not shown in FIG. 27B to the SIMD processor 33. When one or more black-continuity pixel and one or more white-continuity pixel exist within the 5×5 pixel matrix, the SIMD processor 33 judges the present pixel to be an edge area, and supplies this edge/non-edge information eds of the present pixel and the detection result Tpd of the black-pixel continuity detection and the white-pixel continuity detection as to the present pixel to the memory controller shown in FIG. 27B. This memory controller writes these eds and Tpd together with the decided edge/non-edge information Edp of the preceding pixel in the output register 72 via the multiplexer 76, and outputs the eds, the Tpd and the Edp to the RAM 8K (LUT). Using this feedback LUT process improves a state transition processing ability of the SIMD processor.

<<Isolated-Point Elimination>>

Further, since character edges exist continuously, an isolated-point elimination corrects an isolated edge to a non-edge area. Then, a pixel judged to be an edge area is provided with edge information valued "1" (indicating an edge area), and a pixel judged to be a non-edge area is provided with edge information valued "0" (indicating a non-edge area).

<<White-Background Separation 323 (FIG. 23)>>

In the white-background separation 323, an RGB white extraction, a white judgment, a white pattern matching, a black judgment, a black pattern matching, a white correction, and so forth are performed. In the pattern matching, the above-described pattern-matrix data is arranged in a row by the memory controller, and is compared with reference-pattern serial data by a plurality of the processor elements PE so as to perform a matching (a judgment of whether or not the patterns coincide) for one matrix at a time.

In an RGB white ground detection in the RGB white extraction, a white-ground area is detected by using image data of R, G and B so as to activate an operation of a white background separation, i.e., to start a process of a white background separation. Specifically, when each of the image data of R, G and B in a 3×3 pixel matrix is smaller than a threshold value thwss, a present pixel (a central pixel in the 3×3 pixel matrix) is judged to be a white area so as to activate the white pattern matching. Thereby, it is detected whether or not there exists a white-pixel area having a certain expanse.

Next, in order not to detect a yellow ground as a white background, a virtual white pixel is determined. In this process, when B image data equal to or smaller than a threshold value thwc exists in a 5×5 pixel matrix having a present pixel at the center thereof, the present pixel is judged to be a virtual white pixel. Since the hereinafter-described white judgment is based only on G image data, yellow (Y), which cannot be detected according to the G image data, is detected according to the B image data.

Figure 28A:
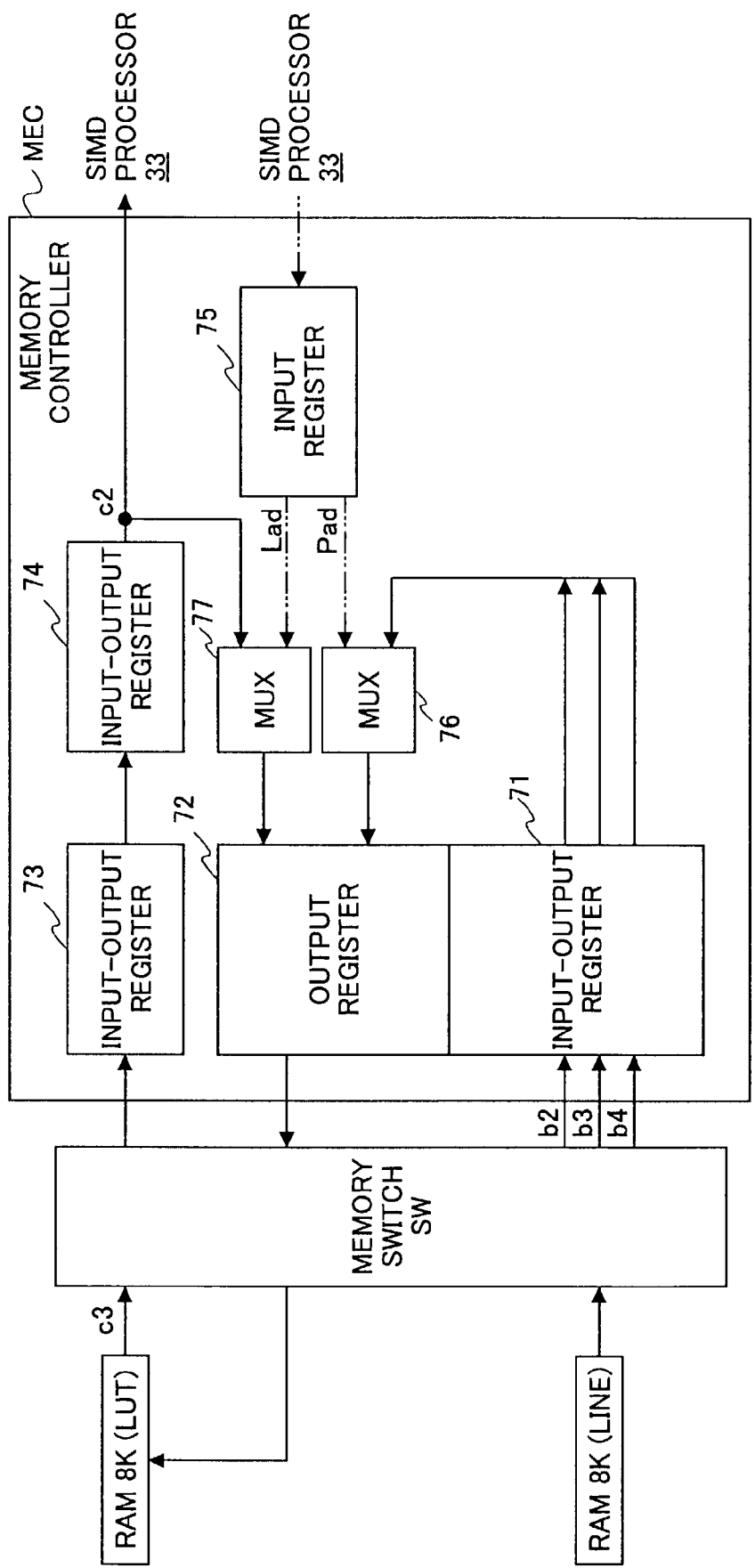
FIG. 28A is a block diagram of still another type of a data feedback function of the memory controller shown in FIG. 5.
Figure 28B:
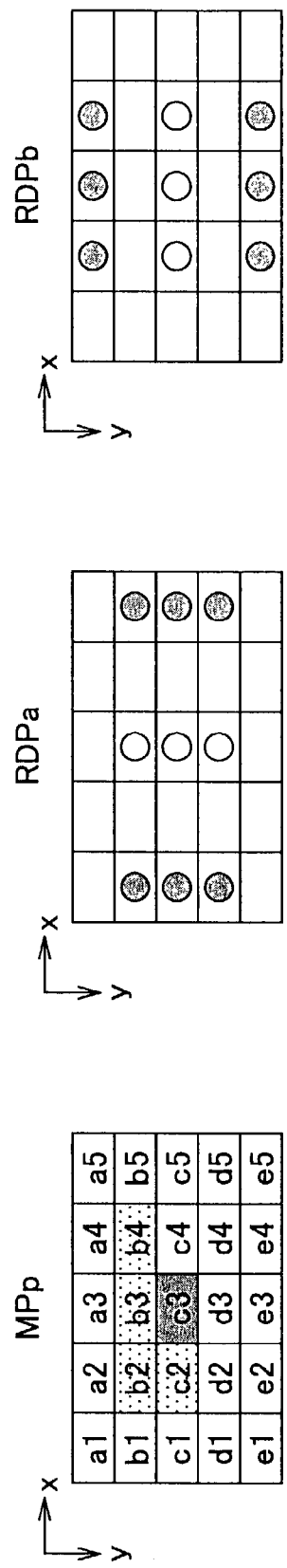
FIG. 28B shows pixel matrixes each of a present pixel and peripheral pixels.

Next, in a valley-like white pixel detection, a valley-like white pixel in a small white area which cannot be detected in the above-described RGB white ground detection is detected according to 5×5 pixel matrix distributions RDPa and RDPb of G image data shown in FIG. 28B. Specifically, That a minimum density miny among pixels marked with black circles in the 5×5 pixel matrix distribution RDPa is extracted. Then, a maximum density maxy among pixels marked with white circles in the 5×5 pixel matrix distribution RDPa is extracted. Then, a minimum density mint among pixels marked with black circles in the other 5×5 pixel matrix distribution RDPb shown is extracted. Then, a maximum density maxt among pixels marked with white circles in the 5×5 pixel matrix distribution RDPb is extracted. Next, either of (miny-maxy) and (mint-maxt) that is a positive value larger than the other is determined to be a valley detection value OUT. When this valley detection value OUT is equal to or larger than a predetermined threshold value, a present pixel (a central pixel of the 5×5 pixel matrix distribution RDPa or RDPb) is detected as a valley-like white pixel. Thus, a valley-like state of an image is detected so as to compensate for a white area that cannot be easily detected in the RGB white ground detection.

<<White Judgment>>

State variables MS and SS[I] used in a white judgment are generated and updated. The state variable MS is associated with a pixel in a present line (a line being processed). The state variable SS[I] is associated with a pixel in a preceding line (a processed line) preceding the present line by one line. Each of the state variables MS and SS[I] is 4-bit white-ground information representing a degree of white of a white ground. A maximum value assumed by each of the state variables MS and SS[I] is determined at 15, which means a whitest degree. A minimum value of each of the state variables MS and SS[I] is 0. In other words, each of the state variables MS and SS[I] is data representing a degree of white; as each of the state variables MS and SS[I] assumes a larger value, the value means a more intense white. Upon starting the process, both the state variables MS and SS[I] are initialized to 0.

Subsequently, the white-ground information SS of pixels before the main scanning position of the present pixel in the line one line before the present pixel are updated to values obtained by reducing the white-ground information MS of the present pixel by a reduction rate decreasing by 1 for each one pixel shifted in the main scanning direction x so that the white-ground information MS of the present pixel is propagated at the above-mentioned reduction rate toward a direction opposite the main scanning direction x in the line one line before the present pixel (a white propagation process). However, this white propagation process applies to a case where the white-ground information SS one line before the present pixel is smaller than the white-ground information MS of the present pixel. For example, when a pixel one line before the present pixel is detected as a white ground (a white area) in the RGB white ground detection, the white-ground information of the pixel one line before the present pixel is the maximum value of 15, thus is not updated.

In the foregoing white propagation process for the white-ground information SS one line before, the white-ground information SS one line before is retained in the RAM 8K, and the internal feedback loop is formed in the memory controller as shown in FIG. 27B. Either of data (Edp) read from the RAM 8K (the RAM 8K (LUT) shown in FIG. 27B) and white propagation process data calculated by the SIMD processor 33 and supplied to the memory controller is selected by the multiplexers 76 and 77 according to a select designation of the SIMD processor 33, and is re-written in the address of the read data (Edp) in the above-mentioned RAM 8K.

When the present pixel is updated so that the present pixel becomes a non-white ground, and when the present pixel is a virtual white pixel and the white-ground information MS of the present pixel is equal to or larger than a threshold value thw1 (13), the white-ground information MS corresponding to the present pixel is increased by 1. In other words, the white-ground information MS is updated to a value one degree larger in white intensity. The maximum value (max) of the white-ground information MS is determined as 15; accordingly, when the white-ground information MS would become larger than 15, the white-ground information MS is caused to stay 15. In this course, the foregoing white propagation process is also performed.

When the present pixel is a virtual white pixel, the white-ground information MS of the present pixel is smaller than the threshold value thw1 (13) and is equal to or larger than a threshold value thw2 (1), and the present pixel is a valley-like white pixel, the state variable MS is maintained at the current value. In this course, the foregoing white propagation process is also performed.

Otherwise, the white-ground information MS of the present pixel is decreased by 1. In other words, the white-ground information MS is updated to white-ground information one degree smaller in white intensity. The minimum value (MIN) of the white-ground information MS is 0; accordingly, when the white-ground information MS would become smaller than 0, the white-ground information MS is caused to stay 0. In this course, the foregoing white propagation process is also performed.

<<Dot Separation 324>>

By using G image data, a pixel (referred to as a dot-peak pixel) composing a part of halftone dots from pixel density information within a two-dimensional local area having a predetermined size. When the following two conditions are satisfied with respect to the local area at the same time, a central pixel within the area is detected as the dot-peak pixel.

Condition 1: The central pixel has a maximum (mountain-peak) density level or a minimum (valley-peak) density level within the local area.

Condition 2: An absolute value of a difference between an average of density levels of each pair of pixels symmetric with respect to the central pixel and the density level of the central,pixel is equal to or larger than a threshold value Th.

Mountain/valley-dot-peak pixels are counted on the basis of an individual two-dimensional small area having a predetermined size, and a total of the mountain/valley-dot-peak pixels is determined as a discrete value P of the individual small area. When this discrete value P is larger than a threshold value Pth, all pixels in the small area (or only the central pixel in the small area, in a process on an individual pixel basis) are judged to be as a dot area.

In this dot-area judgment in a small area, by using the internal feedback loop formed in the memory controller as shown in FIG. 27A or FIG. 27B as in the foregoing edge/non-edge judgment, a feedback of decided dot/non-dot information of the preceding pixel and a detection result of whether or not the present pixel is a dot mountain peak or a dot valley peak are added to a dot/non-dot judgment LUT so as to prevent a dot/non-dot oscillation from occurring frequently at short intervals so that the dot/non-dot detection is performed more reliably.

<<Hue Separation (Conversion to Seven-Valued Data) 325a>>

Input data of R, G and B are converted into signals of c, m, y, and color-judgment w (white). An example of a hue separation is as follows: boundaries of the respective colors are obtained; an RGB difference is defined as a difference between a maximum value and a minimum value of image data of R, G and B in one pixel; a hue dimension is divided into seven areas; and it is judged which of the seven areas the input data belongs to. Output signals are 3-bit data comprising one bit for each of c, m and y, and 1-bit data for w of a color pixel detection for a color judgment. Threshold values are varied according to the hues so as to select a threshold value corresponding to each of the hue areas when the hue areas have different chromatic ranges. This hue separation is an example; thus, whatever operational expressions may be used. The outputs c, m, y and w of the hue separation 325a are stored in the buffer memory 32 for five lines, and are used for a color-pixel judgment.

When the w pixel for a color pixel exists, the data of c, m and y are corrected to c=m=y=0 of the pixel This correction enlarges a white level of a 5×5 pixel matrix including the present pixel as a central pixel thereof. Next, it is judged whether or not the present pixel is a pixel (a color pixel) other than the pixels judged in the hue separation as having all of c, m and y being 1 (c=m=y=1) or as having all of c, m and y being 0 (c=m=y=0), by checking whether or not the 5×5 pixel matrix matches color-pixel patterns. Then, by a pattern matching using colored-fine-line patterns of 5×5 pixel matrixes, it is detected whether or not the present pixel is a color-line pixel surrounded by white. Next, by a pattern matching using white-area patterns of 5×5 pixel matrixes, it is detected whether or not the present pixel is a white-area pixel. Based on the above-obtained pattern matching results, a color pixel surrounded by a white area is considered to be a color-pixel candidate; when a white area exists otherwise, the present pixel is not considered to be a color pixel. When the pixel matrix matches color-pixel patterns including no white area, the present pixel becomes a color-pixel candidate.

<<Color Judgment 325b (FIG. 23)>>

Next, the numbers of c, m and y being 1 (c=1, m=1, y=1) are counted with respect to each of the pixels in the pixel matrix. When a difference between a maximum value and a minimum value of a counted value with respect to each of c, m and y is equal to or larger than a threshold value thcnt, and the minimum value is smaller than a threshold value thmin, the present pixel is considered to be a color-pixel candidate 1. The threshold values thcnt and thmin are determined prior to a copying (process). By performing a plane expansion to y, m and c, and counting the numbers on an individual plane basis in an N×N matrix, a minimum value is assumed to be black. Thereby, when a black pixel fails to be read, a correction thereof becomes possible. Additionally, a chromatic pixel is judged from the difference between the maximum value and the minimum value. Accordingly, a pixel failed to be read as a black pixel can be corrected, and a chromatic pixel is extracted. When predetermined chromatic pixels exist in the 5×5 pixel matrix including the present pixel at the center, the present pixel is considered to be a chromatic pixel. When the present pixel is considered to be the color-pixel candidate 1 and the color-pixel candidate 2, the present pixel is judged to be a color pixel 1.

Next, when at least one color pixel 1 exists in a 4×4 pixel matrix, the 4×4 pixel matrix as a whole is blocked into a color-pixel-1 block. In processes subsequent to this blocking process, data is output in units of blocks, in which the 4×4 pixels form one block. In an isolated-point elimination, when other color-pixel-1 block does not exist adjacent to the present block represented by the blocked data, the blocked data is eliminated as isolated points. Next, in an expansion process, when the color-pixel-1 block exists, the output of the isolated-point elimination is expanded to a 5×5 block so as not to subject a periphery of the color pixels to a black-character process. At this point, B/C information, which is valued L (chromatic) corresponding to the color-pixel-1 block, and is valued H (achromatic) otherwise, is generated.

Hereafter, the numbers of c, m and y being 1 (c=1, m=1, y=1) are counted with respect to each of the pixels in the pixel matrix; whether a color pixel 2 or a color pixel 3 is detected according to a difference between a maximum value and a minimum value of a counted value; and other processes including a blocking process and an isolated-block elimination are performed. Further, it is judged by a pattern matching whether the present pixel is a black-pixel candidate 1 and/or a black-pixel candidate 2. When the present pixel is the black-pixel candidate 1 and the black-pixel candidate 2, the present pixel is judged to be a black pixel. When at least one black pixel exists in a 4×4 pixel matrix, the 4×4 pixel matrix as a whole is blocked into a black-pixel block. In processes subsequent to this blocking process, data is output in units of blocks, in which the 4×4 pixels form one block. In a matrix of 3×3 blocks, when the present block is the black-pixel block, and when peripheral pixels thereof are non-black pixels, the present block is judged to be a non-black-pixel block.

<<Comprehensive Color-Pixel Judgment>>

When the present block is judged to be the color pixel 2 by the color-pixel judgment, and is not judged to be the black pixel by the achromatic judgment, the present block is judged to be a color block. Also, when the present block is judged to be a color pixel 3 by the color-pixel judgment, the present block is judged to be color a color block. For the purpose of considering small characters as being continuous with respect to the block judged to be color by the comprehensive color-pixel judgment, when at least one color block exists in a matrix of 9×9 blocks including the present block at the center thereof, the present block is considered to be the color block. This expansion is performed so as to fill up a gap between characters.

<<Continuity Counting>>

Next, it is judged whether the document is a color document or whether the document is a monochrome document by checking a continuity in a color-pixel block. Specifically, by counting a number of continuous color pixels in the output data (the color-pixel block) of the foregoing expansion, it is judged whether or not the document is a color document. When the present pixel exists in the color-pixel block, numbers of continuous color pixels with respect to upper-left, upper, upper-right and left pixels of the present pixel are referred to so as to calculate the number of continuous color pixels with respect to the present pixel. At this point, assuming that the present pixel is, for example, a pixel c3 in a 5×5 pixel distribution pattern MPp shown in FIG. 28B, those upper-left, upper, upper-right and left pixels are pixels b2, b3, b4 and c2, respectively. When the present pixel does not exist in the color-pixel block, the number of continuous color pixels with respect to the present pixel is valued 0.

In this process, an LUT containing correspondences between the number of continuous color pixels of the present pixel (c3) and the numbers of continuous color pixels of the upper-left, upper, upper-right and left pixels b2, b3, b4 and c2 is read from the data RAM 37 of the SIMD processor 33, is written to the RAM 8K (LUT) shown in FIG. 28A. A feedback loop is formed in a memory controller as shown in FIG. 28A. Data c2 (the number of continuous color pixels of the left pixel c2) read from the RAM 8K (LUT) and the numbers of continuous color pixels of the upper-left, upper and upper-right pixels b2, b3 and b4 (data b2, b3 and b4) read from the RAM 8K (LINE) storing numbers of continuous color pixels of pixels in a preceding line are combined by the multiplexers 76 and 77 and the output register 72, and are supplied as an LUT access address to the address line of the RAM 8K (LUT) via the memory switch SW so as to read data c3 from the LUT and determine the data c3 to be the number of continuous color pixels of the present pixel (c3).

Here, a description will be given of a logic for determining the number of continuous color pixels using the LUT. When the present pixel does not exist in the color-pixel block, the number of continuous color pixels with respect to the present pixel is valued 0. When the present pixel exists in the color-pixel block, firstly, a number of continuous color pixels with respect to the upper pixel (b3) of the present pixel (c3) is checked. When the number of continuous color pixels with respect to the upper pixel (b3) is 0, a reference value A is provided with a number of continuous color pixels with respect to the upper-right pixel (b4) plus 1. When the number of continuous color pixels with respect to the upper pixel (b3) is not 0, the reference value A is provided with the number of continuous color pixels with respect to the upper-right pixel (b4). Next, a reference value B is provided with a number of continuous color pixels with respect to the upper-left pixel (b2) plus 1, a reference value C is provided with the number of continuous color pixels with respect to the upper pixel (b3) plus 1, and a reference value D is provided with a number of continuous color pixels with respect to the left pixel (c2) plus 1. Then, a maximum value among the reference values A, B, C and D is determined to be the number of continuous color pixels with respect to the present pixel (c3). When the number of continuous color pixels with respect to the upper pixel (b3) is not 0, the number of continuous color pixels with respect to the upper pixel (b3) is provided for the present pixel (c3).

After the number of continuous color pixels with respect to the present pixel (c3) is determined as described above, it is checked whether or not this number of continuous color pixels is equal to or larger than a predetermined value THACS. When this number is equal to or larger than the predetermined value THACS, the document is determined to be a color document, and the process of the continuity counting ends. When the number of continuous color pixels is smaller than the predetermined value THACS, the present pixel is updated to a next pixel in the scanning directions x and y, and the heretofore-described process is repeated. Upon completing the above-described process for all pixels throughout the document, and still, when the number of continuous color pixels is smaller than the predetermined value THACS, the document is determined to be a monochrome image.

The above-mentioned number of continuous color pixels is substantially a sum of a number of longitudinal colored line segments and a number of transverse colored line segments. The number of continuous color pixels with respect to the upper-right pixel is treated differently so as to prevent a duplicate count. When even one of the numbers of continuous color pixels in whichever of the color-pixel blocks formed on a same document is equal to or larger than the predetermined value THACS, it is decided that the document is a color document, not a monochrome document.

<<Comprehensive Judgment 326>>

The comprehensive judgment 326 comprises a character judgment, an expansion process, and a character-inside judgment.

<<Character Judgment>>

When the result of the edge separation 322 indicates an edge, the result of the dot separation 324 indicates no dot, and the result of the white-background separation 323 indicates a white area, the present area is judged to be a character edge; otherwise, the present area is judged to be a non-character-edge (a picture or a character-inside).

<<Expansion Process>>

The expansion process conducts an expansion to four blocks by performing an OR process of 8×8 blocks, and thereafter performing an AND process of 3×3 blocks, with respect to the result of the character judgment. Specifically, when either of the 8×8 blocks including the present block at the center thereof is a character edge, the present block is also assumed to be a character-edge block. Then, when all of the 3×3 blocks including the present block at the center thereof are character edges, the present block is determined to be a character-edge, and further a total of four blocks including the present block and adjacent three blocks thereof are determined to be character edges. The AND process is performed after the OR process because of the following reason. Especially in a case of a black character, when a small non-black-character area exists in the periphery of a black-character area, differences between processes may cause a strange feel; e.g., a black may appear lighter. To prevent this, the OR process enlarges the non-black-character area. The AND process is performed so as to obtain a desired amount of expansion.

<<Character-Inside Judgment>>

In the character-inside judgment, the results of the edge separation 322, the white-background separation 323, the dot separation 324, the color judgment 325$b$, and the character judgment are used so as to generate a character-inside signal representing either of a character-inside area (within a line width). Processes and signals used for generating the character-inside signal are as follows.

Character-inside character signal: an OR process of 5×5 blocks is performed for an output signal representing a character-edge/non-character-edge result of the character judgment. The output of this OR process is referred to as a character-inside character signal.

White-block black character signal A: when the character-inside character signal is active (a character edge), the output of the white correction of the white-background separation 323 indicates "white correction data present", the result of the color judgment 325$b$ is non-active (achromatic: black-pixel block), the white-block black character signal A is made active (indicating a white-block black character). A black character surrounded by white grounds is highly likely to be a character.

High-density black-area signal B: when an OR of 3×3 blocks in a black blocking process of the white-background separation 323 is active (black), the result of the color judgment 325$b$ is non-active (achromatic), the result of the dot separation 324 is non-active (non-dot), and further, the character-inside character signal is non-active (non-character edge), the high-density black-area signal B is made active (indicating a high-density black area). Inside a black character, the character-inside judgment is performed in combination of other conditions because a density therein is high.

Black-character signal C: when the character-inside character signal is active (a character edge), and the result of the color judgment 325$b$ is non-active (achromatic), the black-character signal C becomes active (indicating a black character). This active black-character part is likely to be a character edge, in the vicinity of which a character-inside is likely to exist.

Here, a description will be given of a judgment of a character-inside candidate. A character-inside candidate signal Q is represented by using the white-block black character signal A, the high-density black-area signal B and the black-character signal C, as follows:

Q24=(A21&A22&A23&A24) # (Q13#Q23#Q14#Q15) & (B24#C24)

A first digit "2" of a two-digit number of each symbol represents a present line y2, and a first digit "1" thereof represents a preceding line y1 one line before the present line y2. A second digit of the two-digit number of each symbol represents a pixel position x on each line. In a process represented by the foregoing expression, when the white-block black character signals A continuously exist, i.e., all of A21 to A24 are active, the present pixel is assumed to be a character-inside candidate, and subsequently, a character-inside candidate determination process starts. Specifically, when a pixel (Q13, Q23, Q14 or Q15) judged to be a character-inside candidate exists around a high-density black-area signal B24, or a black-character signal C24, the present pixel is judged (determined) to be a character-inside candidate. That is, the character-inside judgment is triggered by the condition that the white-block black character signals A (active) continuously exist.

A black character surrounded by white grounds (the white-block black character signal A being active) is highly likely to be a character. The white-block black character signals A (active) continuously exist because substantially all of the pixels are characters. The black-character signal C indicates a high likelihood of a character edge, in the vicinity of which a "character-inside" is likely to exist. Therefore, the character-inside candidate (Q24: active) is judged as described above.

Next, the character-inside signal is generated from the character-inside candidate (signal Q: active). The character-inside signal is judged to be "character-inside signal present" (character-inside signal: active) when a character-edge signal is not present and a character-inside candidate is present. Finally, the C/P signal is output as follows.

| C/P signal | Character-edge signal | Character-inside candidate | Area judgment |
|---|---|---|---|
| 0 | Absent | Absent | Picture area |
| 1 | Absent | Present | Character-inside area |
| 2 | — | — | — |
| 3 | Present | X | Character-edge area |

There is no case of outputting C/P=2.

3-bit signals including this 2-bit C/P signal plus the 1-bit B/C signal is the image-area data Fd.

The image-area data Fd is referred to in the filtering process and the under-color removal performed in the IPU2, and is referred to in the γ conversion and the gradation process performed in the IPU3y, IPU3m, IPU3c and IPU3k.

The filtering process performed in the IPU2 is a filtering process for applying an MTF correction to RGB data. By using a matrix of coefficients corresponding to a matrix of N×N pixels, a weighted average value is obtained by multiplying each of the coefficients by each image data. The weighted average value is derived by using a matrix of coefficients suited for sharpening when the C/P signal indicates "3" (a character edge area), or by using a matrix of coefficients suited for smoothing when the C/P signal indicates "0" or "1" (a picture area or a character-inside area).

The under-color removal is performed for the purpose of increasing a color reproduction of image data. A UCR (under-color removal) process is applied to a common portion of Y, M and C data generated by color conversion so as to generate K data and thus generate Y, M, C and K data. When the C/P signal is not "3" (not a character edge area; i.e., a picture area or a character-inside area), a skeleton black process is performed. When the C/P signal is "3" (a character edge area), a full black process is performed. Further, when the C/P signal is "3" (a character edge area), and when the B/C signal is "H" (an achromatic area), the C, M and Y data is erased so as to express a black character with only a black component.

The γ conversion is and processed in the IPU3y, IPU3m, IPU3c and IPU3k, with changing γ conversion properties (γ curves) according to a frequency characteristic of the image forming unit 105 of the color printer PTR, and the C/P signal. When the C/P signal is "0" (a picture area) or "1" (a character-inside area), a γ curve reproducing an image faithfully is used. When the C/P signal is "3" (a character edge area), the γ curve is raised so as to emphasize a contrast.

In the gradation process performed in the IPU3y, IPU3m, IPU3c and IPU3k, a quantization, such as a dither process and a random dither process, is performed according to the frequency characteristic of the image forming unit 105 of the color printer PTR and the C/P signal. In the gradation process for K image data performed in the IPU3k, when the C/P signal is "0" (a picture area), a process emphasizing a gradation is performed; when the C/P signal is not "0" (not a picture area), a process emphasizing a resolving power is performed. In the gradation processes for other than K image data, when the C/P signal is "0" (a picture area) or "1" (a character-inside area), a process emphasizing a gradation is performed; when the C/P signal is neither "0" or "1" (neither a picture area nor a character-inside area), a process emphasizing a resolving power is performed.

Embodiment 6

Hardware according to a six embodiment is substantially the same as in the foregoing first embodiment; however, in the sixth embodiment, the SIMD processor 33 of the IPU1 according to the sixth embodiment performs a different pattern comparison (a pattern matching) according to a pattern comparison program in an image-area separation program in the reading correction program stored in the program RAM 36.

Figure 29:
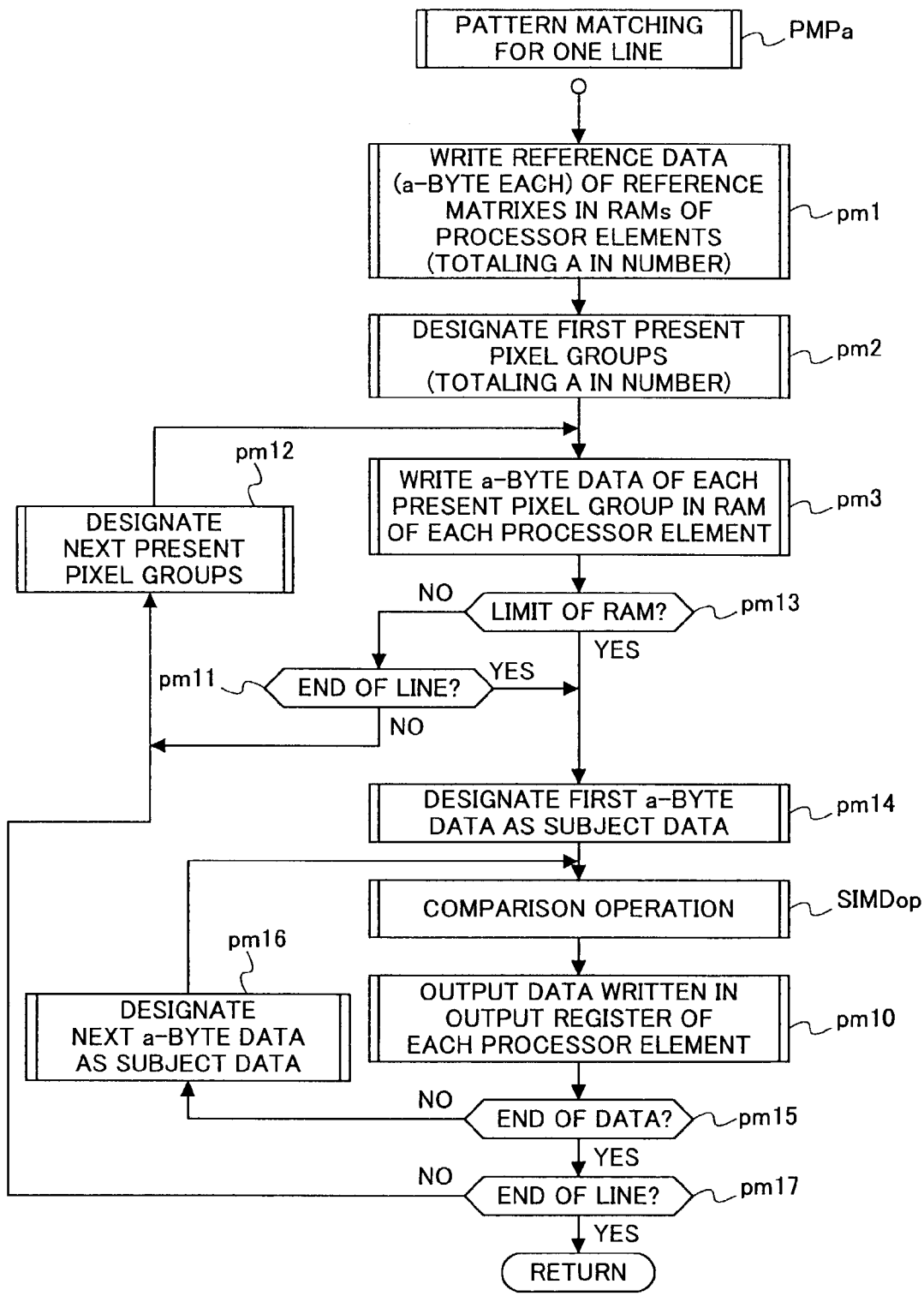
FIG. 29 is a flowchart of a pattern comparison performed by the SIMD processor according to a sixth embodiment of the present invention.

FIG. 29 is a flowchart of a pattern comparison PMPa according to the present sixth embodiment. This pattern comparison PMPa shown in FIG. 29 can replace the pattern matching PMP shown in FIG. 24. A description will be given of the pattern comparison PMPa shown in FIG. 29.

Besides, upon the pattern comparison using the black-pixel continuity detection reference patterns and the white-pixel continuity detection reference patterns represented by the examples shown in FIG. 25A, the SIMD processor 33 provides the buffer memory 32 with input line buffers for storing ternary data of three lines or more, and also provides the buffer memory 32 with judgment-result line buffers for storing the heretofore-mentioned judgment data ("11": black-continuity pixel/"01": white-continuity pixel/"00": unmatched) corresponding to each pixel in the center line of the three lines.

In FIG. 29, the global bus processor 38 of the SIMD processor 33 writes groups of reference data of reference patterns (reference matrixes) (b in number), e.g., groups (b in number) of reference data of the black-pixel continuity detection reference patterns and the white-pixel continuity detection reference patterns, in the RAMs of the processor elements (totaling A=320 in number, for example) (pm1).

Next, the SIMD processor 33 orders the memory controllers of the buffer memory 32 to transfer the number (A) of items of the data (pm2). In response to this order, the memory controller converts pixel information data of each pixel matrix centered around each of present pixels (A in number) aligned in series on the center line (the present line) stored in the input line buffer into a-byte data in the manner shown in FIG. 25C on an individual matrix basis, and serially transfers the a-byte data to the SIMD processor 33. The global bus processor 38 of the SIMD processor 33 writes the first a-byte data to the last a-byte data in order in the RAMs of the processor elements (A in number) (pm3).

For example, the memory controller of the buffer memory 32 writes the pixel information data (binary data) in three RAMs 8K allocated as line buffer memories. Then, the memory controller reads pixel information data corresponding to the 3×3 pixel matrix consisting of pixels a-i in which the present pixel e is surrounded by one pixel each in two-dimensional direction (x, y), as shown in FIG. 25B. Then, the memory controller converts the pixel information data into a-byte data (a=2) in one line as shown in FIG. 25C, and supplies the a-byte data to the SIMD processor 33. Subsequently, the memory controller repeats this process A times, with shifting the present pixel one by one on the same line. The global bus processor 38 of the SIMD processor 33 writes each a-byte data in the RAMs of the processor elements (pm3).

Next, the global bus processor 38 checks whether or not the a-byte data is stored to reach a predetermined upper limit near the limit of the storage capacity of the RAMs of the processor elements, or checks whether or not the above-described generation of the a-byte data and the transfer of the a-byte data to the SIMD processor 33 are completed with respect to all of the pixels on one line (pm13, pm11). When neither of the checking steps indicates a negative result, next present pixels on the same line are designated as pixels to be subjected to the pattern comparison, and the above-described generation of the a-byte data and the transfer of the a-byte data to the SIMD processor 33 in pm3 are performed. The global bus processor 38 of the SIMD processor 33 writes each a-byte data in the RAMs of the processor elements (pm13-pm11-pm12-pm3).

When the a-byte data is stored to reach the predetermined upper limit near the limit of the storage capacity of the RAMs of the processor elements, or when the writing of the a-byte data, which correspond to all of the pixels on one line, to the SIMD processor 33 is completed, the global bus processor 38 designates the first a-byte data in the RAMs of the processor elements as subject data to be subjected to the pattern matching (pm14), and orders each of the processor elements to perform the comparison operation SIMDop. This comparison operation SIMDop is the same as the comparison operation SIMDop shown in FIG. 24. In the present sixth embodiment, the comparison operation SIMDop is repeated a number of times, the number corresponding to the number of the a-byte data written in the RAMs of the processor elements (pm14-SIMDop-pm10-pm15-pm16-SIMDop). When the comparison operation SIMDop is repeated the number of times, it is checked whether or not the pattern matching is completed to all of the pixels on one line (pm17). When the pattern matching is not completed, next present pixels on the same line are designated as pixels to be subjected to the pattern comparison, and the above-described generation of the a-byte data and the transfer of the a-byte data to the SIMD processor 33 in pm3 are performed.

In the patter comparison according to the sixth embodiment, each of the processor elements repeatedly performs the pattern comparison a number of times so that the pattern matching processes are performed for a multitude of pixels on one line all together. Thus, the pattern matching judgment rate is further increased.

Embodiment 7

FIG. 30A to FIG. 30G show examples A to G of parallel/serial conversions or serial/parallel conversions of image data performed by the memory controller, and data input-output modes performed by the IPU1, the IPU2, the IPU3y, the IPU3m, the IPU3c and the IPU3k.

In FIG. 30A, a flow of image data in direction Af (indicated by solid-line arrows) is as follows. In the IPU1, for example, one line of image data (monochrome image data in a monochrome image mode or image data of one color among RGB image data in a color image mode) provided by the reading unit 21 is supplied to a memory controller A. In the memory controller A, image data items on one line are divided alternately into two series, i.e., a string of image data items of odd-numbered pixels and a-string of image data items of even-numbered pixels. The image data items of odd-numbered pixels and the image data items of even-numbered pixels are supplied to the SIMD processor 33 simultaneously in parallel. In the SIMD processor 33, data processes are applied to the image data items of odd-numbered pixels and the image data items of even-numbered pixels simultaneously in parallel, and are output to a memory controller B. In the memory controller B, the image data items are extracted alternately from the string of the image data items of odd-numbered pixels and the string of the image data items of even-numbered pixels so as to be synthesized into one line, and are transmitted to the CDIC. This is an example of a "one-line input division processing mode".

Besides, when necessary, the line buffer memories (RAMs 8K) or the LUTs (RAMs 8K) are inserted on the input side and/or the output side of the memory controllers A and B. Additionally, the memory controllers A to C (C: hereinafter described) may be realized by one memory controller, or by separate memory controllers. The same applies to the following modes.

In FIG. 30A, a flow of image data in direction Ar (indicated by broken-line arrows) is as follows. In the IPU2, or in the IPU3y, the IPU3m, the IPU3c and the IPU3k, for example, one line of image data provided by the CDIC or the IPU2 is supplied to the memory controller B. In the memory controller B, image data items on one line are divided into two series, i.e., a string of image data items of odd-numbered pixels and a string of image data items of even-numbered pixels. The image data items of odd-numbered pixels and the image data items of even-numbered pixels are processed simultaneously in parallel in the SIMD processor 33, and are output to the memory controller A simultaneously in parallel. In the memory controller A, the image data items are synthesized into one line, and are transmitted to the IPU3y, the IPU3m, the IPU3c and the IPU3k, or to the image forming unit 105. This is another example of the "one-line input division processing mode".

In FIG. 30B, a flow of image data in direction Bf (indicated by solid-line arrows) is as follows. In the IPU1, for example, two series of a string of image data items of odd-numbered pixels and a string of image data items of even-numbered pixels on one line (monochrome image data in the monochrome image mode or image data of one color among RGB image data in the color image mode) provided by the reading unit 21 are supplied via the memory controller A to the SIMD processor 33 simultaneously in parallel. In the SIMD processor 33, processes are applied to the image data items of odd-numbered pixels and the image data items of even-numbered pixels simultaneously in parallel, and are output to the memory controller B simultaneously in parallel. In the memory controller B, the string of the image data items of odd-numbered pixels and the string of the processed image data items of even-numbered pixels are synthesized into one line, and are transmitted to the CDIC. This is an example of an "odd/even-numbered-pixel divisional input mode".

In FIG. 30B, a flow of image data in direction Br (indicated by broken-line arrows) is as follows. In the IPU2, or in the IPU3y, the IPU3m, the IPU3c and the IPU3k, for example, one line of image data provided by the CDIC or the IPU2 is supplied to the memory controller B In the memory controller B, image data items on one line are divided into two series, i.e., a string of image data items of odd-numbered pixels and a string of image data items of even-numbered pixels. The image data items of odd-numbered pixels and the image data items of even-numbered pixels are processed simultaneously in parallel in the SIMD processor 33, and are output to the memory controller A simultaneously in parallel. The image data items in two series are transmitted simultaneously in parallel from the memory controller A to the IPU3y, the IPU3m, the IPU3c and the IPU3k, or to the image forming unit 105. This is an example of an "odd/even-numbered-pixel divisional output mode".

In FIG. 30C, a flow of image data in direction Cf (indicated by solid-line arrows) is as follows. In the IPU2, two series, i.e., a string of R image data items and a string of G image data items, of RGB image data of one line provided by the reading unit 21 are supplied via the memory controller A to the SIMD processor 33 simultaneously in parallel. In the SIMD processor 33, processes are applied to the R image data items and the G image data items simultaneously in parallel, and are output to the memory controller B simultaneously in parallel. In the memory controller B, the string of the processed R image data items and the string of the processed G image data items are synthesized into one series, and are transmitted to the CDIC. This is an example of a "multicolor parallel processing mode".

In FIG. 30C, a flow of image data in direction Cr (indicated by broken-line arrows) is as follows. In the IPU2, one series alternately including R image data items and G image data items provided by the CDIC is supplied to the memory controller B. In the memory controller B, the one series alternately including the R image data items and the G image data items is divided into two series, i.e., a string of the R image data items and a string of the G image data items. The R image data items and the G image data items are processed simultaneously in parallel in the SIMD processor 33, and are output to the memory controller A simultaneously in parallel. The image data items in two series are transmitted simultaneously in parallel from the memory controller A to the CDIC. This is an example of a "multicolor divisional output mode".

In FIG. 30D, flows of image data in direction Df (indicated by solid-line arrows) and in direction Dr (indicated by broken-line arrows) are similar to the flows of image data in direction Cf and in direction Cr shown in FIG. 30C, respectively. However, since RGB image data are in three series (three colors), another string of data X is provided in FIG. 30D. This data X may be dummy data, or, may be the image-area data Fd.

In FIG. 30E, a flow of image data in direction Ef (indicated by solid-line arrows) is as follows. In the IPU2, two series, i.e., a string of Y image data items and a string of M image data items, of YMCK image data are supplied via the memory controller A to the SIMD processor 33 simultaneously in parallel. In the SIMD processor 33, processes are applied to the Y image data items and the M image data items simultaneously in parallel, and are output to the memory controller B simultaneously in parallel. In the memory controller B, the two series, i.e., the string of the processed Y image data items and the string of the processed M image data items, are synthesized into one series, and are transmitted to the CDIC. This is another example of a "multicolor parallel processing mode".

In FIG. 30E, a flow of image data in direction Er (indicated by broken-line arrows) is as follows. In the IPU2, one series alternately including Y image data items and M image data items provided by the CDIC is supplied to the memory controller B. In the memory controller B, the one series alternately including the Y image data items and the M image data items is divided into two series (two colors), i.e., a string of the Y image data items and a string of the M image data items. The Y image data items and the M image data items are processed simultaneously in parallel in the SIMD processor 33, and are output to the memory controller A simultaneously in parallel. The image data items in two series are transmitted simultaneously in parallel from the memory controller A to the IPU3y and the IPU3m. This is another example of a "multicolor divisional output mode".

In FIG. 30F, a flow of image data in direction Ff (indicated by solid-line arrows) is as follows. In the IPU2, two series, i.e., a string of C image data items and a string of K image data items, of YMCK image data are supplied via the memory controller A to the SIMD processor 33 simultaneously in parallel. In the SIMD processor 33, processes are applied to the C image data items and the K image data items simultaneously in parallel, and are output to the memory controller B simultaneously in parallel. In the memory controller B, the two series, i.e., the string of the processed C image data items and the string of the processed K image data items, are synthesized into one series, and are transmitted to the CDIC. This is another example of a "multicolor parallel processing mode".

In FIG. 30F, a flow of image data in direction Fr (indicated by broken-line arrows) is as follows. In the IPU2, one series alternately including C image data items and K image data items provided by the CDIC is supplied to the memory controller B. In the memory controller B, the one series alternately including the C image data items and the K image data items is divided into two series (two colors), i.e., a string of the C image data items and a string of the K image data items. The C image data items and the K image data items are processed simultaneously in parallel in the SIMD processor 33, and are output to the memory controller A simultaneously in parallel. The image data items in two series are transmitted simultaneously in parallel from the memory controller A to the IPU3c and the IPU3k. This is another example of a "multicolor divisional output mode".

Figure 30G:
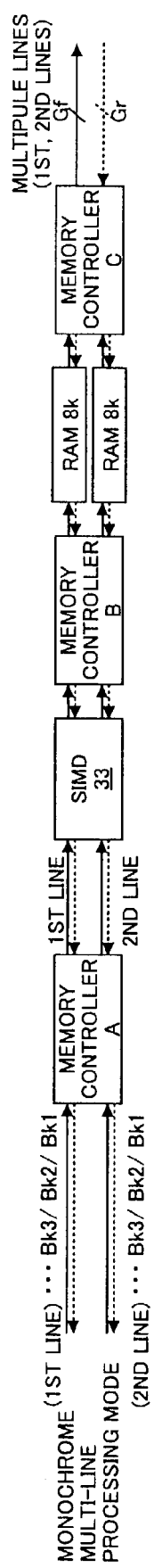

In FIG. 30G, a flow of image data in direction Gf (indicated by solid-line arrows) is as follows. In the IPU1, for example, two lines of monochrome image data items provided by the reading unit 21 in the monochrome image mode are supplied via the memory controller A to the SIMD processor 33 simultaneously in parallel. In the SIMD processor 33, processes are applied to the two lines of the image data items simultaneously in parallel, and are output to the memory controller B simultaneously in parallel. By the memory controller B, the two lines of the processed image data items are stored in the respective line memories (RAMs 8K) successively (item by item). When all of the image data items are stored, the two lines of the image data items are transmitted via the memory controller C, line by line, to the CDIC. This is an example of a "monochrome multi-line processing mode".

In FIG. 30G, a flow of image data in direction Gr (indicated by broken-line arrows) is as follows. In the IPU2, or in the IPU3y, the IPU3m, the IPU3c and the IPU3k, for example, two lines of image data items provided serially by the CDIC or the IPU2 are supplied to the memory controller C. By the memory controller C, the two lines of the image data items are stored in the respective line memories (RAMs 8K). By the memory controller B, the two lines of the image data items are supplied from the respective line memories (RAMs 8K) to the SIMD processor 33 simultaneously in parallel. The two lines of the image data items are processed simultaneously in parallel in the SIMD processor 33, and are output to the memory controller A simultaneously in parallel. The two lines of the image data items are transmitted in two series simultaneously in parallel from the memory controller A to the IPU3y, the IPU3m, the IPU3c and the IPU3k, or to the image forming unit 105. This is an example of a "monochrome multi-line output mode".

Besides, both the memory controller and the SIMD processor 33 are capable of inputting/outputting and processing one series of data. Additionally, each of the memory controllers has a function of a parallel/serial conversion (herein simply referred to as serial conversion) converting two-series input into one-series output, and a function of a serial/parallel conversion (herein simply referred to as parallel conversion) converting one-series input into two-series output, for example, as the memory controller B shown in FIG. 30B to FIG. 30F and the memory controller C shown in FIG. 30B to FIG. 30F, without the memory controller A and the SIMD processor 33.

Upon transferring the RGB image data and the image-area data Fd by using these functions, the R image data and the G image data are converted into one series by the memory controller performing the serial conversion converting two-series input into one-series output, and are transmitted to the CDIC (in direction Cf), and the B image data and the image-area data Fd are converted into one series by the serial conversion, and are transmitted to the CDIC (in direction Df: X=Fd). Besides, upon transmitting the respective YMCK image data and the image-area data Fd from the IPU2 to the IPU3y, the IPU3m, the IPU3c and the IPU3k, each of the Y, M, C and K image data, and the image-area data Fd are converted into one series by the respective four memory controllers of the IPU2 performing the serial conversion converting two-series input into one-series output, and are transmitted to the IPU3y, the IPU3m, the IPU3c and the IPU3k (in direction Ef/Ff). The memory controller of each of the IPU3y, the IPU3m, the IPU3c and the IPU3k divides the one series including each of the Y, M, C and K image data, and the image-area data Fd into two series of each of the Y, M, C and K image data, and the image-area data Fd by the parallel conversion converting one-series input into two-series output (in direction Er/Fr).

In the embodiments according to the present invention, each of the image ports of the buffer memory 32 is capable of inputting and/or outputting 2-byte (16-bit) data in parallel, and thus is capable of inputting and/or outputting two series of image data simultaneously in parallel. Thus, two series of image data can be input and/or output simultaneously in parallel between the image ports and the SIMD processor 33 via the memory controller. Accordingly, in the above-described examples A to G, one series of image data is input from the image port to the memory controller A in the example A, or two series of image data are input from the image ports to the memory controller A in the examples B to G; the one series of image data is divided into two series of image data in the memory controller A in the example A; the two series of image data are supplied from the memory controller A to the SIMD processor 33 simultaneously in parallel; the two series of image data are processed simultaneously in parallel by the SIMD processor 33; the two series of the processed image data are output simultaneously from the SIMD processor 33 to the memory controller A (or B or C); and the processed image data are output in two series from the memory controller A (or B or C) via the image ports. In this case, it is preferable to employ a data flow as follows: in each of FIG. 30A to FIG. 30G, each image data is supplied to the SIMD processor 33 in the (right) direction (indicated by the solid-line arrow) from the leftmost edge of the arrow (on the image-port side), and the processed image data is output back from the SIMD processor 33 in the (left) direction (indicated by the broken-line arrow) to the leftmost edge of the arrow (to the image port).

In a case where each of the image ports is capable of inputting and/or outputting 1-byte (8-bit) data, or multi-byte data, in parallel, image data may be processed as follows, when the image data is output to an element capable of inputting and/or outputting one series of image data: in the above-described examples A to G, one series of image data is input from the image port to the memory controller B in the examples A to F (or to the memory controller C in the example G); the one series of image data is divided into two series of image data in the memory controller B, and are supplied from the memory controller B to the SIMD processor 33 simultaneously in parallel; the two series of image data are processed simultaneously in parallel by the SIMD processor 33; the two series of the processed image data are output simultaneously from the SIMD processor 33 to the memory controller B (or A or C); and the two series of the processed image data are synthesized into one series by the memory controller B (or A or C); and the one series of image data is output from the memory controller B (or A or C) via the image ports. In this case, a data flow as follows is employed: in each of FIG. 30A to FIG. 30G, each image data is supplied to the SIMD processor 33 in the (left) direction (indicated by the broken-line arrow) from the rightmost edge of the arrow (on the image-port side), and the processed image data is output back from the SIMD processor 33 in the (right) direction (indicated by the solid-line arrow) to the rightmost edge of the arrow (to the image port).

That is, the buffer memory 32 according to the embodiments according to the present invention can set or select any of the data flows shown in FIG. 30A to FIG. 30G: the data flow proceeding from the leftmost to the rightmost in the figure; the data flow proceeding from the rightmost to the leftmost in the figure; the data flow proceeding from the leftmost to the SIMD processor 33 and returning to the leftmost in the figure; and the data flow proceeding from the rightmost to the SIMD processor 33 and returning to the rightmost in the figure. Additionally, in each of these data flows, the memory controller A, the memory-controller B and the memory controller C may be the same the memory controller, or may be separate memory controllers. Besides, the line buffer memories (RAMs 8K) are inserted on the input side and/or the output side of the memory controllers.

The present invention is not limited to the specifically disclosed embodiments, and variations and modifications may be made without departing from the scope of the present invention.

The present application is based on Japanese priority applications No. 2001-334836 filed on Oct. 31, 2001, No. 2001-334837 filed on Oct. 31, 2001, and No. 2001-334838 filed on Oct. 31, 2001, the entire contents of which are hereby incorporated by reference.

What is claimed is:

1. An image data processing device comprising:

an image processor inputting/outputting a predetermined number n of multi-bit image data items arranged serially in time series, where n is a number larger than one, a number of processor elements, which number is larger than the number n, processing the image data items inputted by an interface, simultaneously in parallel and outputting the processed image data items to the interface, and a processor control unit controlling operation of each of the interface and the number of processor elements;

an image port inputting/outputting at least one series of image data items arranged serially in time series; and a buffer memory device including at least one memory usable as a line memory for image data so as to store said series of said image data items, wherein said buffer memory device includes a memory controller having a plurality of functions including a function of dividing each of said image data items of said series inputted by the image port successively in time series, into n series of image data items and supplying the image data items of the n series to the image processor simultaneously in parallel, a function of extracting each of the image data items successively from the n series of the image data items outputted by the image processor simultaneously in parallel, so as to synthesize said n series of said image data items into the series of the image data items, a function of supplying each of said image data items of said series inputted by the image port successively in time series, to the image processor simultaneously in parallel, and a function of supplying each of the n series of the image data items outputted by the image processor simultaneously in parallel, to the image port so as to output the n series of the image data items from the image port simultaneously in parallel.

2. The image data processing device as claimed in claim 1, wherein said image processor processes said image data items of said n series simultaneously in parallel, and outputs the processed image data items of said n series to said memory controller simultaneously in parallel; and said memory controller synthesizes said n series of said processed image data items into the series of the image data items.

3. The image data processing device as claimed in claim 2, wherein said n series of said image data items supplied by said memory controller to said image processor is two series of a string of image data items of odd-numbered pixels of one line of image data and a string of image data items of even-numbered pixels of the same line.

4. The image data processing device as claimed in claim 3, wherein said image data items are monochrome image data items read by monochrome reading.

5. The image data processing device as claimed in claim 2, wherein said n series of said image data items supplied by said memory controller to said image processor includes a string of image data items of one color of one of RGB image data and YMCK image data and a string of image data items of another color of the one of the RGB image data and the YMCK image data.

6. The image data processing device as claimed in claim 1, wherein said image port is capable of inputting/outputting the n series of the image data items arranged serially in time series simultaneously;

said memory controller divides each of said n series of said image data items successively into the n series of the image data items, and supplies said image data items of said n series to said image processor simultaneously in parallel;

said image processor processes said image data items of said n series simultaneously in parallel, and outputs the processed image data items of said n series to said memory controller simultaneously in parallel; and said memory controller outputs said n series of said processed image data items.

7. The image data processing device as claimed in claim 6, wherein said memory controller divides one line of image data into two series of a string of image data items of odd-numbered pixels and a string of image data items of even-numbered pixels, and supplies said two series to said image-processor.

8. The image data processing device as claimed in claim 6, wherein said memory controller divides one series of image data alternately including image data items of one color of one of RGB image data and YMCK image data and image data items of another color of the one of the RGB image data and the YMCK image data into two series of a string of said image data items of said one color and a string of said image data items of said another color, and supplies said two series to said image processor simultaneously in parallel.

9. The image data processing device as claimed in claim 1, wherein said image port is capable of inputting/outputting n lines of image data items arranged serially in time series simultaneously;

said memory controller supplies two lines of image data items to said image processor simultaneously in parallel;

said image processor processes said image data items of said two lines simultaneously in parallel, and outputs the processed image data items of said two lines to said memory controller simultaneously in parallel; and said memory controller writes said two lines of said processed image data items in said at least one memory used as the line memory, and outputs said two lines from said at least one memory.

10. The image data processing device as claimed in claim 1, wherein said memory controller writes two lines of image data items in said at least one memory used as the line memory, the two lines of the image data items being supplied serially to said memory controller, and reads said two lines of said image data items from said at least one memory so as to supply said two lines of said image data items to said image processor simultaneously in parallel;

said image processor processes said image data items of said two lines simultaneously in parallel, and outputs the processed image data items of said two lines to said memory controller simultaneously in parallel; and said memory controller writes said two lines of said processed image data items simultaneously in parallel.

11. The image data processing device as claimed in claim 1, wherein said buffer memory device includes a plurality of RAMs, a memory switch connected to said RAMs, and a plurality of the memory controllers each connected to said memory switch, said image port and said image processor, and each of said memory controllers sets a connection of said memory switch according to setting information provided by said image processor.

12. The image data processing device as claimed in claim 11, wherein said buffer memory device includes a plurality of sets each including said RAMs, said memory switch and said memory controllers.

13. The image data processing device as claimed in claim 11, wherein said image processor includes a readable and writable program memory, and the predetermined number n of processor elements applying identical processes to the predetermined number n of multivalued gradation data items simultaneously in parallel according to a program stored in said program memory, and said image data processing device further comprises a program writing unit writing a data processing program in said program memory.

14. The image data processing device as claimed in claim 13, wherein each of said image processor, said image port and said memory controllers inputs and outputs an image data item having data bits equal to or less than data bits that each of said processor elements can process at a time.

15. An image data process method comprising the steps of:

inputting/outputting a predetermined number n of multi-bit image data items arranged serially in time series, where n is a number larger than one, a number of processor elements, which number is larger than the number n, processing the image data items inputted by an interface, simultaneously in parallel and outputting the processed image data items to the interface, and a processor control unit controlling operation of each of the interface and the number of processor elements;

inputting/outputting at least one series of image data-items arranged serially in time series;

storing said series of said image data items in a buffer memory device including at least one memory usable as a line memory for image data;

dividing each of said image data items of said series inputted by an image port successively in time series, into n series of image data items and supplying the image data items of the n series to the image processor simultaneously in parallel, a function of; and extracting each of the image data items successively from the n series of the image data items outputted by the image processor simultaneously in parallel, so as to synthesize said n series of said image data items into the series of the image data items, a function of supplying each of said image data items of said series inputted by the image port successively in time series, to the image processor simultaneously in parallel, and a function of supplying each of the n series of the image data items outputted by the image processor simultaneously in parallel, to the image port so as to output the n series of the image data items from the image port simultaneously in parallel, wherein said dividing and extracting steps are performed by a memory controller of said buffer memory device.

* * * * *